(12) United States Patent
Haase et al.

(10) Patent No.: US 8,268,269 B2
(45) Date of Patent: *Sep. 18, 2012

(54) MANUFACTURE OF WATER CHEMISTRIES

(75) Inventors: Richard Alan Haase, Missouri City, TX (US); John Smaardyk, Kingwood, TX (US)

(73) Assignee: ClearValue Technologies, Inc.

( * ) Notice: Subject to any disclaimer, the term of this patent is extended or adjusted under 35 U.S.C. 154(b) by 834 days.

This patent is subject to a terminal disclaimer.

(21) Appl. No.: 11/880,797

(22) Filed: Jul. 23, 2007

(65) Prior Publication Data
US 2008/0053104 A1    Mar. 6, 2008

(51) Int. Cl.
*C01B 17/00*    (2006.01)

(52) U.S. Cl. ........ 423/111; 423/115; 423/116; 423/117; 423/118.1; 423/122; 423/123; 423/124; 423/125; 423/126; 423/127; 423/128; 423/129; 423/300; 423/327.1; 423/395; 423/419.1; 423/462; 423/463; 423/467; 210/716; 210/723

(58) Field of Classification Search ................. 423/111, 423/462, 467, 115–118.1, 122–129, 300, 423/327.1, 395, 419.1, 463; 210/716, 723
See application file for complete search history.

(56) References Cited

U.S. PATENT DOCUMENTS

| | | | |
|---|---|---|---|
| 3,953,584 A | 4/1976 | Danner et al. |
| 3,957,947 A | 5/1976 | Yamada et al. |
| 3,973,931 A | 8/1976 | Collins |
| 4,013,429 A | 3/1977 | Sircar et al. |
| 4,034,067 A | 7/1977 | Seigneurin et al. |
| 4,051,028 A | 9/1977 | Fiessinger |
| 4,069,299 A | 1/1978 | Hodgson |
| 4,082,685 A | 4/1978 | Notari et al. |
| 4,098,883 A | 7/1978 | Madaus et al. |
| 4,131,545 A | 12/1978 | Redmayne et al. |
| 4,264,340 A | 4/1981 | Sircar |
| 4,284,611 A | 8/1981 | Gancy et al. |
| 4,329,158 A | 5/1982 | Sircar |
| 4,359,456 A | 11/1982 | Gosling et al. |
| 4,362,643 A | 12/1982 | Kuo et al. |
| 4,388,208 A | 6/1983 | Gytel |
| 4,390,445 A | 6/1983 | Gytel |
| 4,417,996 A | 11/1983 | Kuo et al. |

(Continued)

FOREIGN PATENT DOCUMENTS

CA    1123306    5/1982

(Continued)

OTHER PUBLICATIONS

US 6,761,754, 7/2004, Kim (withdrawn).

*Primary Examiner* — Steven Bos

(57) ABSTRACT

As population density increases, the transportation of hazardous chemicals, including acids and disinfectants, lead to an increased incidence of spills while the consequences of spills become more serious. While solutions of halide acids, hypohalites and halites are safer disinfectants for transportation, handling, storage and use than traditional gaseous chlorine, the manufacturing cost of these disinfectants has here-to-fore limited their use. Economical processes are presented for the manufacture of $O_2$, halogen oxides, halide acids, hypohalites, and halates; as well as polynucleate metal compounds, metal hydroxides and calcium sulfate hydrate (gypsum). The instant invention presents methods and processes that incorporate the use of sulfur. This is while environmental regulators, such as the US EPA, require an increased removal of sulfur from hydrocarbon fuels, thereby creating an abundance of sulfur, such that the refining industry is in need of a way to dispose of said abundance of sulfur.

51 Claims, 12 Drawing Sheets

U.S. PATENT DOCUMENTS

| | | | |
|---|---|---|---|
| 4,435,308 A | 3/1984 | Thomas et al. |
| 4,481,018 A | 11/1984 | Coe |
| 4,490,445 A | 12/1984 | Hsu |
| 4,544,378 A | 10/1985 | Coe |
| 4,563,342 A | 1/1986 | Gunnarsson et al. |
| 4,566,986 A | 1/1986 | Waldmann |
| 4,681,697 A | 7/1987 | Doetsch et al. |
| 4,685,939 A | 8/1987 | Kratz |
| 4,791,079 A | 12/1988 | Hasbun |
| 4,814,106 A | 3/1989 | Kvant |
| 4,826,606 A | 5/1989 | Becker et al. |
| 4,877,506 A | 10/1989 | Fee et al. |
| 4,877,597 A | 10/1989 | Haase et al. |
| 4,879,043 A | 11/1989 | Boughton |
| 4,981,675 A | 1/1991 | Haase et al. |
| 5,034,023 A | 7/1991 | Thompson |
| 5,045,169 A | 9/1991 | Feduska |
| 5,069,893 A | 12/1991 | Haase et al. |
| 5,137,548 A | 8/1992 | Grenier |
| 5,149,400 A | 9/1992 | Haase et al. |
| 5,152,813 A | 10/1992 | Coe |
| 5,182,094 A | 1/1993 | Kvant |
| 5,215,665 A | 6/1993 | Crofts |
| 5,240,480 A | 8/1993 | Thoroughgood |
| 5,245,832 A | 9/1993 | Roberts |
| 5,246,686 A | 9/1993 | Cuer et al. |
| 5,258,058 A | 11/1993 | Coe |
| 5,262,058 A | 11/1993 | Morris |
| 5,268,023 A | 12/1993 | Kimer |
| 5,296,213 A | 3/1994 | Haase et al. |
| 5,341,646 A | 8/1994 | Agrawal |
| 5,342,601 A | 8/1994 | Cawlfield et al. |
| 5,354,360 A | 10/1994 | Coe |
| 5,356,728 A | 10/1994 | Balachandrn et al. |
| 5,376,350 A | 12/1994 | Tenney et al. |
| 5,386,692 A | 2/1995 | LaForce |
| 5,402,647 A | 4/1995 | Bonaquist |
| 5,409,680 A | 4/1995 | Kaczur et al. |
| 5,413,625 A | 5/1995 | Chao |
| 5,417,957 A | 5/1995 | Coe |
| 5,419,818 A | 5/1995 | Wanngard |
| 5,419,891 A | 5/1995 | Coe |
| 5,423,958 A | 6/1995 | Brannland et al. |
| 5,438,835 A | 8/1995 | Rathbone |
| 5,440,884 A | 8/1995 | Bonaquist |
| 5,454,857 A | 10/1995 | Chao |
| 5,456,083 A | 10/1995 | Hogg |
| 5,458,858 A | 10/1995 | Dawkins |
| 5,463,871 A | 11/1995 | Cheung |
| 5,464,467 A | 11/1995 | Fitch |
| 5,480,516 A | 1/1996 | Lipsztajn et al. |
| 5,523,072 A | 6/1996 | Falgen et al. |
| 5,565,182 A | 10/1996 | Sokol |
| 5,582,035 A | 12/1996 | Rathbone |
| 5,582,036 A | 12/1996 | Dmevich |
| 5,596,886 A | 1/1997 | Howard |
| 5,599,383 A | 2/1997 | Dyer |
| 5,599,518 A | 2/1997 | Kaczur et al. |
| 5,603,912 A | 2/1997 | Giovanniello et al. |
| 5,618,440 A | 4/1997 | Mason |
| 5,672,195 A | 9/1997 | Moreau |
| 5,676,920 A | 10/1997 | Lipsztajn |
| 5,681,446 A | 10/1997 | Betts et al. |
| 5,765,396 A | 6/1998 | Bonaquist |
| 5,779,876 A | 7/1998 | Traini et al. |
| 5,800,796 A | 9/1998 | Webb |
| 5,810,909 A | 9/1998 | Notaro |
| 5,820,654 A | 10/1998 | Gottzman |
| 5,820,655 A | 10/1998 | Gottzman |
| 5,830,388 A | 11/1998 | Kigel et al. |
| 5,837,125 A | 11/1998 | Prasad |
| 5,851,374 A | 12/1998 | Cowley et al. |
| 5,851,402 A | 12/1998 | Dhalluin et al. |
| 5,858,322 A | 1/1999 | Gray |
| 5,868,818 A | 2/1999 | Ogawa |
| 5,885,331 A | 3/1999 | Reiss |
| 5,895,638 A | 4/1999 | Tenney |
| 5,896,755 A | 4/1999 | Wong |
| 5,902,379 A | 5/1999 | Philips |
| 5,906,738 A | 5/1999 | Morisaki |
| 5,916,505 A | 6/1999 | Cisar et al. |
| 5,934,104 A | 8/1999 | Fidkowski |
| 5,938,970 A | 8/1999 | Reilly, Jr. et al. |
| 5,958,211 A | 9/1999 | Traini et al. |
| 5,965,004 A | 10/1999 | Cowley et al. |
| 5,972,196 A | 10/1999 | Murphy et al. |
| 5,985,234 A | 11/1999 | Dulko |
| 5,997,838 A | 12/1999 | Dulko |
| 6,004,378 A | 12/1999 | Reiss |
| 6,004,439 A | 12/1999 | Bakhir et al. |
| 6,036,935 A | 3/2000 | Dulko |
| 6,042,802 A | 3/2000 | Drake |
| 6,048,509 A | 4/2000 | Kawai |
| 6,071,483 A | 6/2000 | Pastore |
| 6,082,136 A | 7/2000 | Yoshino |
| 6,113,798 A | 9/2000 | Dhalluin et al. |
| 6,117,210 A | 9/2000 | Prasad |
| 6,139,810 A | 10/2000 | Gottzman |
| 6,171,370 B1 | 1/2001 | Hirano |
| 6,171,558 B1 | 1/2001 | Simpson |
| 6,173,584 B1 | 1/2001 | Agrawal |
| 6,174,445 B1 | 1/2001 | Reilly, Jr. et al. |
| 6,183,623 B1 | 2/2001 | Cisar et al. |
| 6,202,441 B1 | 3/2001 | Ha |
| 6,203,688 B1 | 3/2001 | Lipsztajn et al. |
| 6,231,830 B1 | 5/2001 | Madray |
| 6,235,167 B1 | 5/2001 | Stauffer |
| 6,263,700 B1 | 7/2001 | Agrawal |
| 6,277,483 B1 | 8/2001 | Peinemann |
| 6,287,533 B1 | 9/2001 | Khan et al. |
| 6,293,084 B1 | 9/2001 | Dmevich |
| 6,298,664 B1 | 10/2001 | Åsen et al. |
| 6,298,668 B1 | 10/2001 | Lo |
| 6,306,281 B1 | 10/2001 | Kelley |
| 6,306,308 B1 | 10/2001 | Hassick et al. |
| 6,315,814 B1 | 11/2001 | Barry et al. |
| 6,321,915 B1 | 11/2001 | Wilson |
| 6,333,018 B2 | 12/2001 | Bianchi |
| 6,333,445 B1 | 12/2001 | Obrien |
| 6,336,430 B2 | 1/2002 | De Souza |
| 6,338,786 B1 | 1/2002 | Thorpe |
| 6,347,534 B1 | 2/2002 | Ha |
| 6,350,298 B1 | 2/2002 | Su |
| 6,357,601 B1 | 3/2002 | Bowers |
| 6,360,524 B1 | 3/2002 | Drnevich et al. |
| 6,361,583 B1 | 3/2002 | Pinnau |
| 6,361,893 B1 | 3/2002 | George |
| 6,372,020 B2 | 4/2002 | Hong |
| 6,387,344 B1 | 5/2002 | Tenney et al. |
| 6,403,041 B1 | 6/2002 | Takahashi |
| 6,423,121 B1 | 7/2002 | Kiyama et al. |
| 6,436,435 B1 | 8/2002 | Rubinfeld et al. |
| 6,444,107 B2 | 9/2002 | Hartel et al. |
| 6,453,893 B1 | 9/2002 | Coleman et al. |
| 6,471,834 B2 | 10/2002 | Roe |
| 6,497,098 B2 | 12/2002 | Griffin |
| 6,499,312 B1 | 12/2002 | Bergman |
| 6,510,693 B2 | 1/2003 | Winkler et al. |
| 6,516,787 B1 | 2/2003 | Dutart |
| 6,523,529 B1 | 2/2003 | Moncelle |
| 6,536,234 B1 | 3/2003 | Shah |
| 6,537,464 B1 | 3/2003 | Shultes, III et al. |
| 6,551,386 B2 | 4/2003 | Weiler |
| 6,551,735 B2 | 4/2003 | Badding |
| 6,562,104 B2 | 5/2003 | Bool, III |
| 6,564,581 B2 | 5/2003 | Pompl |
| 6,565,626 B1 | 5/2003 | Baker |
| 6,572,678 B1 | 6/2003 | Wijimans |
| 6,572,679 B2 | 6/2003 | Baker |
| 6,572,759 B2 | 6/2003 | Nishimura |
| 6,572,838 B1 | 6/2003 | Sebastian |
| 6,579,341 B2 | 6/2003 | Baker |
| 6,585,882 B1 | 7/2003 | Su |
| 6,592,650 B2 | 7/2003 | Pinnau |
| 6,649,556 B2 | 11/2003 | Masini |
| 6,652,626 B1 | 11/2003 | Plee |
| 6,656,377 B2 | 12/2003 | Hassick et al. |

| | | |
|---|---|---|
| 6,685,818 B2 | 2/2004 | Lehman |
| 6,723,220 B2 | 4/2004 | Speeranza |
| 6,761,155 B2 | 7/2004 | Livingston |
| 6,767,663 B2 | 7/2004 | Li |
| 6,780,806 B1 | 8/2004 | Yand |
| 6,881,320 B1 | 4/2005 | Krafton |
| 2004/0126313 A1 | 7/2004 | Haase |

FOREIGN PATENT DOCUMENTS

| | | |
|---|---|---|
| CA | 1203364 | 4/1986 |
| CA | 1203664 | 4/1986 |
| CA | 1206665 | 6/1986 |
| WO | WO 03/009811 A2 | 6/2003 |

Figure 1
Legend

| Symbol | Equipment | Equipment Description |
|---|---|---|
| 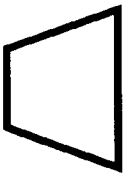 | Steam Turbine<br><br>Steam Turbine Generator Creates Electricity<br><br>Steam Turbine Engine Creates Mechanical Energy | Design as is known in the art. Steam turbine is to create mechanical energy, which turns at least one of an electrical generator and a compressor for an air separation unit. |
|  | Equipment Designation | Design as is known in the art, unless otherwise specified. |
|  | Process Flow | As is known in the art, unless otherwise specified. |
| 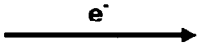 | Energy (Electricity) Flow | As is known in the art, unless otherwise specified. |
|  | Eductor | Water/Gas as is known in the art. |
|  | Water Jacketed Auger/Extruder | Design as is known in the art. |
|  | Pump | Design as is known in the art. |
|  | Process Control Equipment (Controller) | Design as is known in the art. |
|  | Process Measurement Equipment (X = pH or Sg or etc.) | Design as is known in the art. |
|  | Gas Fuel Type Fired Water Heater | Design as is known in the art. |
|  | Control Valve (electric of pneumatic) | Design as is known in the art. |
| 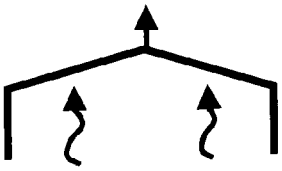 | Enclosed Process Vent | Design as is known in the art. |
|  | Vent Scrubber (Optional) | Design as is known in the art. |

MANUFACTURE OF WATER CHEMISTRIES

RELATED APPLICATION DATA

This application claims priority based on PCT/US06/002527 filed Jan. 24, 2006, U.S. patent application Ser. No. 11/041,329 filed Jan. 24, 2005, U.S. Provisional Application 60/716,323 filed Sep. 12, 2005, U.S. Provisional Application 60/728,607 filed Oct. 20, 2005, PCT/US02/23651 filed Jul. 25, 2002, U.S. Provisional Patent Application Ser. No. 60/307,824 filed Jul. 25, 2001 and of U.S. Provisional Patent Application Ser. No. 60/386,596 filed Jun. 5, 2002.

BACKGROUND OF THE INVENTION

1. Field of the Invention

The instant invention relates to improved processes for the preparation of polynucleate aluminum hydroxyl-halide complexes and of disinfectants. The instant invention obtains simplified processes for the preparation of polynucleate aluminum hydroxyl-chloride complexes, known as polynucleate aluminum compounds (PAC) and aluminum chlorohydrate (ACH), with ACH normally used to define products having basicities of over 50% and having a higher corresponding aluminum content. All of these complexes have the general formulation $Al_x(OH)_yCl_z$.

The instant invention also obtains simplified processes for the preparation of polynucleate metal hydroxy-halide complexes having the general formulation $M_x(OH)_yHa_z$, where Ha is a halogen, preferably Cl, and M is at least one metal or group of metals in either +2 or the +3 valence state and wherein, M is added to the polynucleate aluminum hydroxy-halide metal complex in the form of the metal halide acid solution, the base metal, the metal oxide or the metal hydroxide.

As defined in this instant invention, the term metal polymer (MP) is meant to refer to any polynucleate aluminum or polynucleate metal(s) complex or compound, including those which do not contain aluminum.

These MP are intended for use in liquid solids separations, such as in water purification, sludge dewatering and paper production, as well as solids dewatering and similar dewatering applications, being delivered in solution or in solid form. These MP can be used in a variety of applications including water purification, antiperspirants, corrosion control, and conductivity. The applications for these MP are only limited by the inclusion metal(s) and the application mechanism of the associated product, whether that product is in liquid, solid or dry form.

The instant invention obtains simplified processes for MP, wherein the halogen raw material is in a salt form and is converted to an acid form via either acidification with sulfuric acid ($H_2SO_4$) and/or sulfurous acid ($H_2SO_3$) or with electrolysis. The instant invention obtains improved processes for the manufacture of disinfectants, wherein the disinfectant contains an oxidative element or compound, and wherein the energy of manufacture is obtained from the energy of formation from at least one selected from a list consisting of: sulfur dioxide ($SO_2$) from the burning of sulfur (S) in air or $O_2$, sulfur trioxide ($SO_3$) from the oxidation of $SO_2$, $H_2SO_4$ formation from $SO_3$, sulfurous acid ($H_2SO_3$) formation from $SO_2$ with air or $O_2$, halide acid formation from the reaction of a metal halide with an acid based upon an oxidation state of sulfur (a sulfoxy acid, preferably $H_2SO_4$ and/or $H_2SO_3$) and any combination therein. The instant invention obtains improved processes for the manufacture of an acid and a base, wherein said acid is based upon a halogen anion and wherein said base is based upon the hydroxyl anion. The instant invention provides for an improved process for the manufacture of gypsum, calcium sulfate di-hydrate, as well as: calcium sulfate, calcium sulfate ½ hydrate, calcium sulfite, calcium sulfite hydrate, and calcium hydrogen sulfite. The instant invention provides an economical and practical use for S, including the S removed from hydrocarbon fuels.

The processes of the instant invention: use less expensive raw materials, manage heat and chemical energy more efficiently, have lower transportation costs and require less handling of hazardous chemicals thereby requiring significantly less manufacturing cost.

2. Description of the Prior Art and Background

PAC—Since the 1970's it has been known in the art to prepare polynucleate (or polynuclear) aluminum complexes, also known as aluminum polymers. The first products that showed promise were poly aluminum sulfates. Processes for the production of poly aluminum sulfates are disclosed and presented in U.S. Pat. Nos. 4,284,611 and 4,536,665 and Canadian Patent Nos. 1,203,364; 1,203,664; 1,203,665; and 1,123,306, while used as a reference in this instant invention. In these patents, poly aluminum sulfate is produced by reacting sulfate solutions with sodium carbonate or sodium hydroxide to form an insoluble aluminum hydroxide gel, wherein soluble sodium sulfate is then removed.

U.S. Pat. No. 4,877,597 describes another process for the production of poly aluminum sulfate, while used as a reference in this instant invention. This process eliminated the initial step of producing an aluminum hydroxide gel by reacting aluminum sulfate with sodium aluminate.

U.S. Pat. No. 3,544,476 discloses a process for the formation of a poly aluminum chloral-sulfate, while used as a reference in this instant invention. It is prepared by first producing an aluminum chloride/aluminum sulfate solution and then basifying this solution with calcium carbonate of lime. The insoluble calcium sulfate is removed.

U.S. Pat. Nos. 2,196,016; 2,392,153; 2,392,153; 2,392,531; 2,791,486; 3,909,439, and 4,082,685 disclose processes for the production poly aluminum chloride (low basicity ACH), while used as a reference in this instant invention. These processes involve reacting aluminum oxy-hydrates or aluminum hydroxy-hydrates with hydrochloric acid (HCl) under high temperature and pressure conditions.

U.S. Pat. Nos. 4,362,643 and 4,417,996 disclose processes for the production of poly aluminum-iron complexes, while used as a reference in this instant invention. These processes involve reacting aluminum chloride/iron chloride solution with aluminum hydroxide or aluminum oxy-hydrates, as well as a poly aluminum chloride with iron.

U.S. Pat. No. 4,131,545 discloses a process for the production of poly aluminum sulfate compounds by reacting aluminum sulfate with phosphoric acid and calcium sulfate, while used as a reference in this instant invention. In the water industry, it is known at this time that PAC compounds containing sulfate are known to out perform aluminum salts, iron salts, PAC and ACH in water temperatures from approximately 34 (1° C.) to approximately 40° F. (4° C.).

The most common PAC is ACH. ACH is the most common PAC due to its higher aluminum content, which significantly increases the effectiveness of the PAC in operating temperatures over 40° F. (4° C.). U.S. Pat. Nos. 4,051,028 and 4,390,445 disclose processes for the formation of a poly aluminum hydroxychloride (ACH), while used as a reference in this instant invention. It is prepared by reacting aluminum chloride solution and aluminum hydroxide with calcium carbonate or lime. Insoluble calcium carbonate is removed. U.S. Pat. Nos. 4,034,067 and 5,182,094 disclose processes for the formation of a poly aluminum hydroxychloride, while used as a reference in this instant invention. It is prepared by reacting aluminum chloride solution with alumina or aluminum hydroxide under conditions of high temperature and pressure.

U.S. Pat. No. 5,938,970 discloses a method of forming polynucleate bi-metal hydroxide complexes (2 metals are used), while used as a reference in this instant invention. This process describes the use of a trivalent metal in combination with a divalent metal, wherein the trivalent metal is in an acid solution and is reacted with the oxide or hydroxide form of the divalent metal.

WO 97/11029 (PCT/US96/13977) and U.S. Pat. No. 5,985,234 disclose a method of forming polynucleate aluminum complexes, wherein sodium aluminate is required to be reacted with either aluminum chloride or aluminum chlorosulfate, while used as a reference in this instant invention; the reaction is carried out under conditions of high shear agitation to minimize gel formation. The reaction is to be carried out at a temperature of under 50° C. producing a milky suspension which clears over time.

At this time, ACH is known to be prepared by four methods. The first method is by reacting alumina and/or aluminum hydroxide with aluminum chloride solution (ACS) in a single step process at elevated temperature or pressure or both. Alumina is defined in the instant invention as any mixture comprising primarily aluminum oxy-hydrates and/or aluminum hydroxy-hydrates as those occur in nature and as purified from raw bauxite. Raw bauxite is purified by the Bayer process which utilizes the amphoteric nature of aluminum, which allows aluminum to be soluble at high pH as well as at low pH. Other metals do not exhibit this characteristic. Thereby aluminum is purified from other metals at a pH of approximately greater than 10.0 and at high enough operating temperature to flow the aluminum oxy- and hydroxy-hydrates. The second method is by reacting HCl with an excess of alumina and/or aluminum hydroxide at elevated pressure and/or temperature. The third process is by reacting alumina and/or aluminum hydroxide with HCl and metal carbonates or metal oxides at elevated temperature and/or pressure. The fourth method, which is disclosed in U.S. Pat. No. 5,904,856, presents a method of acidifying cement in HCl or ACS. A consequence of the second and the third process is large amounts of non-reacted aluminum hydroxide material that have to be returned to the process, which makes the process considerably more expensive. A consequence of the third process is a frothing of the carbonates in the reaction vessel; further, these products do not dry well should one desire a dry final aluminum polymer. The first and fourth processes are very expensive requiring the transport of large quantities of ACS. The second, third, and fourth processes are very expensive requiring the transportation of large quantities of HCl. Depending upon the concentration, HCl is at least approximately 65 percent water and ACS is at least approximately 60 to 90 percent water; therefore, the transportation of HCl or ACS requires the transportation and handling of large quantities of water and is therefore not economical. A consequence of the fourth process is the cost of first preparing the sintered cement containing $Al_2O_3$ and ClO. A consequence of all these processes is a purity limitation of the bauxite, if bauxite is used, as metal impurities in some forms of bauxite cannot be polymerized in the PAC when the PAC is used for drinking water purification.

All of these PAC and MP patent(s) are incorporated herein as a reference. All of these processes are limited with regard to the starting materials. Per any of these processes, large amounts of HCl or ACS or other metal acid solution must be handled. Per any of these processes, to prepare the ACS, HCl must be used. In summary, all require transportation, storage, and handling of large quantities of hazardous chemicals.

Further, the drinking water industry is placing restrictions on the amount of soluble aluminum in the final water product. Industrial processes have for years restricted aluminum salt coagulation to eliminate soluble aluminum in the final purified water. PAC(s) do not produce soluble aluminum in the final water. MP's do not place a soluble metal into the water. Due to requirements in both portable and industrial water coagulation, a safer, simpler and more economical process is needed for the manufacture of PAC(s) and MP(s).

Energy—None of these processes manage heat or chemical energy in an efficient manner. All of these processes require adding heat to the PAC or MP reactor and require heat in the preparation of alumina with no consideration given to the exothermic nature of either HCl or ACS formation. All of these processes require the preparation of HCl or delivery of HCl prior to ACS manufacture, while there are significant amounts of potential chemical energy available in the conversion of sodium chloride to HCl and in the conversion of aluminum to ACS utilizing HCl. Finally, none of these processes investigate either the use of $H_2SO_4$ and/or $H_2SO_3$ for the preparation of HCl, the very exothermic production of $H_2SO_4$ and/or $H_2SO_3$ from S or the very exothermic formation of HCl from a metal chloride salt reacting with $H_2SO_4$ and/or $H_2SO_3$, all of which present the ability to produce heat energy, steam and electricity.

HCl—Other than the lost energy and the cost of purchase, HCl transportation has many issues, which include increased cost and environmental concerns. HCl has to be transported and suitable ventilation has to be arranged in order to eliminate the release of Hydrogen Chloride gas, HCl(g). Further, aqueous chlorine (Cl), or the chloride ion, is produced from aqueous HCl. The chlorine ($Cl_2$) production process is an expensive one that requires drying and refrigeration prior to storage. The most significant issue with $Cl_2$ is storage. $Cl_2$ is an extremely hazardous chemical to store; therefore, storage of $Cl_2$ is expensive. The hazardous nature of $Cl_2$ has, in recent years, caused many water purification facilities to reevaluate the usage of $Cl_2$ versus bleach or other disinfectants.

Upon contact with water, $Cl_2$ forms both the chloride ion and the chlorite ion. The chlorite ions are decomposed into chloride ions with temperature. The addition of heat to large volumes of liquid is also very expensive. Moreover, HCl must be stored and transported in polymer-lined containers where the releases of HCl(g) vapors must be controlled. In summary, the production and transportation of HCl and/or $Cl_2$ is both expensive and hazardous.

ACS—ACS is formed by the reaction of HCl with aluminum hydroxide, alumina (aluminum hydroxide and/or aluminum oxide in the dry or hydrate form) or aluminum. While ACS can be prepared from bauxite, this is not preferred in most applications because the acidification of aluminum in bauxite to ACS can also acidify any other metal impurities that may be present in the raw bauxite. Formation of ACS also releases HCl(g), which must be controlled. This is an expensive process. Therefore, in summary, the current processes always provide complications leading to increases in the cost of the final product, as well as many safety concerns which must be managed.

Disinfectants and oxidants—Further yet, in all applications of water purification, there are efforts to eliminate the formation of chloro-organic compounds, which have been found to be at least one of: toxic, carcinogenic, teratogenic and any combination therein. The drinking water industry is limiting $Cl_2$ and bleach disinfection, investigating alternative disinfectants such as $H_2O_2$, $O_2$, ozone ($O_3$) and chlorine dioxide ($ClO_2$). The power industry has learned that those same chloro-organic compounds prematurely contaminate demineralizer beds, thereby resulting in the use of such alternative such as $H_2O_2$, $O_2$, $O_3$ and $ClO_2$. The paper industry has learned that those same chloro-organic compounds are found in both the final paper product and in the plant wastewater, thereby requiring investigation of alternatives such as $H_2O_2$, $O_2$ and $O_3$. The manufacture of $O_3$ requires $O_2$, which is an expensive product formed by either separation of air or electrolysis of water. Also, $ClO_2$ is an extremely hazardous chemical to transport, thereby requiring on-site generation from other $Cl_2$ compounds, such as bleach (hypochlorite), chlorite and chlorate. Previous work in the manufacture of chlorite and chlorate is referenced herein in U.S. Pat. Nos. 2,092,944; 2,092,945; 2,194,494; 2,323,180; 2,616,783; 2,833,624; 3,101,248; 3,450,493; 3,760,065; 3,760,065; 3,828,097; 3,997,462; 4,081,520; 4,086,329; 4,087,515; 4,421,730; 4,465,658; 4,473,540; 4,683,039; 5,091,166; 5,091,167; 5,116,595; 5,205,995; 5,366,714; 5,593,653; 5,597,544; 5,639,559; and 6,251,357; along with 2189289 from CA; 55-098965 from JP and 56-92102 from JP. All of these patents are used as a reference to the instant invention.

While there are many methods to prepare $H_2O_2$, there are two primary chemical manufacturing processes: the hydroquinone (HQ) process and the sulfuric acid/electrolysis (SAE) process. Historically, SAE was the preferred process until the 1960's and 1970's wherein industry converted to HQ due to the operating cost savings of eliminating the electrical cost associated with SAE. However, by its nature, HQ has a limitation of organic contamination, which is due to the use of an organic chemical (hydroquinone) as a catalyst. Further, the discovery of chloro-organic toxicity has lead industry to require more pure forms of $H_2O_2$. In $H_2O_2$ manufacturing, membranes have been discussed as methods of $H_2O_2$ purification. U.S. Pat. Nos. 4,879,043 and 6,333,018 present the use of reverse osmosis membrane technology as a final purification step in the production of $H_2O_2$ manufactured by HQ, while used as a reference in this instant invention. U.S. Pat. Nos. 5,215,665; 5,262,058 and 5,906,738 present the use of reverse osmosis membrane technology in combination with cabonic resin technology as final purification steps in the production of $H_2O_2$ manufactured by HQ, while used as a reference in this instant invention. U.S. Pat. Nos. 5,851,042 and 6,113,798 present the use of converting contaminant particles by reacting said particles with micro-ligands, then separating said reaction products with membranes as a final purification step in the production of $H_2O_2$ manufactured by HQ, while used as a reference in this instant invention. U.S. Pat. No. 5,800,796 presents an electrochemical reactor wherein $O_2$ and $H_2$ are reacted across a conductive membrane containing reducing catalysts forming $H_2O_2$, while used as a reference in this instant invention. This process eliminates HQ while simplifying the process $H_2O_2$ production. However, the potential for contamination of $H_2O_2$ with heavy metals from the reducing catalyst is significant. Heavy metals contamination eliminates the potential use of $H_2O_2$ in either the production of micro-circuitry or water purification. In addition, the potential safety issues from the reaction of very explosive $O_2$ and/or $H_2$ in an electrolytic environment preclude the potential use of this process at the end-use site. U.S. Publication 20040126313 teaches the use of membrane technology in combination with SAE; however, a source of electricity is not presented. None of these references present SAE with a source of electricity. All of these $H_2O_2$ patents are incorporated herein as a reference.

While there are many methods to prepare $O_2$, the separation of air into its component gases is performed by three methods: cryogenic distillation, membrane separation and pressure swing adsorption (PSA, which includes vacuum). Conventional cryogenic distillation processes that separate air into $O_2$, Argon (Ar) and nitrogen ($N_2$) are commonly based on a dual pressure cycle. Air is first compressed and is subsequently cooled, wherein cooling is accomplished by one of four methods: 1—vaporization of a liquid, 2—the Joule Thompson effect; 3—counter-current heat exchange with previously cooled warming product streams or with externally cooled warming product streams, and 4—the expansion of a gas in an engine doing external work. The cooled and compressed air is usually introduced into two fractioning zones. The first fractioning zone is thermally linked with a second fractioning zone which is at a lower pressure. The two zones are thermally linked such that a condenser of the first zone reboils the second zone. Air undergoes a partial distillation in the first zone producing a substantially pure $N_2$ fraction and a liquid fraction that is enriched in $O_2$. The enriched $O_2$ fraction is an intermediate feed to the second fractioning zone. The substantially pure $N_2$ from the first fractioning zone is used as reflux at the top of the second fractioning zone. In the second fractioning zone, separation is completed producing substantially pure $O_2$ from the bottom of the zone and substantially pure $N_2$ from the top. When Ar is produced or removed a third fractioning zone is employed. The feed to this third zone is a vapor fraction enriched in Ar which is withdrawn from an intermediate point in the second fractioning zone. The pressure of this third zone is of the same order as that of the second zone. In the third fractioning zone, the feed is rectified into an Ar rich stream which is withdrawn from the top, and a liquid stream which is withdrawn from the bottom of the third fractioning zone and introduced to the second fractioning zone at an intermediate point. Reflux for the third fractioning zone is provided by a condenser which is located at the top. In this condenser, Ar enriched vapor is condensed by heat exchange from another stream, which is typically the enriched $O_2$ fraction from the first fractioning zone. The enriched $O_2$ stream then enters the second fractioning zone in a partially vaporized state at an intermediate point above the point where the feed to the third fractioning zone is withdrawn.

The distillation of air, which is a ternary mixture into $N_2$, $O_2$ and Ar, may be viewed as two binary distillations. One binary distillation is the separation of the high boiling point $O_2$ from the intermediate boiling point Ar. The other binary distillation is the separation of the intermediate boiling point Ar from the low boiling point $N_2$. Of these two binary distillations, the former is more difficult, requiring more reflux and/or theoretical trays than the latter. Ar—$O_2$ separation is the primary function of the third fractioning zone and the bottom section of the second fractioning zone below the point where the feed to the third zone is withdrawn. $N_2$—Ar separation is the primary function of the upper section of the second fractioning zone above the point where the feed to the third fractioning zone is withdrawn. The ease of distillation is a function of pressure. Both binary distillations become more difficult at higher pressure. This fact dictates that for the conventional arrangement, the optimal operating pressure of the second and third fractioning zones is at or near the minimal pressure of one atmosphere. For the conventional arrangement, product recoveries decrease substantially as the operating pressure is increased above one atmosphere mainly due to the increasing difficulty of the Ar—$O_2$ separation. There are other considerations, however, which make elevated pressure processing attractive. Distillation column diameters and heat exchanger cross sectional areas can be decreased due to increased vapor density. Elevated pressure products can provide substantial compression equipment capital cost savings. In some cases, integration of the air separation process with a power generating gas turbine is desired. In these cases, elevated pressure operation of the air separation process is required. The air feed to the first fractioning zone is at an elevated pressure of approximately 10 to 20 atmospheres absolute. This causes the operating pressure of the second and third fractioning zones to be approximately 3 to 6 atmospheres absolute. Operation of the conventional arrangement at these pressures results in very poor product recoveries due to the previously described effect of pressure on the ease of separation. Previous work to cryogenically separate air into its components can be referenced in U.S. Pat. Nos. 5,386,692; 5,402,647; 5,438,835; 5,440,884; 5,456,083; 5,463,871; 5,582,035; 5,582,036; 5,596,886; 5,765,396; 5,896,755; 5,934,104; 6,173,584; 6,202,441; 6,263,700; 6,347,534; 6,536,234; 6,564,581; 5,341,646; 5,245,832; 6,048,509; 6,082,136; 6,499,312; 6,298,668; and 6,333,445. All of these cryogenic patents are incorporated herein as a reference.

It is also well known in the chemical industry to separate air with membranes. Two general types of membranes are known in the art: organic polymer membranes and inorganic membranes. These membrane air separation processes are improved by setting up an electric potential across a membrane that has been designed to be electrically conductive. Previous work performed to separate air into its components with membranes can be referenced in U.S. Pat. Nos. 6,523, 529; 6,761,155; 6,277,483; 5,820,654; 6,293,084; 6,360,524; 6,551,386; 6,562,104; 6,361,583; 6,565,626; 6,572,678; 6,572,679; 6,579,341; 6,592,650; 6,372,010; 5,599,383; 5,820,654; 5,820,655; 5,837,125; 6,117,210; 5,599,383; 5,902,370; 6,117,210; 6,139,810; 6,403,041; and 6,767,663. All of these membrane patents are herein incorporated by reference. While these patents present many innovations in membrane technology, none present use of a membrane wherein the energy of air separation is obtained from the formation energy of at least one selected from a list consisting of $SO_2$ from the burning of S in air or $O_2$, $SO_3$ from the oxidation of $SO_2$, $H_2SO_4$ formation from $SO_3$, $H_2SO_3$ formation from $SO_2$, halide acid formation and any combination therein.

It is also well known to separate air into $O_2$ and $N_2$ with PSA (herein to include vacuum swing adsorption). Previous work performed to separate air into its components with PSA can be referenced in U.S. Pat. Nos. 6,572,838; 6,761,754; 6,780,806; 3,793,931; 4,481,018; 4,544,378; 5,464,467; 5,810,909; 5,868,818; 5,885,331; 6,350,298; 6,171,370; 6,423,121; 6,649,556; 6,652,626; 4,013,429; 4,264,340; 4,329,158; 4,685,939; 5,137,548; 5,152,813; 5,258,058; 5,268,012; 5,354,360; 5,413,625; 5,417,957; 5,419,891; 5,454,857; 5,672,195; 6,004,378; 6,357,601; 6,321,915; 6,315,884; 6,298,664; 6,497,098; 6,510,693; and 6,516,787. All of these PSA patents are herein incorporated by reference. While these patents present many innovations in PSA technology, none teach wherein the energy of manufacture is obtained from the formation energy of at least one selected from a list comprising $SO_2$ from the burning of S in air or $O_2$, $SO_3$ from the oxidation of $SO_2$, $H_2SO_4$ formation from $SO_3$, $H_2SO_3$ formation from $SO_2$, halide acid formation and any combination therein.

An additional method for the manufacture of $O_2$ is the electrolysis of water ($H_2O$). Previous work in the electrolysis of $H_2O$ can be referenced in U.S. Pat. Nos. 6,723,220; 5,585, 882; 6,572,759; 6,551,735; 6,471,834; 6,361,893; 6,338,786; and 6,336,430. All of these electrolysis patents are herein incorporated as reference. While these patents present many innovations in electrolysis technology, none present wherein the energy of manufacture is obtained from the energy of formation from at least one selected from a list comprising $SO_2$ from the burning of S in air or $O_2$, $SO_3$ from the oxidation of $SO_2$, $H_2SO_4$ formation from $SO_3$, $H_2SO_3$ formation from $SO_2$, halide acid formation and any combination therein.

It is well known in the art of methods and processes to manufacture oxides of halogens to form said halogen oxide from a metal halogen salt via electrolysis. While the most common metal is sodium, calcium is often used. While the most common halogen is chlorine, bromine, fluorine and iodine are often used. Previous work in the production of halogen oxide manufacture can be referenced in U.S. Pat. Nos. 5,342,601; 5,376,350; 5,409,680; 5,419,818; 5,423,958; 5,458,858; 5,480,516; 5,523,072; 5,565,182; 5,599,518; 5,618,440; 5,681,446; 5,779,876; 5,851,374; 5,858,322; 5,916,505; 5,972,196; 6,004,439; 6,203,688; 6,306,281; 6,436,435; 6,740,223; 6,761,872; 6,805,787; and 6,814,877. All of these patents in the preparation of an oxide form of a halogen are herein incorporated by reference. While these patents present many innovations in the production of halogen oxides, none present wherein the energy of manufacture is obtained from the energy of formation from at least one selected from a list comprising $SO_2$ from the burning of S in air or $O_2$, $SO_3$ from the oxidation of $SO_2$, $H_2SO_4$ formation from $SO_3$, $H_2SO_3$ formation from $SO_2$, halide acid formation and any combination therein.

Acid Manufacture (Sulfuric, Sulfurous and Hydrochloric)—HCl is known in the art to be produced by 2 processes, the Electrolysis Unit (EU) process and the Sulfuric Acid Process (SAP). The raw materials for EU production of HCl include sodium chloride, water, and electricity. The raw materials for SAP production of HCl include sodium chloride, $H_2SO_4$ and water.

Sulfuric acid has many forms and equivalents, all of which are based upon the sulfoxy ($S_xO_y$) anion moiety, wherein X can vary from 1 to 2 and Y can vary from 2 to 8. Examples would be sulfurous acid, sulfuric acid, oleum and persulfuric acid. As defined in this instant invention a sulfoxy acid is any proton donating acid containing a sulfoxy moiety. $H_2SO_4$ and $H_2SO_3$ are manufactured primarily by two competing processes, the condensation process and the contact process. In both cases, in a sulfuric acid plant, which will be herein after referred to as the sulfuric acid reactor (SAR), S is combusted in air and/or $O_2$ to produce $SO_2$. $SO_2$ is then converted into $SO_3$ in the contact process with the use of a catalyst, usually $V_2O_5$, in the presence of excess air at a temperature of about 400-450° F. (204-233° C.). In either process, $SO_3$ can be slowly converted into $H_2SO_4$ by contact of said $SO_3$ with $H_2O$. In the condensation process, the combusted $SO_2$ is contacted with $H_2O$ quickly forming $H_2SO_3$ and slowly forming $H_2SO_4$. In the contact process, said $SO_3$ is contacted with $H_2SO_4$ forming $H_2S_2O_7$ (oleum); oleum is then contacted with $H_2O$ forming 100 percent $H_2SO_4$. Often the oleum step is bypassed by directly reacting said $SO_3$ with $H_2SO_4$ and $H_2O$, thereby forming $H_2SO_4$. It is difficult to obtain 100 percent $H_2SO_4$ with the condensation process.

Bleach Manufacture—Bleach, a group IA or group IIA metal in solution with a hypohalite, is currently manufactured by two processes, electrolysis and acid/base blending. In electrolysis, a salt solution comprising a group IA or group IIA metal halide is placed in an electrolysis cell, wherein the salt is separated into the corresponding halide acid and the corresponding group IA or group IIA hydroxide, and wherein said halide acid and said group IA or group IIA hydroxide is allowed to mix, therein forming the corresponding group IA or group IIA metal in solution with the hypohalite while releasing hydrogen gas. In acid/base blending, a cold dilute solution of a group IA or group IIA metal hydroxide is mixed with either a halogen acid in aqueous form or with a halogen acid gas, wherein is formed the corresponding group IA or group IIA metal in solution with the hypohalite while releasing hydrogen gas. In all situations, concentration of the group IA or group IIA metal hypohalite in solution may be increased by adding an excess of a base, preferably the group IA or group IIA hydroxide until a concentration of about 15 percent of the group IA or group IIA metal hypohalite is obtained.

Under current manufacturing practices, the group IA or group IIA metal hydroxide used in the formation of a bleach is formed by the electrolysis of the corresponding group IA or group IIA salt in water. Therefore, the manufacture of any bleach is currently constrained by the cost and/or availability of electricity to perform electrolysis.

Previous work in the manufacture of a group IA or group IIA hydroxide are referenced herein in U.S. Pat. Nos. 3,976,556; 4,025,405; 4,100,050; 4101,395; 4,187,350; 4,221,644; 4,240,883; 4,295,944; 4,486,276; 4,586,994; 4,969,981; 6,488,833; along with A 1 067 215 from EP; 1120481 from EP; 55-89486 from JP; 1-234585 from JP; and 10-110287 from JP. All of these bleach patents are herein incorporated by reference.

Gypsum Manufacture—Gypsum, calcium sulfate di-hydrate, is a widely used product being the major component in the manufacture of wall-board or SHEETROCK (dry-wall). Gypsum is currently manufactured by three competing processes the mining of calcium sulfate di-hydrate, the hydration of mined calcium sulfate and the scrubbing of waste sulfoxy acid gases by an oxide of calcium, usually calcium oxide and/or calcium hydroxide. In all cases, the purity of manufactured gypsum is an issue. In the case of mined calcium sulfate and calcium sulfate di-hydrate, contaminants from the earth are an issue. And, in the case of scrubbing waste sulfoxy acid gases, impurities in the gas stream are often also oxidized and left in the gypsum product.

Previous work performed to purify a sulfoxy acid gas, thereby forming gypsum are herein referenced in U.S. Pat. Nos. 3,976,747; 4,312,280; 4,590,049; 4,782,772; 4,867,955; 4,915,920; 4,931,264; 5,006,323; 5,345,884; 5,538,703; 5,544,596; 5,551,357; 5,795,548; 5,814,288; 6,290,921; 6,309,996 and 6,912,962, along with foreign patents 40 39 213 from DE, 40 23030 from DE, 2 107207 from GB and 99/5822/6 from WO. All of these gypsum patents are herein incorporated by reference.

Transportation of Hazardous Chemicals and Sulfur Management—As population density increases, the transportation of hazardous chemicals, including acids and disinfectants, leads to an increased incidence of spills while the consequences of spills become more serious. While solutions of halide acid, hypohalite and halite are safer disinfectants for transportation, handling, and storage, the cost of manufacture of these disinfectants has limited their use. A more economical process is required for the manufacture of $O_2$, $ClO_2$, halide acid, hypohalite, and halate. In addition, while the US EPA is requiring the removal of sulfur from hydrocarbon fuels, thereby limiting atmospheric releases of oxides of sulfur from combustion exhaust, said removal is creating an abundance of sulfur, such that the petroleum refining industry is in need of a way to dispose of said abundance of sulfur.

SUMMARY OF THE INVENTION

A primary object of the instant invention is to devise an effective, efficient, and economically feasible process for producing polynucleate aluminum and/or polynucleate metal complexes.

Another object of the instant invention is to devise an effective, efficient, and economically feasible process for producing polynucleate aluminum and/or polynucleate metal complexes without the transportation and handling of hazardous materials.

Still another object of the instant invention is to devise an effective, efficient, and economically feasible process for producing polynucleate complexes that contain metals in addition to and/or instead of aluminum.

Still yet another object of the instant invention is to devise an effective, efficient, and economically feasible process for producing disinfectants and/or oxidants, preferably those utilized in the water treatment and the paper industries, specifically: $O_2$, $O_3$, $H_2O_2$, NaOH, $H_2O_2$, hypohalite, halite, halate, halogen oxides and halide acids.

Still further yet another object of the instant invention is to devise an effective, efficient, and economically feasible process for producing HCl and $H_2SO_4$, as well as metal sulfites, metal bisulfites and metal sulfates.

Still further yet another object of the instant invention is to devise an effective, efficient, and economically feasible process for using the energy of formation from at least one selected from a list consisting of: $SO_2$ from sulfur and air or oxygen, $SO_3$ from $SO_2$ and air or oxygen with a catalyst, $H_2SO_4$ from oleum and water, $H_2SO_4$ from $H_2SO_3$, $H_2SO_4$ and water, and any combination therein to make steam, wherein said steam is used to generate electricity to manufacture by electrolysis at least one selected from a list consisting of: $O_2$ and $H_2$ from $H_2O$, $O_3$ from $O_2$, $H_2O_2$ from water using $H_2SO_4$ as a catalyst, a metal hydroxide and a hydrogen halide from said metal halide, a hypohalite, a halite, a halate, a halogen oxide, and any combination therein.

Still further yet also another object of the instant invention is to devise an effective, efficient, and economically feasible process for using the energy of formation from at least one selected from a list consisting of: $SO_2$ from sulfur and air or oxygen, $SO_3$ from $SO_2$ and air or oxygen with a catalyst, $H_2SO_4$ from oleum and water, $H_2SO_4$ from $H_2SO_3$, $H_2SO_4$ and water, and any combination therein to make steam, wherein said steam is used to generate mechanical energy to manufacture at least one selected from a list consisting of: $O_2$ and $H_2$ from $H_2O$.

Still further also yet another object of the instant invention is to devise an effective, efficient, and economically feasible process for the chemical manufacture of bleach, wherein the group IA or group IIA metal hydroxide is manufactured without the need of electrolysis.

Still also further yet another object of the instant invention is to devise an effective, efficient, and economically feasible process for the chemical manufacture of gypsum, wherein the purity of the gypsum is increased.

And, still also further yet another object of the instant invention is to devise an effective, efficient, and economically feasible process for the chemical manufacture of gypsum, wherein the sulfur incorporated in said gypsum is from the removal of said sulfur from a hydrocarbon.

BRIEF DESCRIPTION OF THE DRAWINGS

A better understanding of the instant invention can be obtained when the following preferred embodiments are considered in conjunction with the following drawings, in which:

FIG. 1 illustrates a legend for FIGS. 2 through 12.

FIG. 2 illustrates a process flow diagram including the SACP [1], Steam Turbine and Generator [2], and Electrolysis Unit [3].

FIG. 3 illustrates a process flow diagram including the SACP [1], Steam Turbine and Generator [2], Electrolysis Unit [3], and HAR [4].

FIG. 4 illustrates a process flow diagram including the SACP [1], Steam Turbine and Generator [2], Electrolysis Unit [3], HAR [4], and MPR and/or AHR and/or MAS [12].

FIG. 5 illustrates a process flow diagram including the SACP [1], Steam Turbine and Generator [2], Electrolysis Unit [3], and Combustion Engine Generator or Fuel Cell [13].

FIG. 6 illustrates a process flow diagram including the SACP [1], Steam Turbine and Generator [2], Electrolysis Unit [3], and Air Separation Unit [14].

FIG. 7 illustrates a process flow diagram including the SACP [1], Steam Turbine and Generator [2], Electrolysis Unit [3], and Air Separation Unit [14].

FIG. 8 illustrates a process flow diagram including the SACP [1], Steam Turbine and Generator [2], Electrolysis Unit [3], HAR [4], MPR and/or AHR and/or MAS [12], and Combustion Engine Generator or Fuel Cell [13].

FIG. 9 illustrates a process flow diagram including the SACP [1], Steam Turbine and Generator [2], Electrolysis Unit [3], HAR [4], MPR and/or AHR and/or MAS [1,2], and Air Separation Unit [14].

FIG. 10 illustrates a metal hydroxide to pH adjust said metal sulfoxy salt, thereby creating said metal sulfoxy salt from any excess said sulfoxy acid while releasing water in at least one vented portion of said extruder and/or auger reactor. As FIG. 10 illustrates two vents, one for said halide acid and one for said water vapor, it is an embodiment to have one vent, two vents, or more vents. It is preferred that a heated water jacket be placed on said extruder and/or auger. It is most preferred that said water jacket flow co-current to said reaction of said metal halide salt with said sulfoxy acid. It is preferred that said extruder and/or auger and said water loop be as is known in the art of such equipment. FIGS. 10 and 11 illustrate the HAR [4], including a process flow diagram incorporating the Enclosed Halide Acid Vent [15], Enclosed $H_2O$ Vent [16], Metal Halide Salt Feeder [17], Auger with Variable Frequency Drive (VFD) [18], Sulfoxy Acid Pump with VFD [19], Controller [20], Metal Hydroxide Pump with VFD [21], pH Measurement [22], Controller [23], Water Circulation Pump [24], Vent Scrubber [25], Eductor(s) [26], Water Control Valve [27], Specific Gravity Measurement [28], Controller [29], and Burner [30].

FIG. 12 illustrates a process flow diagram incorporating the SACP [1], Steam Turbine and Generator [2], Electrolysis Unit [3], HAR [4], Slaker [5], Gypsum Unit [6], Separator(s) [7], Metal Halite Unit [8], Halogen Dioxide Unit [9], Dryer [10], Bleach Unit [1,1], and MAR and/or MPR [12].

DESCRIPTION OF THE PREFERRED EMBODIMENTS

Chemical Equilibria

Figure 2:
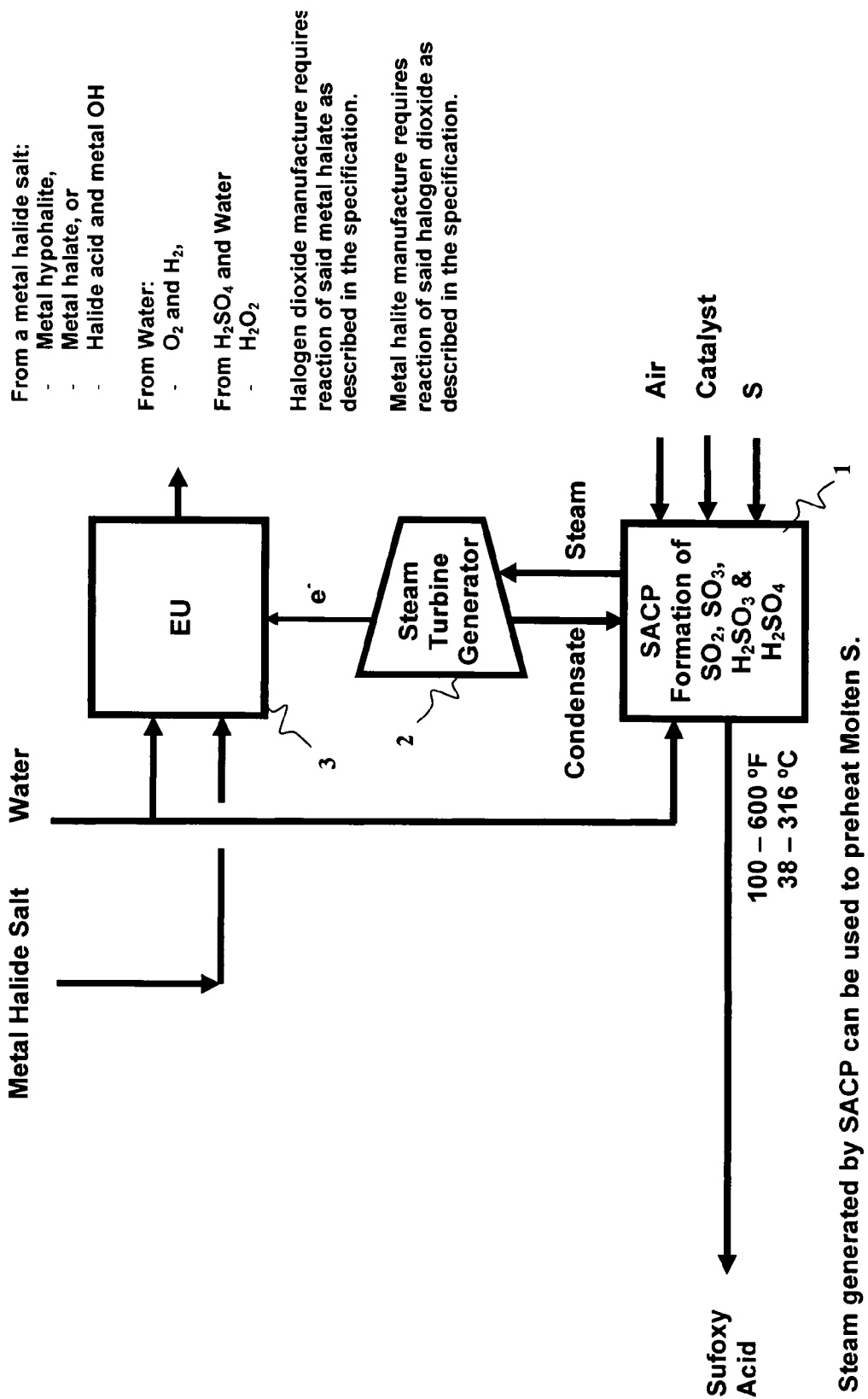
FIG. 2 illustrates in block diagram form a general description of a preferred embodiment of the proposed methods and processes to manufacture disinfectants with electrolysis, wherein the energy for electrolysis is obtained from the formation of at least one selected from a list consisting of: $SO_2$, $SO_3$, $H_2SO_3$, oleum, $H_2SO_4$ and any combination therein.
Figure 3:
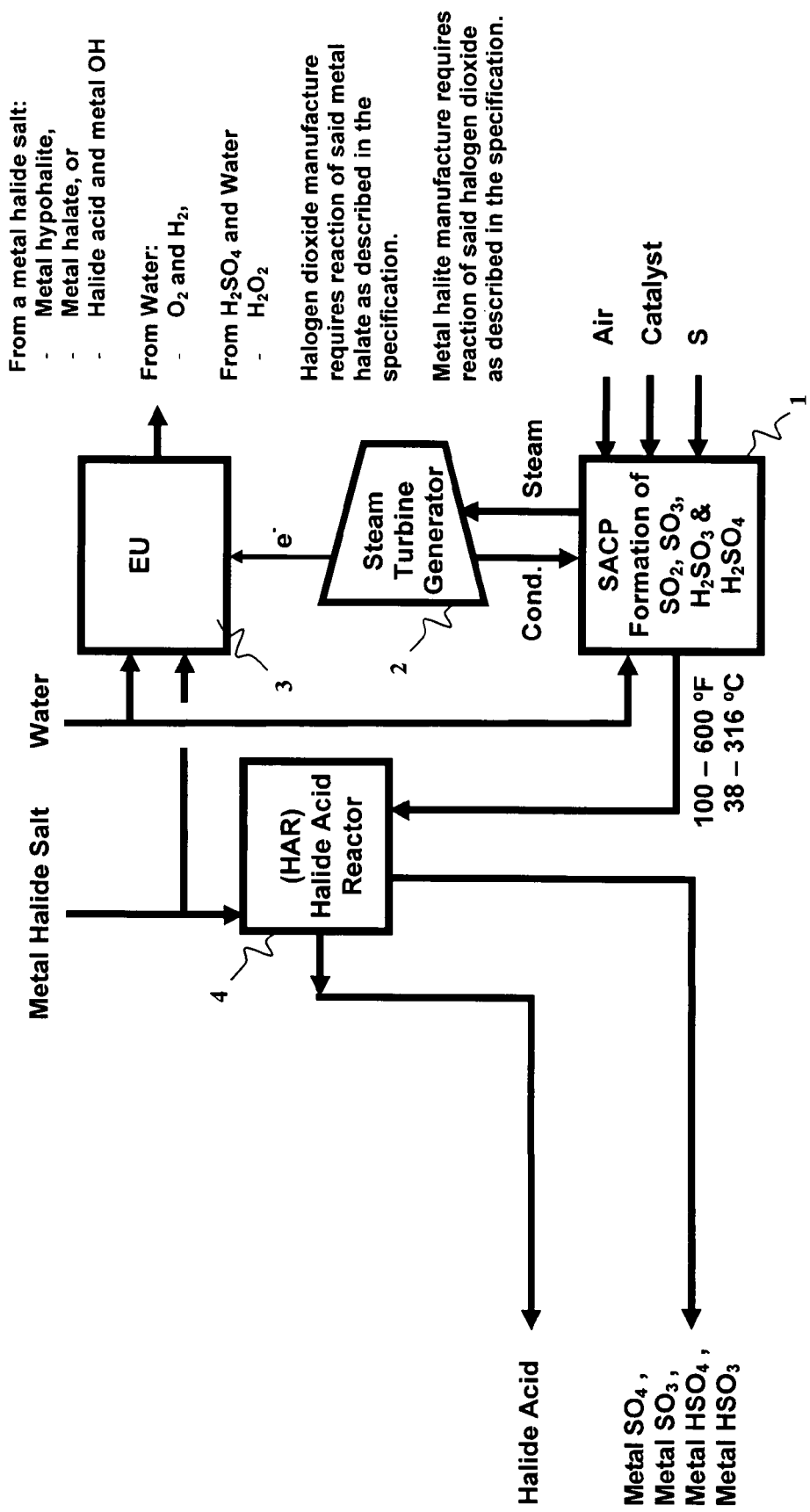
FIG. 3 illustrates in block diagram form a general description of a preferred embodiment of the above methods and processes in combination with a process for halogen acid reaction (HAR), wherein a sulfoxy acid, preferably, $H_2SO_4$ and/or $H_2SO_3$, is reacted with a metal halide salt to form the corresponding halide acid, along with the corresponding metal sulfoxy salt, most preferably the metal sulfate, sulfite or bisulfite.
Figure 4:
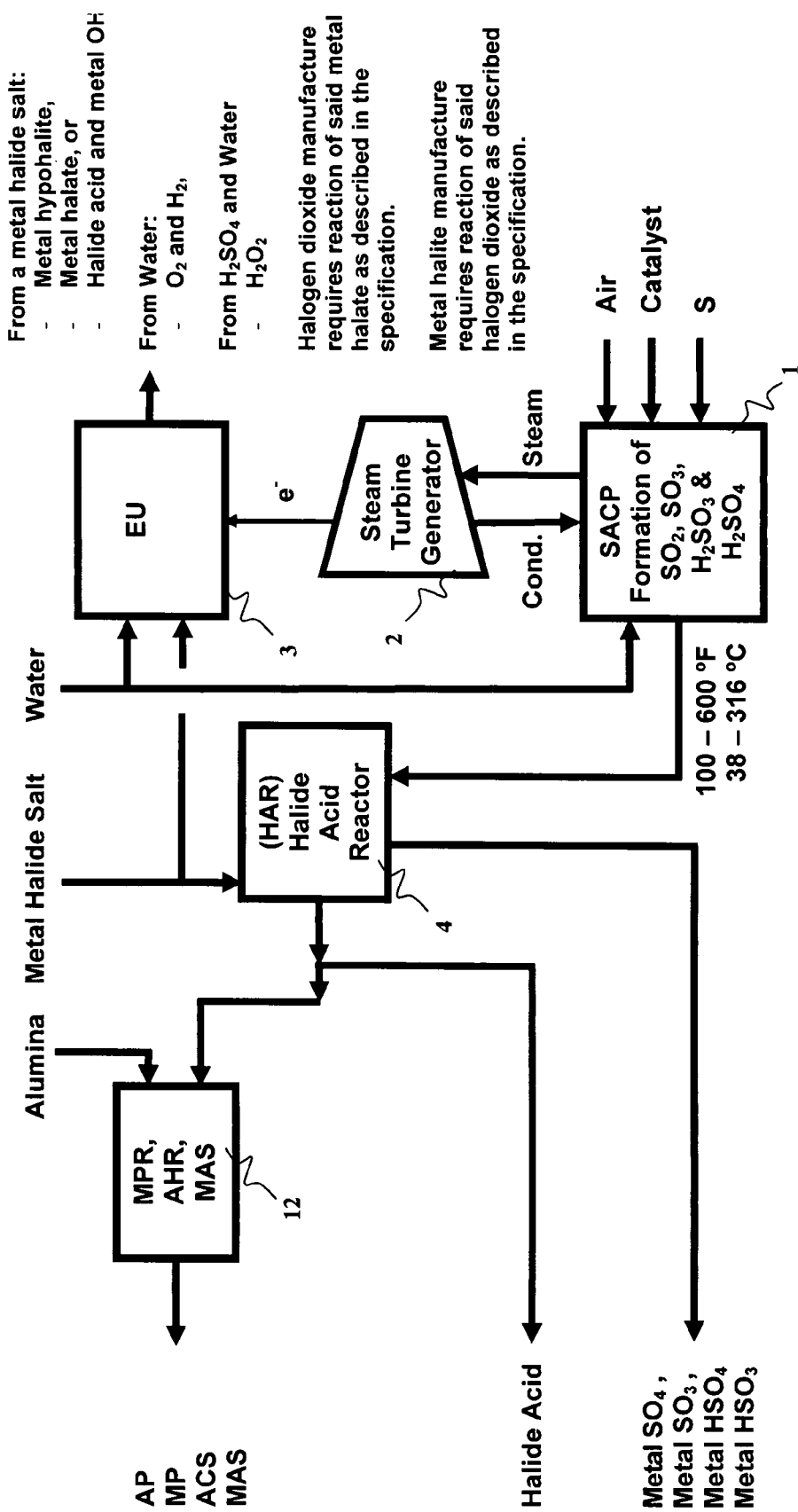
FIG. 4 illustrates in block diagram form a general description of a preferred embodiment of the methods and process in FIGS. 1 and 2 in combination with the manufacture of a PAC and/or an MP.
Figure 5:
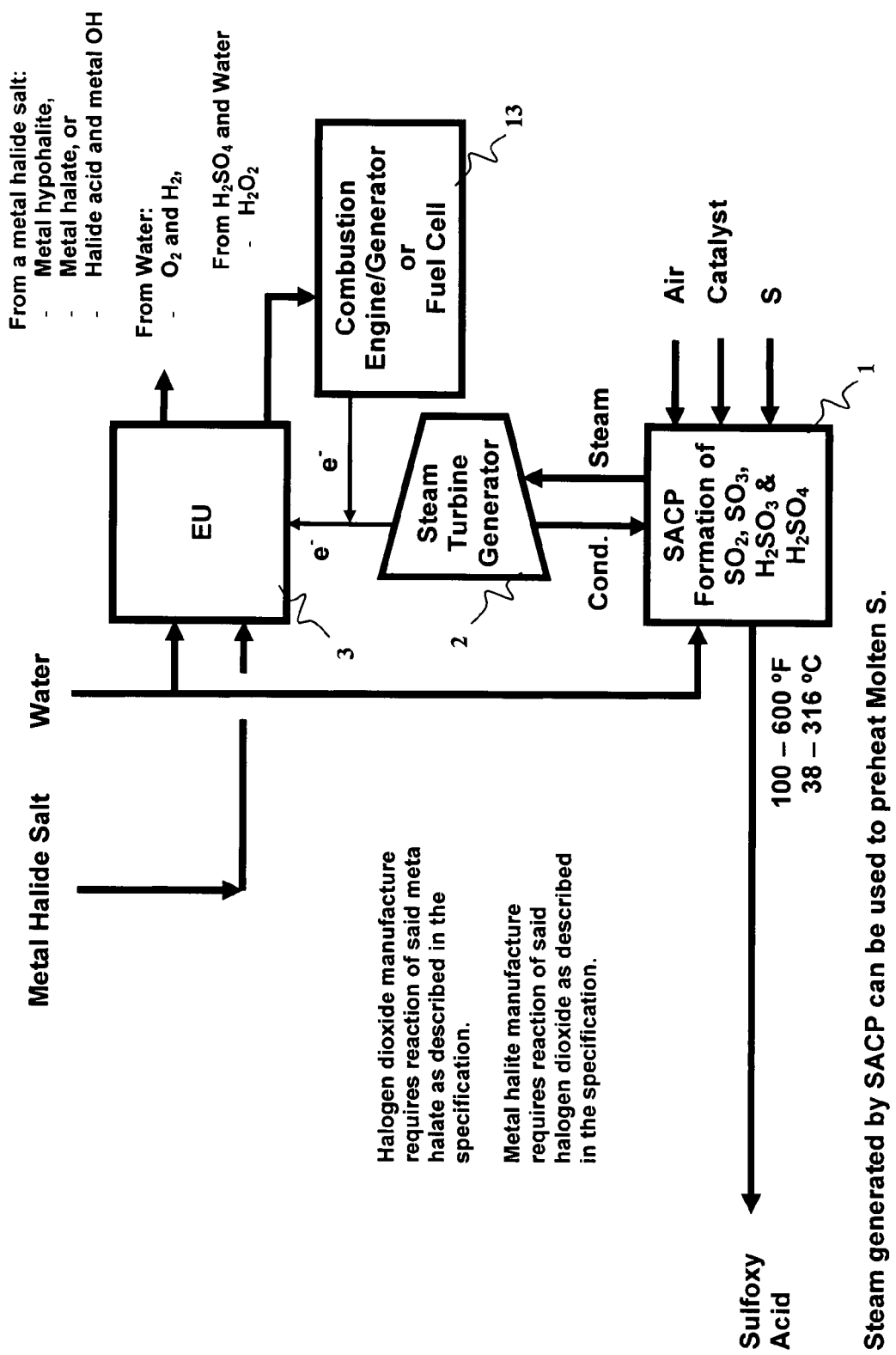
FIG. 5 illustrates in block diagram form a general description of a preferred embodiment, wherein $H_2$ produced in electrolysis is recycled as an energy source for electrolysis to improve the economics of electrolysis.
Figure 6:
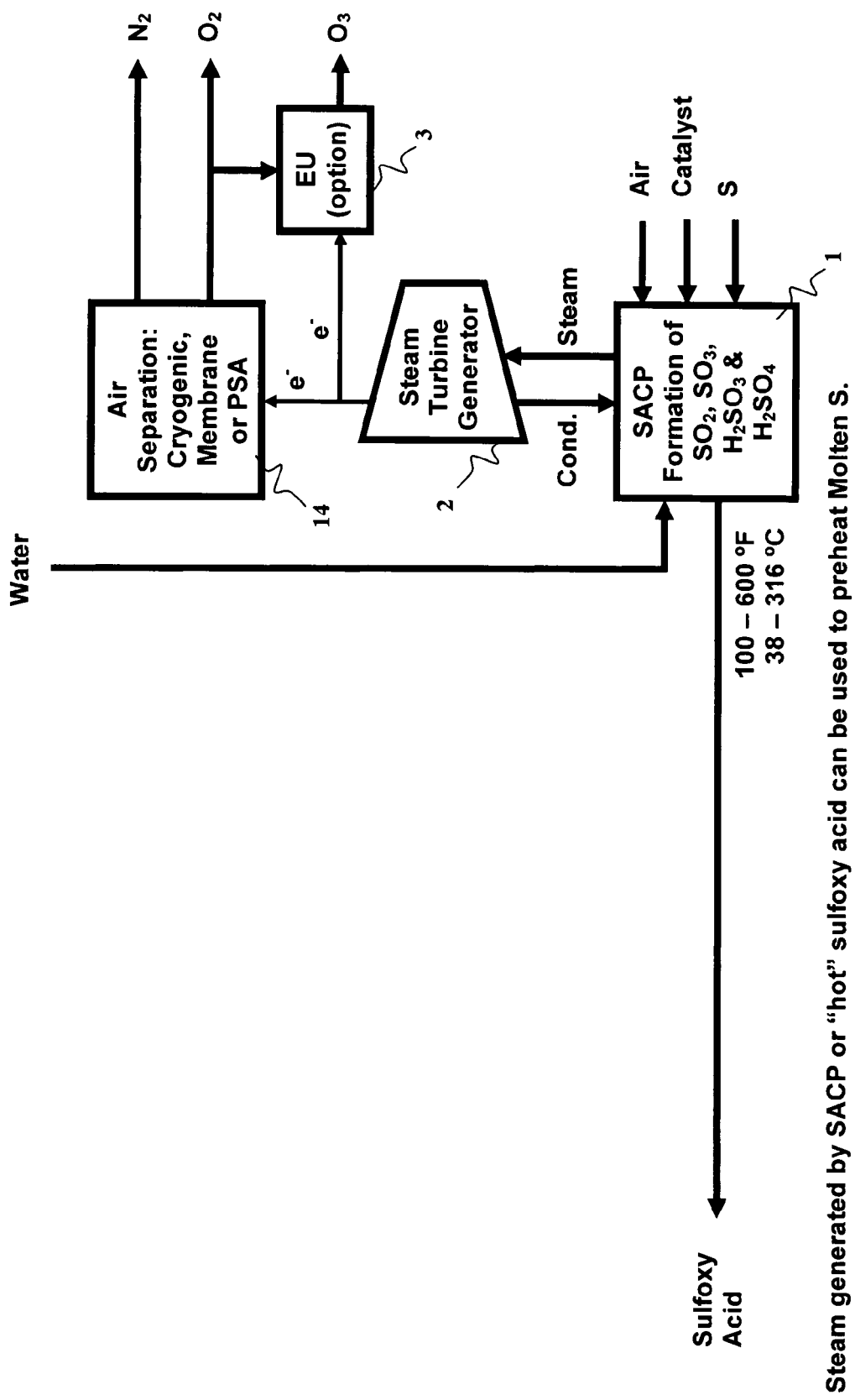
FIG. 6 illustrates in block diagram form a general description of a preferred embodiment comprising a steam turbine, wherein air separation, preferably cryogenic distillation, is used to produce $O_2$ and electrolysis is used to turn said $O_2$ into $O_3$.
Figure 7:
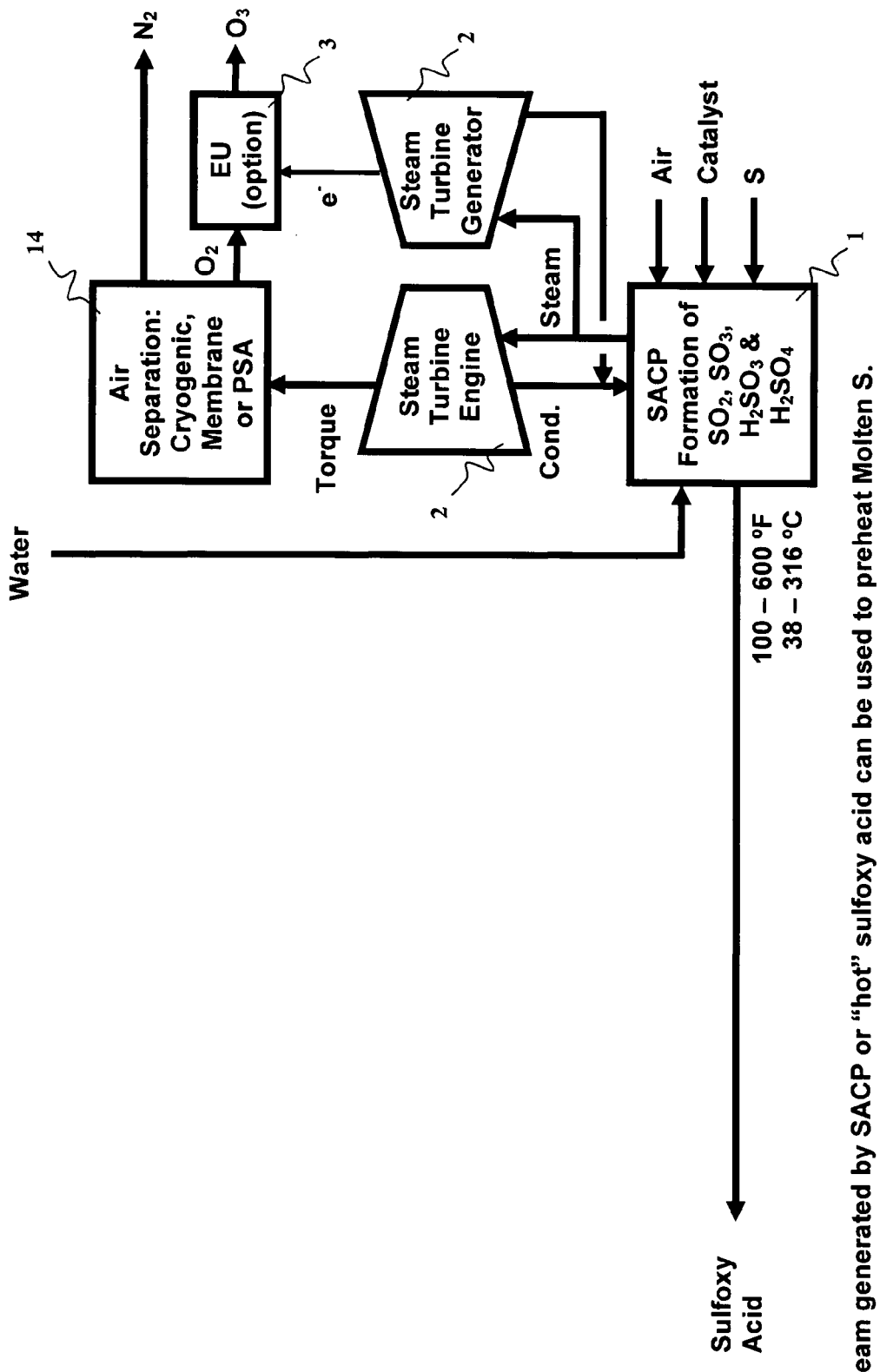
FIG. 7 illustrates in block diagram form a general description of a preferred embodiment comprising a steam engine, wherein air separation, preferably cryogenic distillation, is used to produce $O_2$ and electrolysis obtains electricity via a steam turbine/generator to turn said $O_2$ into $O_3$.
Figure 8:
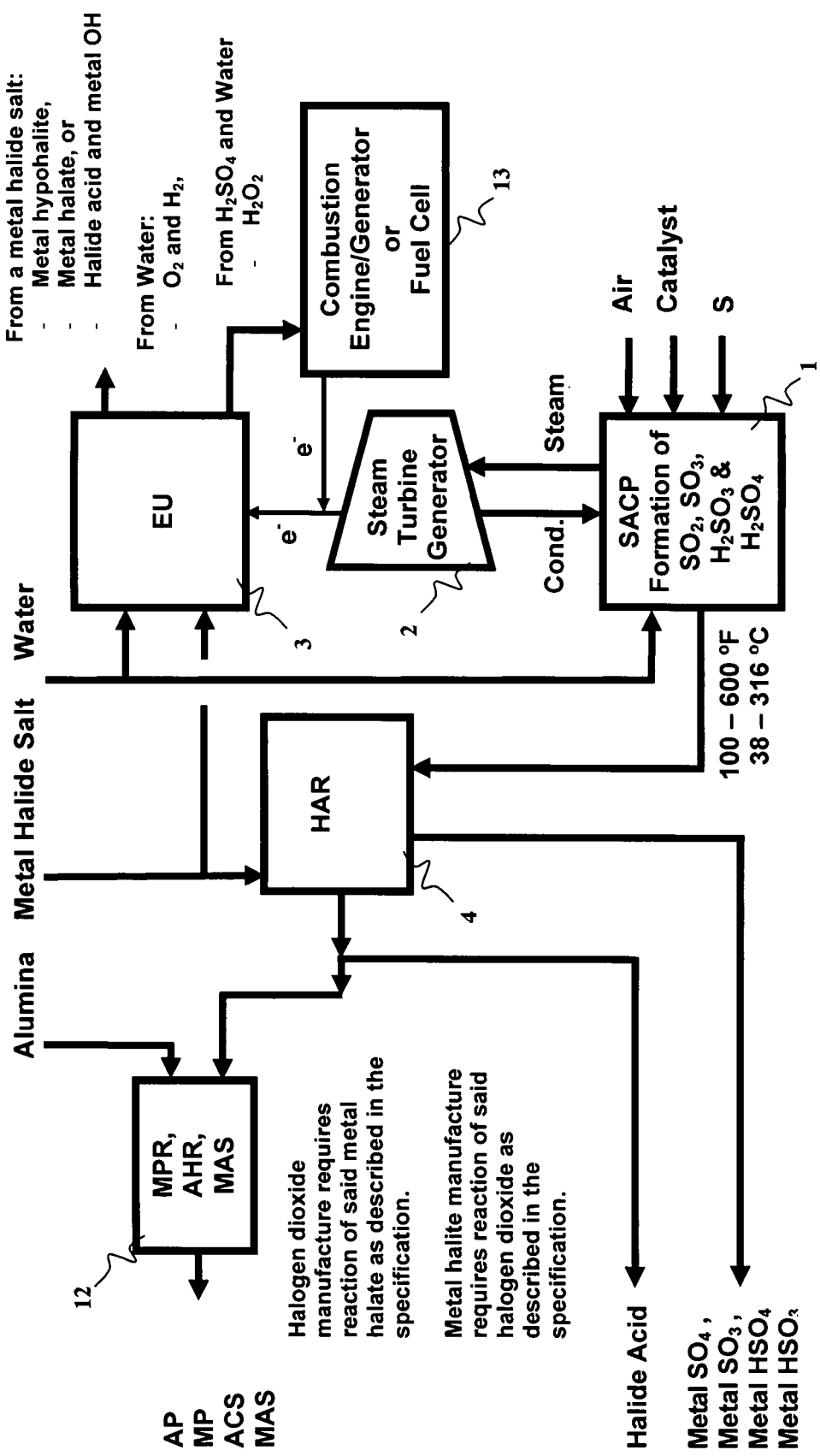
FIG. 8 illustrates in block diagram form a general description of a preferred embodiment, wherein the $H_2$ produced in electrolysis is recycled as an energy source for electrolysis to improve the economics of electrolysis.
Figure 9:
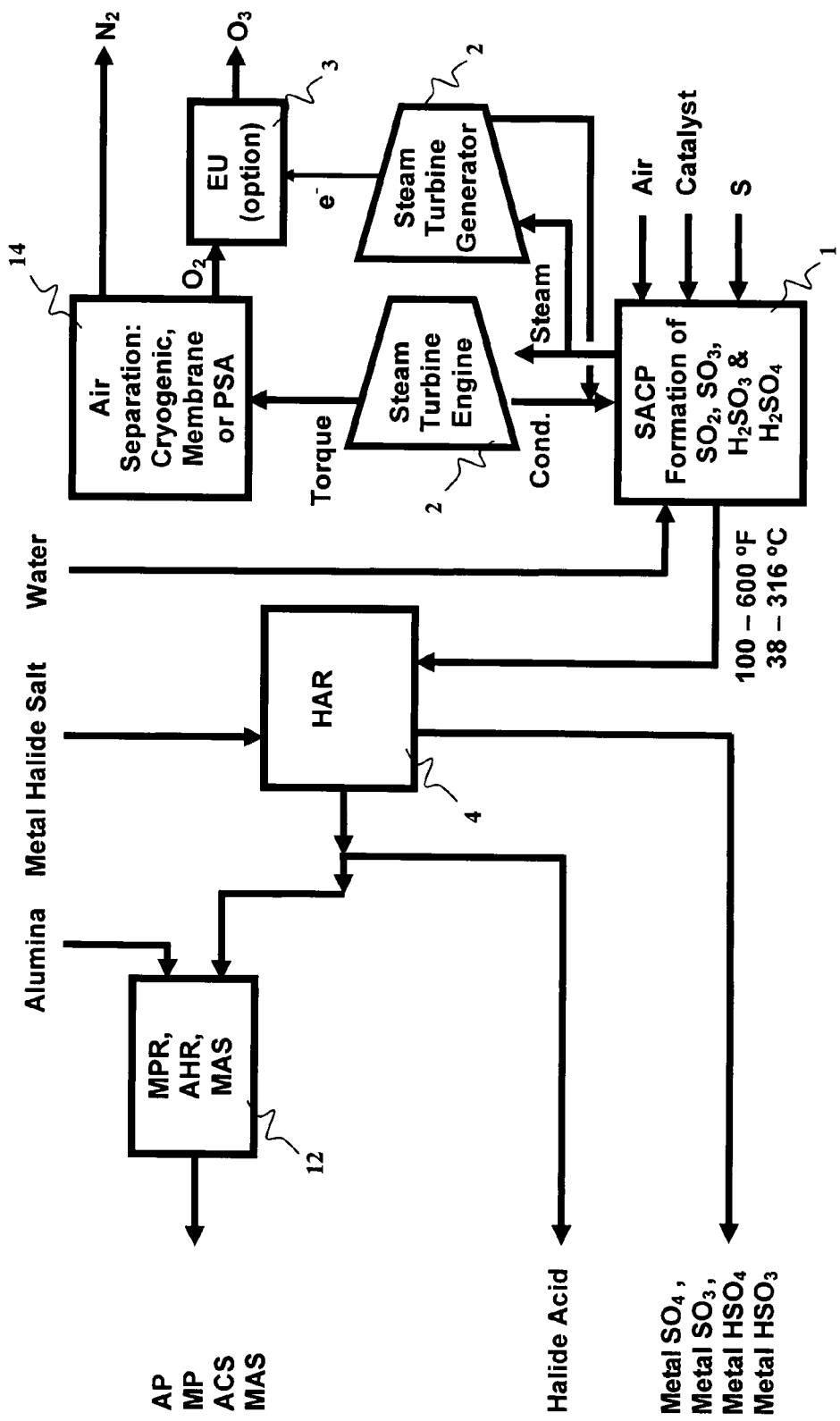
FIG. 9 illustrates in block diagram form a general description of a preferred embodiment, wherein air separation, preferably cryogenic distillation, is used to produce $O_2$; electrolysis obtains electricity via a steam turbine/generator to turn said $O_2$ into $O_3$.

Chemical Equilibria and/or reactions which comprise an aspect of the instant invention include but are not limited to:

1. $S(s) + 3/2 O_2(g) + H_2O(l) \longrightarrow H_2SO_4(l)$    +126 kcal.

2. $S(s) + O_2(g) \longrightarrow SO_2(g)$    +71 kcal.

3. $2NaCl(s) + H_2SO_4(l) \xrightarrow{450° F.} Na_2SO_4(s) + 2HCl(g)$    -15 kcal.

4. $NaCl(s) + H_2SO_4(l) \xrightarrow{150° F.} NaHSO_4(s) + HCl(g)$    +21 kcal.

5. $NaCl(Aq) + H_2O(l) \xrightarrow{e-, OH-} NaOCl(Aq) + H_2(g)$    -83 kcal.

6. $NaCl(Aq) + 3H_2O(l) \xrightarrow{e-, H+} NaClO_3(s) + 3H_2(g)$    -216 kcal.

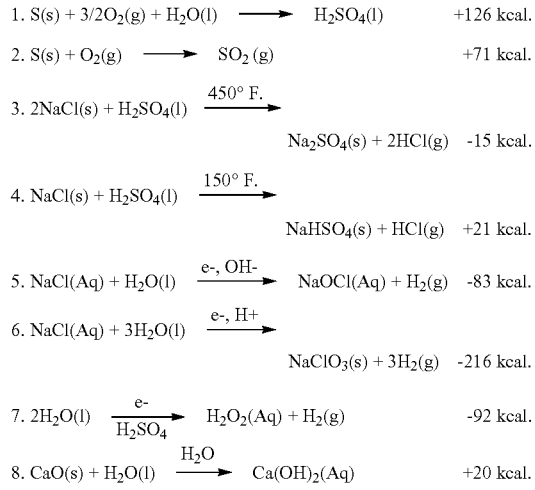

7. $2H_2O(l) \xrightarrow[H_2SO_4]{e-} H_2O_2(Aq) + H_2(g)$    -92 kcal.

8. $CaO(s) + H_2O(l) \xrightarrow{H_2O} Ca(OH)_2(Aq)$    +20 kcal.

-continued

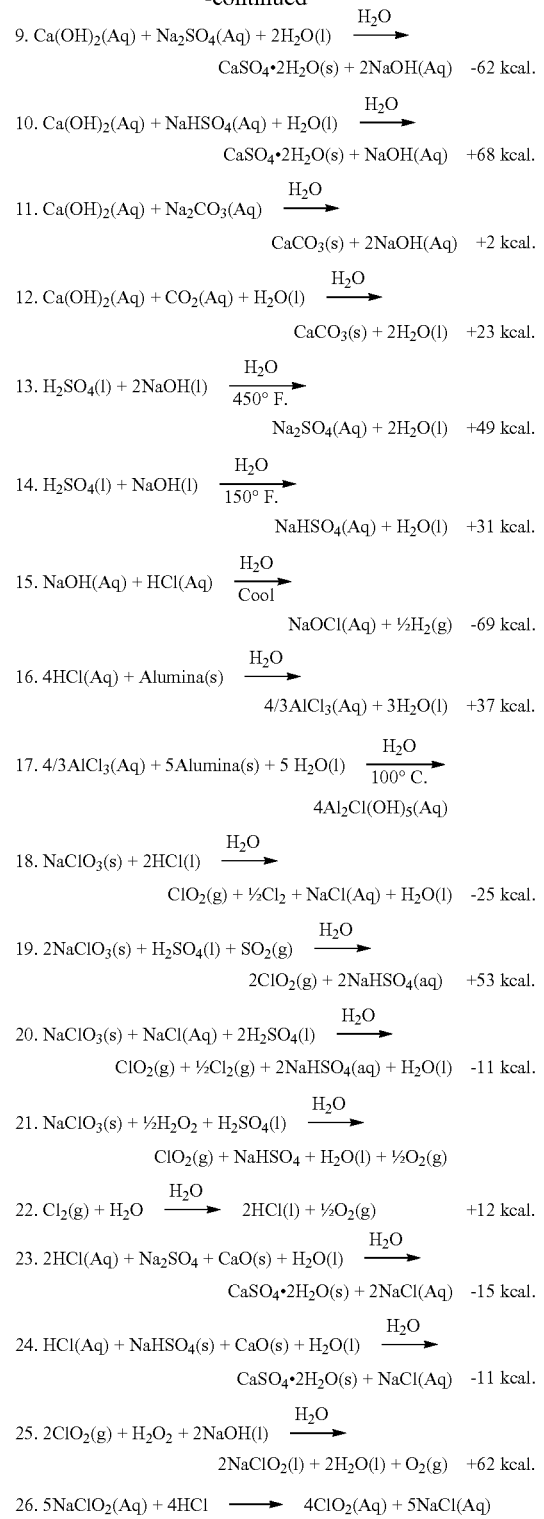

9. $Ca(OH)_2(Aq) + Na_2SO_4(Aq) + 2H_2O(l) \xrightarrow{H_2O}$
   $CaSO_4 \cdot 2H_2O(s) + 2NaOH(Aq)$  −62 kcal.

10. $Ca(OH)_2(Aq) + NaHSO_4(Aq) + H_2O(l) \xrightarrow{H_2O}$
    $CaSO_4 \cdot 2H_2O(s) + NaOH(Aq)$  +68 kcal.

11. $Ca(OH)_2(Aq) + Na_2CO_3(Aq) \xrightarrow{H_2O}$
    $CaCO_3(s) + 2NaOH(Aq)$  +2 kcal.

12. $Ca(OH)_2(Aq) + CO_2(Aq) + H_2O(l) \xrightarrow{H_2O}$
    $CaCO_3(s) + 2H_2O(l)$  +23 kcal.

13. $H_2SO_4(l) + 2NaOH(l) \xrightarrow[450° F.]{H_2O}$
    $Na_2SO_4(Aq) + 2H_2O(l)$  +49 kcal.

14. $H_2SO_4(l) + NaOH(l) \xrightarrow[150° F.]{H_2O}$
    $NaHSO_4(Aq) + H_2O(l)$  +31 kcal.

15. $NaOH(Aq) + HCl(Aq) \xrightarrow[Cool]{H_2O}$
    $NaOCl(Aq) + \frac{1}{2}H_2(g)$  −69 kcal.

16. $4HCl(Aq) + Alumina(s) \xrightarrow{H_2O}$
    $4/3 AlCl_3(Aq) + 3H_2O(l)$  +37 kcal.

17. $4/3 AlCl_3(Aq) + 5 Alumina(s) + 5 H_2O(l) \xrightarrow[100° C.]{H_2O}$
    $4Al_2Cl(OH)_5(Aq)$ 18. $NaClO_3(s) + 2HCl(l) \xrightarrow{H_2O}$
    $ClO_2(g) + \frac{1}{2}Cl_2 + NaCl(Aq) + H_2O(l)$  −25 kcal.

19. $2NaClO_3(s) + H_2SO_4(l) + SO_2(g) \xrightarrow{H_2O}$
    $2ClO_2(g) + 2NaHSO_4(aq)$  +53 kcal.

20. $NaClO_3(s) + NaCl(Aq) + 2H_2SO_4(l) \xrightarrow{H_2O}$
    $ClO_2(g) + \frac{1}{2}Cl_2(g) + 2NaHSO_4(aq) + H_2O(l)$  −11 kcal.

21. $NaClO_3(s) + \frac{1}{2}H_2O_2 + H_2SO_4(l) \xrightarrow{H_2O}$
    $ClO_2(g) + NaHSO_4 + H_2O(l) + \frac{1}{2}O_2(g)$ 22. $Cl_2(g) + H_2O \xrightarrow{H_2O} 2HCl(l) + \frac{1}{2}O_2(g)$  +12 kcal.

23. $2HCl(Aq) + Na_2SO_4 + CaO(s) + H_2O(l) \xrightarrow{H_2O}$
    $CaSO_4 \cdot 2H_2O(s) + 2NaCl(Aq)$  −15 kcal.

24. $HCl(Aq) + NaHSO_4(s) + CaO(s) + H_2O(l) \xrightarrow{H_2O}$
    $CaSO_4 \cdot 2H_2O(s) + NaCl(Aq)$  −11 kcal.

25. $2ClO_2(g) + H_2O_2 + 2NaOH(l) \xrightarrow{H_2O}$
    $2NaClO_2(l) + 2H_2O(l) + O_2(g)$  +62 kcal.

26. $5NaClO_2(Aq) + 4HCl \longrightarrow 4ClO_2(Aq) + 5NaCl(Aq)$

Reactions which are most preferred comprise at least one selected from a list consisting of number: 1, 2, 4, 6, 7, 8, 10, 11, 12, 14, 15, 16, 17, 19, 25, 26, and any combination therein. Reactions required to remove calcium and thereby increase product purity are 11 and 12. Reaction 26 is preferred for on-site manufacture of chlorine dioxide. Alumina is herein estimated at about ⅔ aluminum oxide and ⅓ aluminum hydroxide; however, Alumina can be any concentration of the base aluminum metal with any concentration of aluminum oxide and/or any concentration of aluminum hydroxide. It is preferred to use at least one metal other than aluminum.

Sulfoxy Acid Formation—SAR

Significant economies of manufacture can be obtained by the preparation of a sulfoxy acid. A sulfoxy acid is defined herein as any acid comprising an $SO_x$ moiety; further the sulfoxy moiety is herein defined as any $SO_x$ moiety. It is most preferred that the sulfoxy acid in this instant invention be $H_2SO_4$. While the market for $H_2SO_4$ and $H_2SO_3$ is very competitive, the formation of $H_2SO_4$ and/or $H_2SO_3$ from S, air and $H_2O$ or S, $O_2$ and $H_2O$ is very exothermic. There are two processes known to manufacture $H_2SO_4$ and $H_2SO_3$, the sulfuric acid condensation (SAC) and the sulfuric acid contact process (SACP), both are herein referred to as SAR, and are an embodiment in this instant invention, with the SACP preferred. The SACP produces $H_2SO_4$ and/or $H_2SO_3$ from S, $H_2O$ and air or $O_2$ (with one stage of reaction requiring a catalyst, preferably vanadium oxide, $V_2O_5$). Every mole of about anhydrous $H_2SO_4$ produced from S, $H_2O$, and air or $O_2$ also produces approximately 126 kcal of energy. This valuable energy is preferably used to produce steam for at least one selected from a list consisting of: the purification of bauxite, heating of the metal polymer reactor (MPR, which can used to manufacture PAC(s) as well as MP(s)), heating of an HAR and/or HAR product distillation, reducing the $H_2O$ content of by-product metal sulfate, sulfite or bisulfite salts with air evaporative dehydration, electricity generation to operate the EU and any combination therein. The SACP is summarized by:

1) $S+O_2 \rightarrow SO_2 + 70,944$ cal.
2) $SO_2+O_2 \rightarrow SO_3+23,506$ cal. (400° F. (204° C.) with catalyst, preferably $V_2O_5$)
3) $SO_3+H_2SO_4 \rightarrow H_2S_2O_7$ (oleum); and
4) $H_2S_2O_7+H_2O \rightarrow H_2SO_4+20,820$ cal.

($SO_3$ and $H_2SO_4$ to form oleum can be eliminated; however, $SO_3+H_2O \rightarrow H_2SO_4$ is a slow reaction.)

Sulfurous acid, $H_2SO_3$, is formed by reacting $SO_2$, from the first reaction, with $H_2O$.

It is preferred to obtain sodium sulfite by reacting $SO_2$, from the first reaction, in an aqueous solution of sodium hydroxide. Further, it is an embodiment to form a metal sulfite by reacting $SO_2$, from the first reaction, in an aqueous solution of metal hydroxide or a metal sulfite with $H_2SO_3$.

It is preferred to obtain sodium bisulfite by the reaction of $SO_2$, from the first reaction, in an aqueous solution of sodium carbonate; and to from a metal bisulfite by the reaction of $SO_2$, from the first reaction, in an aqueous solution of said metal carbonate.

In addition to the electrical and steam energy economics of $H_2SO_4$ and/or $H_2SO_3$ production, on-site production of $H_2SO_4$ and/or $H_2SO_3$ eliminates the transportation and storage of $H_2SO_4$ and/or $H_2SO_3$. As discussed previously, $H_2SO_4$ and/or $H_2SO_3$ are hazardous chemicals that must be stored in appropriate tankage, wherein the vapors must be controlled. Therefore, it is preferred that $H_2SO_4$ and/or $H_2SO_3$ produced for the HAR have minimal volume storage. It is a most preferred embodiment to produce $H_2SO_4$ and/or $H_2SO_3$ from the SACP; and then, react said "hot" $H_2SO_4$ and/or $H_2SO_3$ with a metal halide in the HAR, thereby utilizing the $H_2SO_4$ and/or $H_2SO_3$ energy to distill the halide acid and/or reduce the water in produced metal sulfoxy salt.

It is preferred that said SACP be of design, construction and operation as is known in the art.

Halogen Acid Reactor—HAR

In the HAR, at least one of the about anhydrous salt and brine is reacted with a sulfoxy acid, preferably $H_2SO_4$ and/or $H_2SO_3$ and most preferably $H_2SO_4$, to form the associated halide acid, which in the case of sodium chloride is HCl, and the associated byproduct metal sulfoxy salt, which in the case of sodium chloride is a sodium sulfoxy salt, wherein said sulfoxy moiety in said metal sulfoxy salt is preferably at least one selected from a list consisting of: sulfate, bisulfate, sulfite, bisulfite and any combination therein. It is most preferred that said metal comprise sodium; it is preferred that said metal comprise a group IA or group IIA metal, while it is an embodiment that the metal comprise at least one selected from a group consisting of: ammonium, a Group IA metal, a Group IIA metal, a Group IIIB metal, a Group VIII metal, a Group 1B metal, a Group IIB metal, a Group IIIA metal, sodium, calcium, potassium, magnesium, aluminum, copper and any combination therein.

The boiling point of about anhydrous $H_2SO_4$, $Na_2SO_4$ and NaCl at atmospheric pressure is approximately 340, N.B. and 1413, ° C. (644, N.B. and 2575° F.) respectively, while the boiling point of about anhydrous HCl at atmospheric pressure is approximately −85° C. (185° F.), leaving separation of the byproduct metal salt from the halide acid rather easily performed. Distillation, or separation, of the resulting anhydrous and/or aqueous halide acid solution permits the capability of directly controlling the aqueous halide acid concentration by concentration of the salt in the brine and/or by addition of water to said halide acid, which is preferably performed via an eductor and/or a compressor, wherein said eductor moves said halide acid via a stream of water and said compressor moves and/or pressurizes said halide acid. It is a preferred embodiment that said eductor move said halide acid via a stream of aqueous halide acid. It is a preferred embodiment that said compressor move said halide acid via a stream of about anhydrous halide acid. It is an embodiment that said compressor move said halide acid via a stream of aqueous halide acid.

An embodiment is to perform in the HAR reaction of a metal halide salt with a sulfoxy acid, preferably $H_2SO_4$, as said sulfoxy acid contains heat (measured as temperature) from the SAR process. A preferred embodiment is to perform the reaction of a metal halide salt in the HAR with a sulfoxy acid, preferably $H_2SO_4$ and/or $H_2SO_3$, as said sulfoxy acid contains heat from said SAR process at a temperature of between about 0 and about 600° C., thereby providing said heat to create hot water and/or steam energy via heat transfer from the HAR via a water jacket on the HAR. A most preferred embodiment to perform in the HAR reaction of a metal halide salt with sulfoxy acid, preferably $H_2SO_4$, as said sulfoxy acid contains at least partially the heat from formation of at least one selected from a list consisting of: $SO_2$, $SO_3$, oleum, $H_2SO_4$, $H_2SO_3$ and any combination therein, wherein the temperature of said reaction in said HAR is controlled by a water and/or steam jacket between about 0 and 600° C. It is preferred that said temperature in said HAR be between about 100 and 300° F. (38-149 0C) to form a bi-sulfate or a bi-sulfite salt in said HAR. It is preferred that said temperature in said HAR be between about 300 and about 600° F. to form a sulfate or a sulfite salt in said HAR. A most preferred embodiment is to utilize said water and/or steam energy from the jacket of said HAR to heat at least one selected from a list consisting of: the formation of a metal hypohalite, the formation of a polynucleate metal compound, reducing the water in a metal sulfoxy salt to at least one of the salts: anhydrous, hydrate, di-hydrate, and any combination therein.

It is an embodiment to perform about anhydrous and/or aqueous halide acid distillation and/or separation from sulfoxy acid and/or metal sulfoxy salt under the pressure condition of at least one of: atmospheric, positive gage, vacuum and any combination therein. It is preferred that the time/temperature relationship of said halide acid or halide acid solution be managed to decompose any halite ions to halide ions (approximately 60° C. (142° F.) is required). The resulting byproduct, a sulfoxy salt, preferably of the sulfate, bisulfate, sulfite and/or bisulfite moiety, may be purified by reacting with any metal hydroxide or caustic to a desired pH, thereby purifying said byproduct metal sulfoxy salt while creating heat to the reaction of said metal halide salt with said sulfoxy acid. It is most preferred that said byproduct metal sulfoxy salt be pH adjusted with NaOH. It is preferred that said byproduct metal sulfoxy salt be pH adjusted with a metal hydroxide, wherein the metal in said metal hydroxide corresponds to the metal in said byproduct metal sulfoxy salt. It is most preferred to dehydrate said byproduct metal sulfoxy salt to a powder for sale. It is preferred to sell said byproduct metal sulfoxy salt as a hydrate. It is preferred to sell said byproduct metal sulfoxy salt as a cake. It is an embodiment to sell the byproduct metal sulfoxy salt in solution.

While the reaction to form said sulfoxy acid is exothermic, as depicted in reaction 1, the reaction to form said metal sulfate or sulfite salt is endothermic, as depicted by reaction 3; similar energies are required for the reaction of any metal halide salt with a sulfoxy acid, preferably sulfuric acid, to form a metal sulfate salt. It is therefore preferred to manufacture a metal bi-sulfate or bi-sulfite salt as is depicted in reaction number 4, thereby reducing the required energy for formation of a halide acid, while still providing a metal bi-sulfate salt, albeit in a form containing hydrogen.

It is an embodiment to recover at least a portion of the energy of formation of said metal sulfoxy salt and water from the reaction of a metal hydroxide with said sulfoxy acid, wherein said energy is used to heat said reaction of said metal halide with said sulfoxy acid, as depicted in reactions 13 and 14. It is a preferred embodiment to use $H_2$ generated in an electrolysis unit (EU), as described herein, or use $H_2$ generated in the formation of a metal hypohalite, as described herein, to heat said reaction of said metal halide salt with said sulfoxy acid to form the desired metal sulfoxy salt in said HAR. It is a preferred embodiment to use natural gas to heat said reaction of said metal halide salt with said sulfoxy acid to form the desired metal sulfoxy salt in said HAR.

Figure 10:
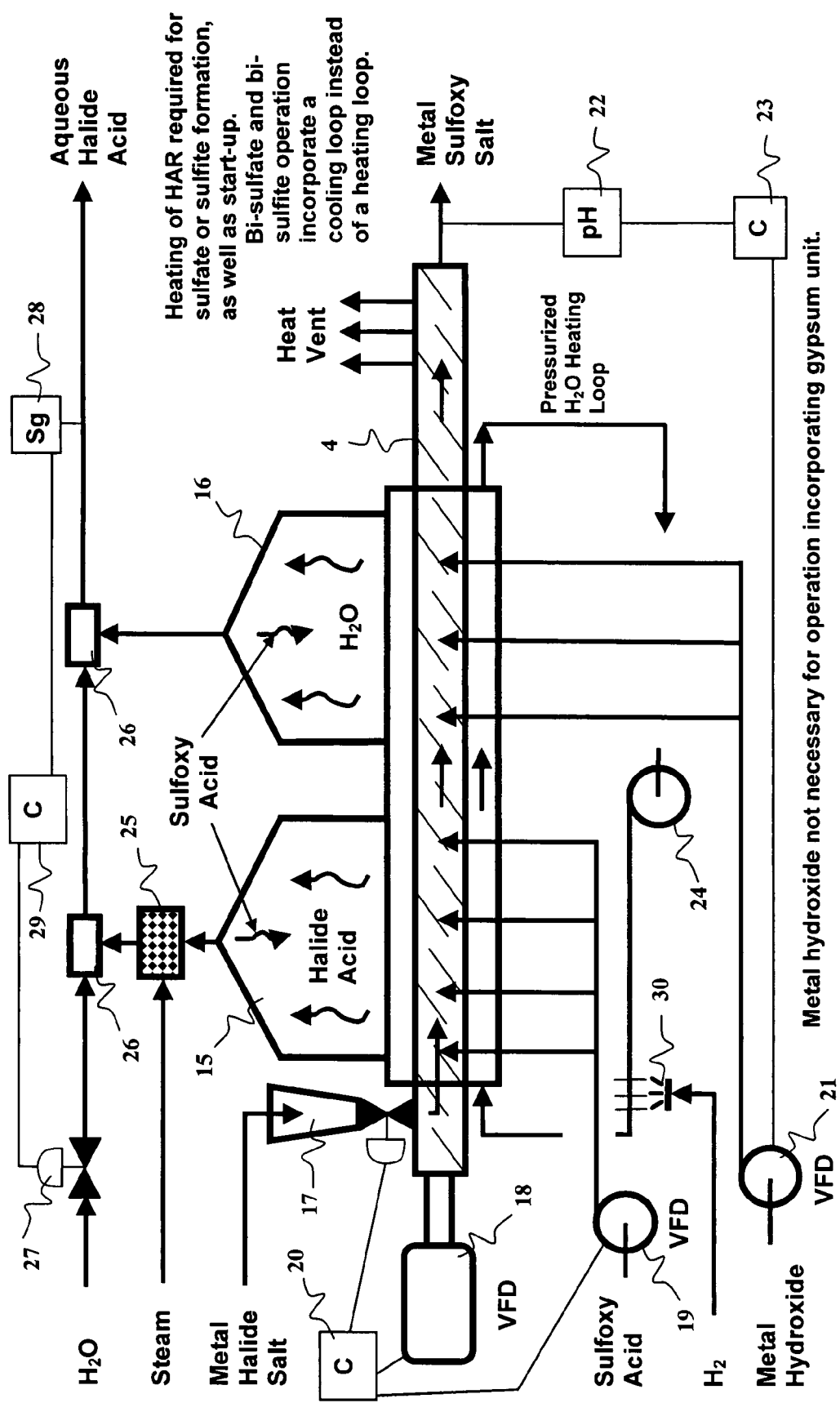
FIGS. 10 and 11 illustrate in block diagram form a general description of a preferred embodiment of the proposed methods and processes to manufacture the halide acid and the metal sulfoxy salt from a sulfoxy acid and a metal halide salt, wherein said manufacture is to occur in an extruder and/or auger type of reactor, wherein the screw in said reactor transfers said metal halide salt into reaction with said sulfoxy acid, wherein said halide acid is removed from at least one vented portion of said extruder and/or auger, wherein said extruder and/or auger transfers said metal sulfoxy salt from said extruder and/or auger at an end opposite of the entry of said metal halide salt.
Figure 11:
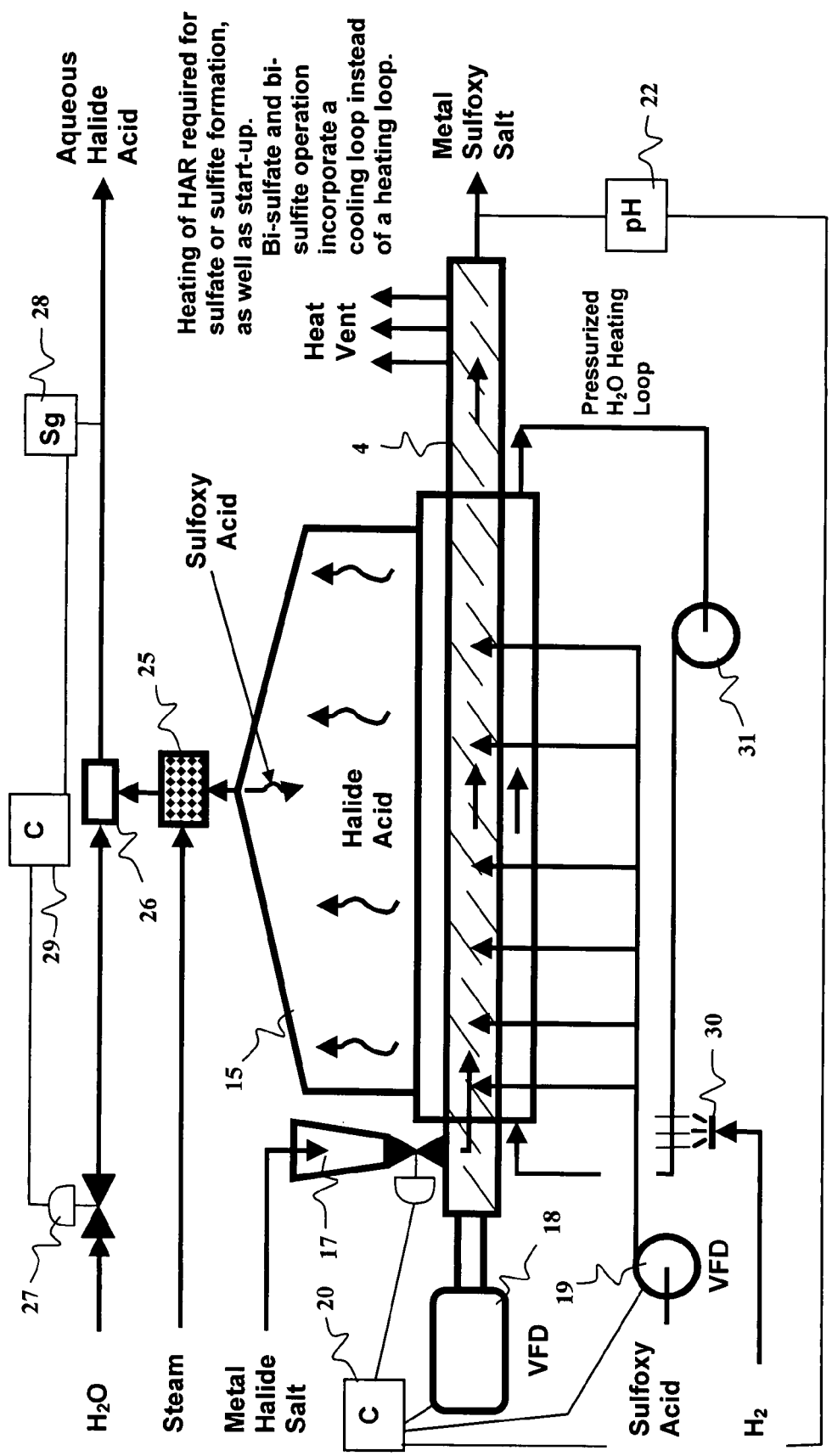
Figure 12:
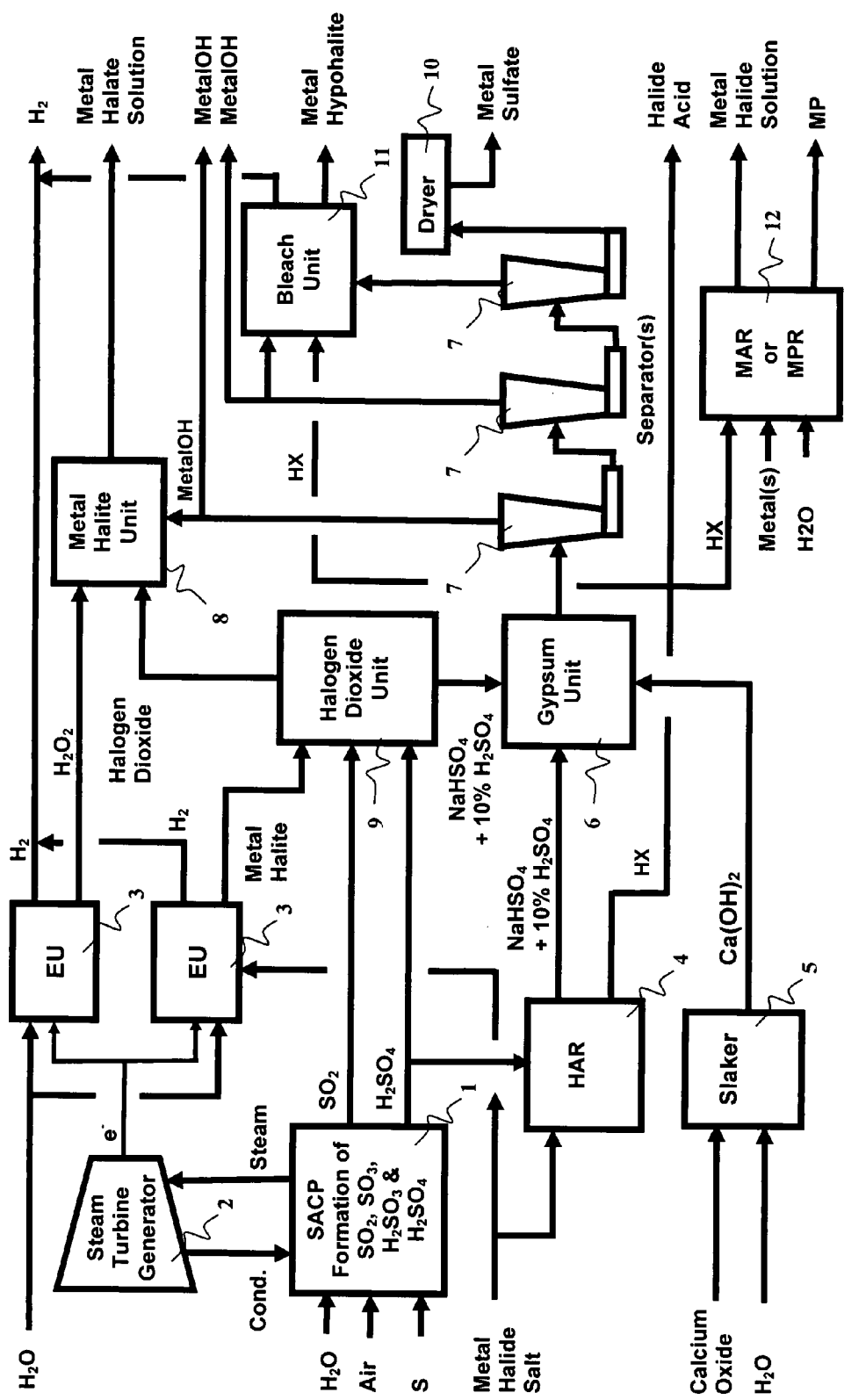
FIG. 12 illustrates in block diagram form a general description of a preferred embodiment, wherein sulfur, alumina, a metal halide salt and water are used to produce a polynucleate metal compound, a metal halide solution, a metal halite, a metal hypohalite, a metal hydroxide, and calcium sulfate dehydrate.

As depicted in FIG. 10, it is an embodiment that said HAR comprise a mixing/reaction section, which is preferably of an extruder/auger-type design. It is preferred that said HAR comprise at least one auger and/or extruder, wherein said metal halide salt is added to one end of said auger and/or extruder, wherein said sulfoxy acid is reacted with said metal halide salt, wherein the resultant halide acid is allowed to leave said auger and/or extruder from at least one vent. It is most preferred that said HAR comprise at least one auger and/or extruder, wherein said metal halide salt is added to one end of said auger and/or extruder, wherein said sulfoxy acid reacts with said metal sulfoxy salt, wherein the resultant halide acid is allowed to leave said auger and/or extruder from at least one vent, and wherein a metal hydroxide or a metal oxide is added to said auger and/or extruder in order to react said metal hydroxide or metal oxide with any remaining sulfoxy acid in said auger and/or extruder, such that a metal sulfoxy salt is formed with water. It is most preferred that said HAR comprise at least one auger and/or extruder, wherein said metal halide salt is added to one end of said auger and/or extruder, wherein said sulfoxy acid reacts with said metal halide salt, wherein the resultant halide acid is allowed to leave said auger and/or extruder from at least one vent, wherein a metal hydroxide or a metal oxide is added to said auger and/or extruder in order to react said metal hydroxide or metal oxide with any remaining sulfoxy acid in said auger and/or extruder to form a metal sulfoxy salt and water, wherein said water is allowed to leave said auger and/or extruder via at least one vent. To reducing the water in said metal sulfoxy salt, it is preferred that said auger and/or extruder have an operating temperature of at least approximately 140° F. (60° C.) or greater after the addition of any metal hydroxide. To reducing the water in said metal sulfoxy salt, it is most preferred that said auger and/or extruder have an operating temperature of at least approximately 212° F. (100° C.) or greater after the addition of any metal hydroxide. To maintain a reaction temperature in said auger and/or extruder it is preferred that said auger and/or extruder comprise a water jacket.

It is most preferred that said metal halide salt be added to said HAR in about anhydrous form. It is an embodiment that said metal halide salt is added to said HAR in aqueous form.

EU

It is preferred to prepare at least one disinfectant or oxidant, wherein said disinfectant or oxidant is formed by electrolysis, wherein the electricity for said electrolysis is created in a generator turned by a steam turbine, wherein said steam turbine is turned by steam energy, and wherein the steam energy to turn said steam turbine is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is preferred to produce in an EU at least one selected from a list consisting of: a metal hypohalite from a metal halide salt solution, a metal halite from a metal halide salt, a metal halate from a metal halide salt, a halide acid from a metal halide salt, $O_2$ from $H_2O$, $O_3$ from $O_2$, $H_2$ from $H_2O$, $H_2O_2$ from $H_2SO_4$ via $H_2S_2O_8$ and $H_2O$, and any combination therein, wherein at least a portion of the EU electrical energy is created by a generator, wherein the generator is turned by a steam turbine, and wherein the steam turbine is turned by steam energy obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is preferred to react said $SO_2$ with at least one selected from a list consisting of: a metal hydroxide to from a metal sulfite, a metal carbonate to form a metal bi-sulfite, a metal halate and $H_2SO_4$ to form the corresponding halogen dioxide, and any combination therein.

It is preferred to use at least a portion of said $H_2$ in at least one of a: combustion engine to turn a generator to generate electricity, fuel cell to generate electricity, and heat the reaction between a metal halide salt with a sulfoxy acid. It is preferred to use at least a portion of said electricity generated by said $H_2$ via a combustion engine or a fuel cell to perform electrolysis in said EU.

It is most preferred that the halogen of said halide, hypohalite, halite or halate comprise chlorine or bromine. It is an embodiment that said metal halide solution comprises a waste catalyst or waste brine. It is an embodiment to use at least a portion of said $H_2$ to heat an HAR to form a metal sulfoxy salt.

If the EU is used to produce a halide acid, the halide acid from the EU is preferably heated: immediately after the EU, within the EU, during AHS formation, during Metal Acid Solution (MAS) formation, and any combination therein so that the halite ions are decomposed into halide ions by using available energy from at least one selected from a list consisting of: AHS formation, MAS formation, EU heat energy, and any combination therein.

It is most preferred to produce in the EU a chlorine moiety comprising at least one selected from a list consisting of: chlorine gas, hydrochloric acid, hypochlorite, chlorite and chlorate, and any combination therein, wherein at least a portion of the electrical energy for the EU is obtained from steam energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein.

It is preferred that halide acid production, from either the EU or the HAR be employed for the production of the associated halide or halogen gas, halide acid, hypohalite, halite or halate. It is preferred that a waste brine used in the EU.

Metal hydroxides, while a potential by-product of the EU, are a preferred material to be used in at least one selected from a list consisting of: the preparation of alumina, the production of a hypohalite, the production of a halite, the production of a halate, the production of a halogen dioxide, the scrubbing of a halide acid gas released from any of the processes in the instant invention, pH control applications that include those in the water treatment industry and pH polishing of the by-product metal sulfoxy, preferably sulfate, bisulfate, sulfite or bisulfite, salt formed in the HAR, and any combination therein.

An embodiment is to utilize any metal halide salt in the EU, wherein the associated acid product is the associated halide acid and the associated caustic product is the associated metal hydroxide. Of all the available metals to be incorporated in the metal halides to be used in the EU and the HAR, it is preferred that said metal comprise at least one selected from a list consisting of: sodium, potassium, magnesium, calcium and any combination therein.

A most preferred embodiment is to use any metal halide salt in the EU, wherein the associated product is an oxidation product of the halide, such as a halide diatom, hypohalite, halite or halate, wherein said halide diatom, hypohalite, halite or halate can comprise any halogen from the periodic table. A preferred embodiment is to manufacture a halogen dioxide, wherein the EU forms at least one selected from a list consisting of: metal halite, metal halate, halide acid, and any combination therein, wherein said halogen dioxide is formed via at least one of said manufactured: metal halite, metal halate, halide acid, $SO_2$, $H_2SO_4$, and any combination therein. A most preferred embodiment is to manufacture $ClO_2$, wherein the EU forms a metal chlorite and/or chlorate and wherein $ClO_2$ is formed via said manufactured chlorite and/or chlorate. A most preferred embodiment is to manufacture $ClO_2$, wherein the EU forms a chlorite and/or a chlorate, and wherein $ClO_2$ is formed via said manufactured chlorite and/or chlorate with said HCl manufactured by the HAR, as said formation of $ClO_2$, as well as chlorate and/or chlorite. A most preferred embodiment is to manufacture $ClO_2$, wherein the EU forms a chlorite and/or a chlorate along with a hypochlorite, and wherein $ClO_2$ is formed with at least one of said manufactured chlorite, chlorate and hypochlorite with said HCl manufactured by the HAR. A most preferred embodiment is to manufacture a halogen dioxide, wherein the EU is used to form a metal chlorite and/or chlorate, wherein a halide acid is formed by the HAR, and wherein said halogen dioxide is formed via at least one of said EU manufactured halite, halate and hypohalite with said halide acid manufactured by the HAR. A most preferred embodiment is to manufacture a metal halate in the EU, along with $SO_2$ and $H_2SO_4$ in the SAP, wherein said $SO_2$ and $H_2SO_4$ are reacted to form the corresponding halogen dioxide. A most preferred embodiment is to react said halogen dioxide with a metal hydroxide and hydrogen peroxide to manufacture a metal halate, as is known in the art.

It is preferred to manufacture in the EU a halide acid, wherein at least a portion of said halide acid is used to form at least one selected from a list consisting of the corresponding: hypohalite, halite, halate, available oxide form of said halide, said halide in the form of a dioxide, and any combination therein.

It is most preferred that the EU comprise a diaphragm construction, as is known in the art.

It is preferred that the metal(s) in said metal halide salt used in said EU comprises at least one selected from a list consisting of: ammonium, a Group IA metal, a Group IIA metal, a Group IIIB metal, a Group VIII metal, a Group 1B metal, a Group IIB metal, a Group IIIA metal, sodium, calcium, potassium, magnesium, aluminum, copper and any combination therein. It is most preferred that the metal(s) used in said EU comprise sodium.

$O_2$ and $O_3$ $O_2$ is preferably produced via at least one selected from a list consisting of: cryogenic distillation of air, membrane separation of air, PSA separation of air and any combination therein; all of these process and process combinations therein are herein each referred to as an air separation process (ASP).

It is preferred to prepare $O_2$, wherein the formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein is used to generate steam, and wherein said steam is used to perform at least one selected from a list consisting of: turn a steam turbine to generate electricity, wherein said electricity is used in the electrolysis of $H_2O$ to $H_2$ and said $O_2$; turn a steam turbine to generate electricity, wherein said electricity is used to power an ASP; turn a steam engine, wherein said steam engine powers an ASP; and any combination therein.

It is preferred that said ASP be as is known in the art. It is preferred that at least a portion of said electricity be used to power an electrolysis unit to convert $O_2$ into $O_3$.

It is preferred that said $H_2$ is at least partially used in at least one of a: combustion engine to turn a generator to generate electricity, fuel cell to generate electricity, and heat the reaction between a metal halide salt with a sulfoxy acid.

$H_2O_2$ $H_2O_2$ can be produced utilizing $H_2SO_4$ as the catalyst. In this reaction, $H_2O_2$ is formed in a two stage process, wherein the first stage $H_2S_2O_8$ and $H_2$ are formed by electrolysis from $H_2SO_4$. In the second stage, the $H_2S_2O_8$ from the first stage is reacted with $H_2O$ to form $H_2O_2$ and $H_2SO_4$. The $H_2$ gas can be vented, stored or used as an energy source; the $H_2SO_4$ can be recycled for additional production of $H_2S_2O_8$ and $H_2$. The use of $H_2O_2$ in water treatment and other applications has been limited due to its explosive nature creating expense in both transportation and in storage; $H_2O_2$ is a much more hazardous chemical than is $H_2SO_4$ and/or $H_2SO_3$ to store and transport. It is most preferred to produce $H_2O_2$ utilizing $H_2SO_4$ from said SACP. It is preferred to produce $H_2O_2$ and $H_2$ wherein, at least a portion of the electricity for electrolysis of $H_2O$ to $H_2O_2$ is obtained from the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein. It is preferred to recycle at least a portion of the $H_2$ from $H_2O_2$ electrolysis manufacture wherein, at least a portion of the electrical energy for the electrolysis of $H_2O$ to $H_2O_2$ is obtained from the energy of combustion and/or of fuel cell conversion of said $H_2$.

Halogen Dioxide and Metal Halite Formation

It is preferred to form a metal halate in the EU from an aqueous solution of the corresponding metal halide, wherein the energy of electrolysis (energy of formation) for said metal halate is at least partially created by a generator, wherein said generator is turned by stream energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein.

It is an embodiment to form a halogen dioxide with said metal halate formed in the EU, wherein said halate is further reacted to form said halogen dioxide from said metal halate, wherein the energy of electrolysis (energy of formation) for said metal halate is at least partially created by a generator, wherein said generator is turned by stream energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein.

It is an embodiment to form the available oxide form of a halogen, including a halogen dioxide, wherein said formation is performed with at least one selected from a list consisting of said corresponding: halide acid, hypohalite, halite, halate, and any combination therein, wherein at least one of said halide acid, hypohalite, halite and halate is formed in an EU, wherein the electricity of electrolysis for the EU is at least partially created by a generator, wherein said generator is turned by stream energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, said $H_2SO_4$ from oleum and $H_2O$ and any combination therein.

It is an embodiment to react said metal halate to form the corresponding halogen dioxide. It is preferred to react said metal halate to form the corresponding halogen dioxide according to at least one of reactions 18, 19, 20 or 21 to form the corresponding halogen dioxide, as is known in the art. It is most preferred to react said metal halate to form the corresponding halogen dioxide according to reaction 19.

It is most preferred to perform reaction 19, wherein at least one of said $H_2SO_4$ can be a sulfoxy acid in general, wherein said sulfoxy acid and said $SO_2$ is obtained from an SAR, wherein the electrical energy of electrolysis to form said metal halate is obtained from steam energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein.

It is preferred to perform reaction 21, wherein said $H_2SO_4$, which can be a sulfoxy acid in general, is obtained from an SAR; it is most preferred that said $H_2O_2$ is at least partially obtained by the electrolysis of $H_2SO_4$ via $H_2S_2O_8$ and $H_2O$, wherein the electrical energy of electrolysis to form said metal halate is obtained from steam energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein.

It is preferred to use at least a portion of said steam energy to at least partially perform at least one selected from a list consisting of: refine bauxite to alumina, heat said aqueous reaction of a metal halide solution with at least one metal, evaporate $H_2O$ from a metal sulfoxy salt, degrade a halite to a halide, heat S, turn a steam turbine which turns a generator to create electricity, heat the reaction of a metal hydroxide and a halide acid to form a metal hypohalite, and any combination therein.

It is preferred then to react said halogen dioxide to form a metal halite, as is known in the art. It is most preferred then to react said halogen dioxide according to reaction 25 to form the corresponding metal halite. It is most preferred then to react said halogen dioxide according to reaction 25 to form the corresponding metal halite, wherein said $H_2O_2$ is formed by the electrolysis of water, wherein the electrical energy of said electrolysis to form said $H_2O_2$ is obtained from steam energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein. It is most preferred to then react said halogen dioxide according to reaction 25 to form the corresponding metal halite, wherein said NaOH can be any metal hydroxide, yet is most preferably sodium hydroxide, wherein said metal hydroxide is formed by at least one of: electrolysis of the corresponding metal halide, the reaction of a metal sulfoxy salt with a moiety of calcium, wherein said moiety of calcium is preferably calcium oxide or calcium hydroxide, wherein said metal sulfoxy salt is obtain from an HAR (as presented herein), and wherein the reaction within said HAR to form said metal sulfoxy salt comprises a reaction between the corresponding metal halide with the corresponding sulfoxy acid. It is most preferred that said halogen comprise chlorine and said halate comprise chlorate. It is most preferred that said metal comprise sodium.

Once transported to the location of use, it is an embodiment to then form a halogen dioxide from said metal halite, as is known in the art. Once transported to the location of use, it is preferred to then form a halogen dioxide from said metal halite according to reaction 26. Once transported to the location of use, it is most preferred to then form a halogen dioxide from said metal halite according to reaction 26, wherein said HCl can be any halogen acid, yet is most preferably hydrochloric acid, wherein said halogen acid is manufactured by at least one of: the formation of said halogen acid by electrolysis of the corresponding metal halide salt, wherein the electrical energy of electrolysis to form said $H_2O_2$ according to reaction 21 is obtained from steam energy, and wherein said steam energy is obtained from the energy of formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$ and any combination therein; and the formation of said halide acid in an HAR is obtained from the reaction of the corresponding metal halide salt with a sulfoxy acid.

In the formation of said metal halite, it is an embodiment of the instant invention to react chloride ions, preferably having a concentration of from about 1 M to about 5 M, with chlorate ions, preferably having a concentration of from about 0.1 M to about 7 M, in an aqueous acid reaction medium having an acid normality of from about 0.05 N to about 5 N. As sodium chloride precipitates in the system, it may be separated by means of a filter or recycled in a solution or slurry to the EU. A gaseous product mixture comprising a halogen dioxide, preferably chlorine dioxide, may be absorbed in any suitable aqueous medium. However, it is beneficial for the absorption medium to preferably absorb said halogen dioxide, preferably chlorine dioxide, and less preferably absorb the halogen, which would be preferably chlorine. An example of such a medium is the corresponding dilute halogen acid, preferably hydrochloric acid. A suitable reagent able to destroy traces of halogen, which is preferably chlorine, is hydrogen peroxide, which may optionally be added to the absorption medium, if desired.

In order to transfer the absorbed halogen dioxide, preferably chlorine dioxide, from the absorption medium to the halite, preferably chlorite, formation reactor, any suitable gas stripping method may be employed. The stripping of halogen, preferably chlorine, dioxide may be carried out with an inert gas or gas mixture, such as air or nitrogen. If air is used in the halogen, preferably chlorine, dioxide stripping, it is preferred to purify the air from traces of carbon dioxide, by using, for example, a caustic scrubber. Hydrogen peroxide can optionally be added to the system prior to effecting stripping.

It is preferred to transfer the gaseous product mixture formed in the halogen, preferably chlorine, dioxide generator directly to the chlorite formation reactor without the intermediate step of absorption and/or stripping. Instead of absorption/stripping, gas transfer membranes can be employed, as in known in the art, thereby allowing the transfer of halogen, preferably chlorine, dioxide in the absence of any air addition.

It is an embodiment to modify the halogen dioxide generator by addition of a supplementary reducing agent, such as hydrogen peroxide, as is known in the art.

It is also an embodiment to improve the performance of the halogen-dioxide generator by using any suitable catalytically-active agent containing elements, such as silver, manganese, palladium, chromium, vanadium or a combination thereof.

While it is known in the art to use the chloride ion as an inexpensive reducing agent, the reaction of the chloride ion with the chlorate ion necessarily results in the formation of some chlorine, e.g.:

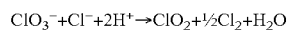
$ClO_3^- + Cl^- + 2H^+ \rightarrow ClO_2 + \frac{1}{2}Cl_2 + H_2O$ which may negatively affect purity of the final halite, preferably chlorite, product while increasing use of hydrogen peroxide. It is, therefore, a preferred embodiment to generate said halogen dioxide, preferably chlorine dioxide, by reaction 26.

Reaction 26 can be carried out in a very broad acid normality range of from about 2 N to about 14 N, preferably from about 6 N to about 12 N. The optimum chlorate ion concentration is dependent on acid normality in the reaction medium and can vary from about 0.1 M to saturation, and preferably from about 0.5 M to about 3.5 M. Operation at higher acidities is typically associated with a lower chlorate concentration in the reaction medium. The gaseous product mixture comprising chlorine dioxide and water vapor can be used directly in the chlorite formation reactor without the intermediate step of recovery of chlorine dioxide solution, i.e., by omitting the absorption and stripping stages.

Such an operation leads to significant cost savings due to the elimination of certain parts of the conventional chlorine dioxide generating system, such as condenser, absorption tower and stripping tower.

The co-produced oxygen gas can be used along with the water vapor for the dilution of gaseous halogen, preferably chlorine, dioxide to safe concentration levels. By adjusting the halogen, preferably chlorine, dioxide to water vapor ratio to meet the requirements of the halite, preferably chlorite, formation reactor, the water balance of the overall system is improved. The relative ratio of halogen, preferably chlorine, dioxide and water vapor in the gaseous mixture entering the halite, preferably chlorite, formation reactor affects the concentration of metal halite, preferably group IA or group IIA metal chlorite, in the final product aqueous solution. Therefore, there may still be a need to condense at least some of the water vapor.

It is preferred to integrate the halogen dioxide, preferably chlorine dioxide, generator with a methanol based halogen, preferably chlorine, dioxide generating system, as is known in the art, wherein the acidic, sulfate and/or bisulfate containing effluent or slurry formed in the hydrogen peroxide based generator is cascaded to the methanol based generator. This integration eliminates the requirement for the filtration step following the hydrogen peroxide based generator.

The above described cascade of two halogen, preferably chlorine, dioxide generators offers several advantages. For example, it is possible to add a small amount of sodium halide, preferably chloride, typically about 0.5 to about 1.0 wt. % based on the halate, preferably chlorate, to the hydrogen peroxide based generator. Such an addition of halide, preferably chloride, may have little or no impact on the chlorine dioxide purity resulting from the hydrogen peroxide based process, while such addition may be beneficial with regard to the production rate and efficiency. The presence of hydrogen peroxide should effectively prevent halide, preferably chlorine, from being generated in the halogen, preferably chlorine, dioxide generating process.

It is an embodiment to recover the metal sulfate and/or bisulfate, preferably sodium sulfate and/or sodium bisulfate, following the hydrogen peroxide-based generator by reaction with a moiety of calcium, preferably CaOH to form the corresponding metal hydroxide, preferably sodium hydroxide, and calcium sulfate, calcium sulfate ½ hydrate and calcium sulfate di-hydrate (gypsum).

It is an embodiment to recover the metal sulfate and/or bisulfate, most preferably sodium sulfate and/or sodium bisulfate, following the conversion of the halogen dioxide to a metal halate by reacting said metal sulfate and/or bisulfate with a moiety of calcium, preferably CaOH, to form the corresponding metal hydroxide, most preferably at least one of sodium, and calcium sulfate, calcium sulfate ½ hydrate and calcium sulfate di-hydrate (gypsum). It is preferred that the metal(s) in said metal sulfate and/or bisulfate comprise a group IA or group IIA metal.

Any possible halogen, preferably chloride, input to the peroxide-based process may ultimately exit the system with the halogen, preferably chlorine, dioxide produced in the methanol-based halogen, preferably chlorine, dioxide generator. However, the impact on product purity should not be significant, especially when production capacity of the latter process is much higher than that of the peroxide-based process.

The combination of two halogen, preferably chlorine, dioxide generators permits all or part of the halogen dioxide containing condensate originating from the peroxide-based process to be forwarded to the halogen, preferably chlorine, dioxide absorption system associated with the methanol-based process. This embodiment is particularly beneficial since the need to remove the halogen, preferably chlorine, dioxide from the condensate is eliminated.

Any suitable catalyst can be added to the peroxide-based halogen, preferably chlorine, dioxide generating process, if desired. It is understood that the halate, preferably chlorate, ions required for halogen, preferably chlorine, dioxide generation can be supplied not only by a group IA or IIA metal halate, preferably sodium chlorate, but also by halic, preferably chloric, acid or mixtures thereof with said group IA or IIA metal halate, preferably chlorate. While the most preferred acid used in the process of the instant invention is sulfuric acid, any other strong mineral acid, such as perchloric acid, chloric acid, a halic acid, nitric acid, phosphoric acid, hydrochloric acid or the mixtures thereof can be employed.

While any suitable reactor design can be used in the halogen dioxide formation step, a packed tower reactor is most preferred, wherein the halogen dioxide leaves the top of the tower after reacting with an aqueous phase of the metal halate, along with the other required reactants, as required by the method employed. It is an embodiment to form the halogen dioxide in a stirred vessel while capturing the halogen dioxide gas above; however, such a scenario without a packed tower may lead to loss of reactants and/or halide ions with the halogen dioxide.

While any suitable reactor design can be used in the chlorite formation step, a packed tower reactor is most preferred, wherein the chlorite solution is recirculated and enters the reactor from the top. Hydrogen peroxide is added to the recirculation loop at a point prior to solution entry to the reactor. Sodium hydroxide and, optionally, dilution water is added at the bottom of the recirculation loop. The addition point of halogen, preferably chlorine, dioxide diluted with at least one inert gas, such as air, water vapor and nitrogen, is at the bottom of the reactor. The gas is passed counter-currently to the halite, preferably chlorite, solution.

The pH of the reaction medium is maintained generally in the range of about 11.8 to about 13.0, preferably about 12.0 to about 12.6. The hydrogen peroxide excess is preferably maintained using a potentiometric (ORP) measurement. The ORP values, which are pH dependent, are generally maintained in the range of between about −30 to about −200 mV vs. Ag/AgCl, preferably about −40 to about −90 mV vs. Ag/AgCl.

Halide Acid—Metal Hydroxide—Metal Sulfoxy Salt Formation

In the instant invention, both the halide acid and its associated metal hydroxide or metal oxide may be produced from the metal halide salt by electrolysis in the aforementioned EU. While sodium chloride is preferred, any metal halide salt may be used to form the associated halide acid and the associated metal hydroxide, preferably in solution. However, the halide acid is more economically formed by the reaction of the metal halide salt with a sulfoxy acid, preferably $H_2SO_4$, in an HAR. This reaction produces the halide acid, along with the corresponding metal salt, wherein the anion for said salt is a sulfoxy molecule, preferably at least one selected from a list consisting of a: sulfite, bisulfite, sulfate, bisulfate and any combination therein.

A preferred embodiment utilizes about anhydrous or aqueous sodium chloride in the EU as a metal halide salt, wherein the associated acid product is HCl and the associated caustic product is sodium hydroxide (NaOH). A more economical and most preferred process embodiment utilizes about anhydrous sodium chloride as a metal halide salt in said HAR, wherein the associated acid product is HCl, preferably HCl (g), and the associated byproduct salt is sodium in combination with at least one selected from a list consisting of a: sulfate, bisulfate, sulfite, bisulfite and any combination therein.

A preferred process embodiment utilizes about anhydrous or aqueous calcium chloride as the metal halide salt in an EU, wherein the associated acid product is HCl and the associated caustic product is calcium hydroxide. A more economical and most preferred process embodiment utilizes about anhydrous calcium chloride as a metal halide salt in said HAR, wherein the associated acid product is HCl and the associated byproduct salt is calcium in combination with at least one selected from a list consisting of a: sulfate, bisulfate, sulfite, bisulfite and any combination therein.

A preferred process embodiment utilizes about anhydrous or aqueous potassium chloride as a metal halide in the EU, wherein the associated acid product is HCl and the associated caustic product is potassium hydroxide. A more economical and most preferred process embodiment utilizes about anhydrous potassium chloride as a metal halide in said HAR, wherein the associated acid product is HCl and the associated byproduct salt is potassium in combination with at least one selected from a list consisting of: sulfate, bisulfate, sulfite, bisulfite and any combination therein.

A preferred process embodiment utilizes about anhydrous or aqueous magnesium chloride as a metal halide in the EU, wherein the associated acid product is HCl and the associated caustic product is magnesium hydroxide. A more economical and most preferred process embodiment utilizes about anhydrous magnesium chloride as a metal halide in said HAR, wherein the associated acid product is HCl and the associated byproduct salt is magnesium in combination with at least one selected from a list consisting of: sulfate, bisulfate, sulfite, bisulfite and any combination therein.

As can be readily seen herein, the metal halide salt in the EU or in the HAR can easily be any metal in combination with any halide. It is preferred that the metal comprise at least one selected from a list comprising: Group IA metal, Group IIA metal, Group IIIB metal, Group VIII metal, Group 1B metal, Group IIB metal, Group IIA metal and any combination therein. It is most preferred that the metal comprise at least one selected from a list consisting of: sodium, calcium, potassium, magnesium, aluminum, copper and any combination therein.

Bleach, Metal Hydroxide and Gypsum Formation

In the instant invention, it is preferred to utilize at least a portion of the electricity obtained from a generator turned by a steam turbine, wherein said steam turbine is turned by steam energy, and wherein said steam energy is obtained from the formation of at least one selected from a list consisting of: $SO_2$ from S and air or $O_2$, $SO_3$ from $SO_2$ and air or $O_2$, said $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein in an electrolysis unit to form at least one selected from a list consisting of: a metal halate from an anhydrous or hydrous metal halide salt, a metal hypohalite from an anhydrous or hydrous metal halide salt, a metal halite from an anhydrous or hydrous metal halide salt, $O_2$ from $H_2O$, $H_2$ from $H_2O$, $H_2O_2$ from the electrolysis of $H_2SO_4$ to $H_2S_2O_8$ followed by the reaction of said $H_2S_2O_8$ with $H_2O$, a metal hydroxide from an anhydrous or hydrous metal halide salt, a halogen acid from an anhydrous or hydrous metal halide salt and any combination therein.

It is preferred to manufacture a metal hypohalite by the reaction of a metal hydroxide with a halide acid, wherein said halide acid is manufactured in an HAR from the reaction of a metal halide salt with a sulfoxy acid, thereby forming the corresponding metal sulfoxy salt along with the corresponding halide acid, and wherein said metal sulfoxy salt is then reacted with a Group IIA metal hydroxide to form said metal hydroxide along with the corresponding Group IIA sulfoxy salt in either an aqueous or hydrated form. It is most preferred that the unit forming said metal hypohalite by the reaction of a metal hydroxide with a halide acid, bleach reactor, comprise at least one selected form a list consisting of: continuous stirred tank reaction, batch stirred tank reaction, plug flow reaction and any combination therein.

It is preferred to manufacture a metal hypohalite by the reaction of a metal hydroxide with a halogen acid, wherein said halogen acid is manufactured in an electrolysis unit, wherein the electrical energy for electrolysis in said electrolysis unit is generated by the energy of formation of at least one selected from a list consisting of: $SO_2$ from S and air or $O_2$, $SO_3$ from $SO_2$ and air or $O_2$, $H_2SO_3$ from $SO_2$ and $H_2O$, said $H_2SO_4$ from $SO_3$ and $H_2O$, oleum from $H_2SO_4$ and $SO_3$, $H_2SO_4$ from oleum and $H_2O$, and any combination therein.

It is preferred to prepare (or manufacture) a metal hydroxide in aqueous solution, wherein a metal sulfoxy salt is reacted with a Group IIA metal hydroxide, thereby creating a mixture comprising a metal hydroxide, water and a Group IIA metal sulfoxy salt, wherein said Group IIA metal sulfoxy salt comprises at least one selected from a list consisting of: sulfate, sulfate ½ hydrate, sulfate di-hydrate, sulfite, hydrogen sulfite, sulfite di-hydrate and any combination therein, and wherein said mixture is separated, thereby forming an aqueous solution comprising said metal hydroxide, and a moist solid phase comprising said Group IIA metal sulfoxy salt, said metal hydroxide and water.

It is preferred to perform a separation of the aforementioned metal hydroxide in aqueous solution from said moist solid phase in order to react said metal hydroxide aqueous solution with said halogen acid to form said metal hypohalite aqueous solution. It has been found that due to the specific gravity difference between an aqueous solution of a Group IA metal hydroxide and a Group IIA metal sulfoxy salt (or any group IIA metal sulfoxy salt vs. a metal of lower density) in combination with the inherent insolubility of a Group IIA sulfoxy salt (preferably calcium) with the inherent solubility of a Group IA or metal hydroxide (again sodium is the most preferred metal), it is preferred to perform said separation by gravity settling. It is preferred that said gravity settling be enhanced by a vibration-type device placed upon and/or within the vessel of separation, thereby facilitating said separation of said group IIA sulfoxy salt moiety, which is in the form of at least one selected from a list consisting of: sulfoxy, sulfoxy hydrate, sulfoxy di-hydrate and any combination therein. It is most preferred that said moist solid phase from said separation comprise at least one selected from a list consisting of: calcium sulfate, calcium sulfate ½ hydrate, calcium sulfate di-hydrate, calcium sulfite, calcium hydrogen sulfite, calcium sulfite di-hydrate and any combination therein. It is preferred that said moist solid phase from said separation be about 10 to 85 percent solids. It is most preferred that said solid phase from said separation be about 60 to 90 percent solids. It is most preferred that said separation vessel comprise near the bottom portion of said separation vessel at least a portion of a conical shape, wherein the pointed portion of said conical shape point down such that said separated solid phase pass through an opening in said pointed portion of said conical shape. While said conical shape can be of circular construction, thereby having no corners, it is an embodiment said conical shape be of a construction which comprises at least three corners. It is preferred that said conical shape have between three and ten corners or locations wherein a side of said conical shape meets another section of said conical shape. While said vibration-type device may enhance the liquid/solids separation of said group IA or group IIA metal hydroxide aqueous solution from said solid phase, it is preferred that said vibration-type device have the ability to limit or minimize bridging of the solid phase in the bottom of the conical section of said separation vessel.

It is most preferred to separate an aqueous solution of a metal hydroxide from said Group IIA sulfoxy salt, such that an aqueous solution is obtained comprising said metal and said hydroxide, and a moist solid phase is obtained comprising said Group IIA sulfoxy salt, said metal, said hydroxide and water. Again, the preferred metal is sodium and the preferred Group IIA metal is calcium.

It is most preferred that said separation vessel, as described previously herein be performed a number of times, wherein a subsequent separation vessel have added to it the moist solids phase from a previous separation vessel, and wherein within or prior to said subsequent separation vessel water is added to the separated moist solid from said previous separation vessel, such that the concentration is lowered of said group IA or group IIA metal hydroxide in aqueous solution. It is preferred that the water concentration within the first separation vessel be controlled by the addition of water to at least one selected from a list consisting of: water to a lime slaker, water to calcium hydroxide, water to said first separation vessel, water to a group IIA metal other than calcium, and any combination therein.

It is preferred to perform a water dilution of a moist solid phase from a separation thereby creating a mixture comprising said metal, water, a hydroxide and a moist solid, wherein said moist solid phase comprises a Group IIA metal with at least one selected form a of list consisting of: sulfate, sulfate ½ hydrate, sulfate di-hydrate, sulfite, hydrogen sulfite, sulfite di-hydrate and any combination therein, wherein the concentration of said metal hydroxide in said mixture is less than previous, and wherein said aqueous solution is separated from said moist solid, such that an aqueous solution is obtained comprising said metal hydroxide, and a moist solid phase is obtained comprising said Group IIA metal salt, said metal hydroxide and water.

It is most preferred that the moist solid phase from a separation vessel be transferred to a subsequent separation vessel. It is an embodiment that said transfer comprise at least one selected from a list consisting of: a screw, an auger, a conveyor, a pneumatic system, and any combination therein, as is known in the art of solids transfer.

It is most preferred that the moist solid phase from the last separation vessel, final separated moist solids, be transferred to a dryer so as to reducing the water in said moist solids. It is preferred to pH adjust said final separated solids with an acid prior to said transfer to said dryer. It is preferred that said acid for said pH adjustment of said final separated solids comprise a sulfoxy type acid. It is most preferred that said sulfoxy type acid comprise sulfuric acid.

It is preferred that said Group IIA metal hydroxide is formed by the reaction with water of: said Group IIA metal or Group IIA metal oxide or Group IIA metal hydroxide, in what is otherwise known as a slaker unit. It is most preferred that said Group IIA metal comprises calcium. It is most preferred that said Group IIA metal comprise calcium, such that said Group IIA oxide comprises calcium oxide, said Group IIA metal hydroxide comprises calcium hydroxide and said Group IIA metal sulfoxy salt comprises calcium sulfoxy salt. It is most preferred that said sulfoxy moiety comprise sulfate.

It has been learned by this instant invention that should the aqueous phase in said last separation vessel be about less than 10% of a Group IA metal hydroxide that the final separated solids will be about 90 to 98 percent of at least one selected from a list consisting of: a calcium sulfoxy salt, a calcium sulfoxy salt hydrate, a calcium sulfoxy salt dehydrate and any combination therein, herein referred to as gypsum product. (Again, calcium can be replaced with a group IIA metal.)

As the solubility of calcium hydroxide in water is about less than 2,000 mg/L, depending upon temperature, there may be situations wherein it is preferred to remove soluble calcium, or any group IIA metal, from a group IA metal hydroxide or a group IA metal hypohalite. It is a preferred embodiment to purify a group IA metal hydroxide or group IA metal hypohalite of calcium, or any group IIA metal, by adding to an aqueous solution of said group IA metal hydroxide or group IA metal hypohalite a from of carbonate or of carbon dioxide, which forms carbonate upon contact with water. Said carbonate, it is found by the instant invention, will then form calcium carbonate, or a group IIA carbonate, within said group IA metal hydroxide solution or said group IA metal hypohalite solution. Calcium carbonate, or group IIA metal carbonates, being soluble at only about 20 mg/L or less, will then form a precipitate leaving about less than 20 mg/L of calcium in solution with said group IA metal hydroxide. Said calcium carbonate is then preferably separated from said group IA metal hydroxide solution or group IA metal hypohalite by at least one selected form a list consisting of: an additional separation vessel, as described herein; filtration; gravity settling; clarification; and any combination therein. It is preferred that said calcium carbonate be dried separately or with said gypsum product.

Polynucleate Aluminum Compounds (PAC), PMC, and MP(s)

Polynucleate aluminum compounds (PAC) and polynucleate metal compounds (PMC), whether or not containing aluminum, are both referred to as metal polymers (MP(s)). MP(s) as used herein refer to polynucleate metal compositions such as aluminum chlorohydrate, aluminum hydroxychloride, aluminum hydroxyhalide, polyaluminum hydroxysulfate and polyaluminum hydroxychlorosulfate, polyaluminum hydroxyhalosulfate polyaluminum hydroxy sulfate calcium chloride, polyaluminum hydroxy sulfate calcium halide, polyaluminum hydroxychlorosulfate calcium chloride, polyaluminum hydroxychlorosulfate calcium halide, polyaluminum hydroxyphosphate chloride, polyaluminum hydroxyphosphate halide, polyaluminum hydroxy "metal" chloride and/or sulfate and/or phosphate, polyaluminum "multi-metal" hydroxy chloride and/or sulfate and/or phosphate, polyaluminum hydroxy "metal" halide and/or sulfate and/or phosphate, polyaluminum "multi-metal" hydroxy halide and/or sulfate and/or phosphate and the like, and poly metal hydroxy halide and/or sulfate and/or phosphate and the like wherein the metal is any metal that exists in the +2 or +3 valence state.

It has been shown possible by means of the instant invention to obtain the above-mentioned MP(s), whereby the raw materials can simply be: a metal halide salt; along with a metal in said MP in the form of at least one selected from a list consisting of: the base metal, hydroxide form, oxide form and any combination therein, as well as comprising a sulfoxy acid, preferably $H_2SO_4$ and/or $H_2SO_3$. Moreover, recycled metal is a possibility, as compared to a refined metal oxide and/or hydroxide. Metals, other than aluminum, can be used if prepared or capable of entering their +2 or +3 valence state in their respective acid, oxide or hydroxide form. And, as a recycling measure, waste catalyst streams or waste brine streams from refineries and/or chemical plants containing aluminum halide or other metal halides can be used to manufacture MP.

It is a preferred embodiment to prepare an MP, comprising at least one metal in the +2 or the +3 valence state, wherein said polynucleate metal compound is formed by the aqueous reaction of a metal halide solution with at least one metal, wherein said metal halide solution comprises at least one metal in the +2 or +3 valence state, wherein said at least one metal is in the 0, +2 or +3 valence state, and if in the 0 valence state is capable of entering the +2 or +3 valence state, wherein said metal halide solution is formed by the aqueous reaction between said metal(s) within said metal halide solution and a halide acid, and wherein said halide acid is formed by the reaction of a metal halide salt, comprising the corresponding halide of said halide acid, with a sulfoxy acid.

It is preferred that the metal(s) in said metal halide solution or said at least one metal comprise at least one selected from a group consisting of: ammonium, a Group IIA metal, a Group IIIB metal, a Group IVB metal, a Group VB metal, a Group VIB metal, a Group VIIB metal, a Group VIII metal, a Group 1B metal, a Group IIB metal, a Group IIIA metal, and any combination therein. It is preferred that said metal in said metal halide solution comprise a group IIIA metal; it is most preferred that said metal in said metal halide salt comprise aluminum. It is preferred that said MP comprise a sulfoxy acid, most preferably $H_2SO_4$. It is preferred that the sulfoxy acid is formed by the sulfuric acid contact process.

It is preferred that at least one of: the metal in the metal halide solution is aluminum and said at least one metal is aluminum, the metal in said metal halide solution is aluminum and the at least one metal is at least one metal other than aluminum, the metal in the metal halide solution is a metal other than aluminum and the at least one metal is aluminum, and the metal in the metal halide solution and the at least one metal is a metal other than aluminum.

It is preferred that the halide in the MP comprise at least one of chlorine and bromine. It is preferred that said MP comprises at least one selected from a list consisting of: sulfate, phosphate, carbonate, silicate, nitrate and any combination therein.

MP formation is to be performed in a reaction vessel, termed a metal polymerization reactor (MPR). Said MPR can comprise at least one selected from a list consisting of a: continuous stirred tank reactor (CSTR), a batch stirred tank reactor, a pipe reactor (otherwise known as a plug flow reactor, PFR), and any combination therein, as known in the art. (If a CSTR, residence times of 1 to 4 hours may be required.) It is most preferred that said MPR have high shear mixing, as the instant invention has found high shear conditions during aqueous formation of MP(s) to minimize waste-product, gel, formation and maximize final product, MP formation. It is preferred that reactor mixing energy create a shear situation of approximately greater than 30 $sec^{-1}$. It is most preferred that reactor mixing energy create a shear situation of approximately greater than 45 $sec^{-1}$. High shear is defined in this instant invention as a mixing energy of approximately greater than 30 $sec^{-1}$. However, as is known in the art of mixing and agitation, a high shear mixing scenario can be obtained by many means, including a centrifugal pump, homogenizer, reactor agitator or any physical system which combines the aqueous reactants in a situation of high kinetic energy contact, thereby creating a situation of high Reynolds Number of about greater than about 1,000 and preferably greater than about 2,000. It is a preferred embodiment to manufacture said MP by batch in a stirred tank reactor. It is most preferred to manufacture said MP in a plug flow or pipe reactor. It has further been found in the instant invention that high shear mixing energies lengthen the shelf life of the MP by as much as 100 to 500 percent. It is theorized that this increase is obtained due to a minimization on an atomic scale of gel formation during MP formation and thereby a minimization of available sites for macro gel globules to begin formation over time.

A final MP product is prepared having a metal content, preferably comprising aluminum, of approximately 3-12 percent. A solid MP can be obtained by reducing the water in an MP, wherein a product containing approximately 12-24 percent of aluminum is obtainable, whereby spray drying or rolling can be used as the drying method. A product containing aluminum and another metal(s) can be obtained, wherein the combined aluminum/other metal(s) concentration is less than or equal to approximately 12 percent if in solution or approximately equal to or less than 24 percent if dried. A product containing at least one metal other than aluminum can be obtained, wherein the metal(s) concentration is less than or equal to approximately 12 percent if in solution or approximately equal to or less than 24 percent if dried.

There is no need to use an excess of aluminum or metal in the MPR, as with high shear mixing, the reaction has demonstrated near complete incorporation of aluminum. As is known in the art, a higher molar relationship can easily be increased by adding CaO, $CaCO_3$ or $Ca(OH)_2$ whereby a molar relationship of 1.8-1.9 can be obtained without increasing the reaction time to any considerable extent. In the case that one should want a further increase in the molar relationship OH:Al or OH:metal up to 2.5, metallic aluminum or metallic metal is to be added in the stoichiometric amount.

It is preferred to manufacture an MP containing the sulfoxy moiety by incorporating a sulfoxy acid into the MPR under a situation of high shear mixing.

It is a preferred embodiment there is no vehicular transportation of at least one selected from a list consisting of said: halide acid, metal halide solution, sulfoxy acid, and any combination therein.

It is preferred to manufacture said MP in an MPR heated with steam, as described herein, along with obtaining steam from the formation of at least one selected from a list consisting of: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein. It is further an embodiment to create electricity from the energy of said steam as described previously in this instant invention.

MAS (ACS Formation)

It is an embodiment to react at least one metal other than aluminum into the MP; said metal(s) are to be preferably acidified prior to addition to the MPR. When any metal other than aluminum is reacted in the MP, said metal(s) needs to: form either a +2 or +3 valence state in said MAS, be prepared in their respective oxide or hydroxide form in either the +2 or +3 valence state prior to addition to the MPR or be capable of entering a +2 or +3 valence state in the MPR. While more than one metal other than aluminum can be entered into the MP and an MP can be manufactured with at least one metal other than aluminum, wherein no aluminum is used, in the instant invention it is preferred to maximize the use of aluminum and minimize the use of other metals due to the availability and cost of bauxite, alumina and aluminum. For particular applications, it may be preferred to choose a metal for that particular application; examples would include zirconium for antiperspirants, copper for algae control in water systems, tin as a sacrificial metal in corrosion control applications and gold, copper or silver for conductivity applications. MAS is, therefore, defined herein as at least one metal in halide acid solution wherein said metal(s) are in the +2 or +3 valence state in concert with at least one halogen in anionic form.

MAS is formed from the aqueous reaction of a halide acid with a metal, metal salt, metal oxide or metal hydroxide, wherein said reaction with a metal, metal oxide and metal hydroxide is preferred. MAS is formed in the Metal Acid Reactor (MAS). Aluminum halide solution (AHS) is formed from the reaction of the halide acid with at least one selected from a list consisting of: bauxite, an aluminum salt, aluminum, aluminum oxide and aluminum hydroxide. The formation of MAS or AHS can occur in any vessel with agitation, such as a CSTR or a PFR. A vent scrubber is preferably to be placed on said reactor or downstream of said reactor to control emissions of hydrogen chloride gas (HCl(g)), or other halogen gas if a halogen acid other than HCl is used. A portion of the enthalpy from AHS or MAS manufacture can be utilized to decompose halite ions and/or provide heat to said MPR. AHS and/or MAS containing up to 5 percent metal, preferably aluminum, can easily be prepared. AHS and MAS are easily prepared with the appropriate halide acid reacting with the chosen metal, metal salt, metal oxide or metal hydroxide.

Alumina

The purification of bauxite to alumina creates alumina for the preparation of aluminum halide solution (AHS), wherein AHS can be formed by reacting alumina with HCl. Purified bauxite, alumina, may also be required for MP production, in the MPR, if the raw bauxite contains any other heavy metal impurities and the resultant MP is to be used in drinking water purification or another application where heavy metal purity is an issue.

It is preferred to provide steam to a portion of the metal hydroxide solution in order to perform the "Bayer" Refining Process (BRP), which can preferably proceed adjacent to the SACP and/or the EU, thereby utilizing the enthalpy of sulfoxy acid formation and/or electrolysis to minimize steam required in the BRP. While the BRP is most preferably used to purify bauxite, an alternate preferred method would be to utilize recycled aluminum metal, where the metal is purified in the BRP alone or with bauxite. If recycled aluminum is used, a portion of the halide acid production can be used to assist in the purification of the recycled aluminum or converting the aluminum to the associated aluminum halide acid, which is preferably aluminum chloride solution, ACS. A side stream of the hydroxide solution is preferably available to the MPR to assist in managing either the reactor pH or final MP basicity, as needed. Portions of the metal hydroxide solution are preferably sent to the halide acid gas scrubbing system to pH-neutralize the liquid effluent and/or to the by-product metal stream to pH balance the final by-product metal sulfate, sulfite or bisulfite salt.

Aluminum is provided for the MP or AHS with at least one selected from a list comprising: bauxite, alumina, aluminum hydroxide, aluminum metal and any combination therein. The aluminum metal can be refined or recycled. Should bauxite be used and NaOH or MOH from the EU be provided to refine the bauxite, the waste minerals from bauxite refining have many market uses, such as soils stabilization. It is most preferred to use alumina, aluminum or purified recycled aluminum in the preparation of AHS and MP because the acidification of bauxite, aluminum, aluminum oxides and aluminum hydroxides to AHS can also acidify any other metal impurities that may be present in recycled aluminum or bauxite, thereby allowing said metal impurities to react within the AHS and/or the final MP. In cases wherein heavy metal contamination is not an issue and/or the bauxite is pure enough from other earthen contaminants, both AHS and MP can be formed utilizing the raw bauxite. Any metal oxides that do not enter the MP complex can be used for soil stabilization.

Energy

The instant invention manages hazardous materials, heat energy, chemical energy, electrical energy, as well as investments in equipment and raw materials more effectively than previous processes, which focused primarily on formation of the polynucleate aluminum compounds and/or disinfectants. In contrast, the instant invention focuses on the processes of MP production and disinfectant production, incorporating methods to manage materials and energy not taught previously. Due to this management, the cost of manufacture of MP(s) and ACS, or AHS or MAS is much less than that previously. Due to this management, the cost of manufacture of a disinfectant and/or an oxidant is much less than that previously.

The metal acid reactor (MAR) used to form AHS and/or MAS is also preferably placed near or adjacent to the EU and/or the HAR and preferably adjacent to the MPR so that the enthalpy of reaction to from MAS or AHS can be utilized in the MPR. It is preferred that the MPR and the MAR, and most preferably the HAR be the same equipment, e.g. the same vessel, such that in that same vessel: a) an aqueous solution of said halide acid is formed from the reaction of said halide acid in water, b) said MAS is formed by the reaction of said metal(s) in said halide acid, and c) said MP is formed by the reaction of said at least one metal(s) in said MAS.

The MPR is preferably adjacent or near the EU and/or the BRP so that the enthalpy of alumina formation can be utilized in the formation of MP(s). It is preferred that a vent scrubber be placed on the reactor to control halide acid gas emissions. The MPR may be equipped to operate at elevated temperature, pressure or both to form MP(s). It is preferred that the MPR be operated at approximately 100-150° C. (212-302° F.); however, depending on the final product composition, the MPR can be operated between approximately 30-200° C. (86-381° F.). While higher temperatures allow for an increase in the reaction rate constant for MP formation, increases in MPR operating temperature require a corresponding increase in the operating pressure to maintain reactants in an aqueous solution ($H_2O$, Al, OH, Cl, etc.) Reactor pressure can be 1 to 7 atmospheres absolute, wherein 1 to 4 atmospheres absolute is preferred.

Heat energy, enthalpy, or temperature of matter, may be obtained from: SAR or SACP; sulfoxy salt formation; calcium hydroxide formation; the electrolysis unit; formation of a calcium sulfoxy salt; pH adjustment; halogen dioxide formation; metal halate formation; metal halide acid formation, and halide acid formation. Energy will be required for bauxite purification to alumina, if bauxite is used and needs to be purified. Energy will be required for MP formation in the MPR. Energy will be required for recycled aluminum purification, if employed. Depending on production rates and the type of raw materials utilized, energy can be easily transferred from one reaction vessel to another (via heat transfer of water and/or steam, vessel water jacketing and vessel steam jacketing, or in the form of the product itself) so that there is maximal efficiency in the use of enthalpy from chemical reactions and usage as hot water and/or steam energy.

It is preferred that the energy from the formation of at least one selected from a list consisting of: SAR; bisulfate or bisulfite formation; calcium hydroxide formation; the electrolysis unit; formation of a calcium sulfoxy salt, pH adjustment, halogen dioxide formation, metal halate formation, metal AHS or MAS formation, halide acid formation, and any combination therein is used to heat water and/or steam. It is preferred that the heated water and/or steam is at least partially used to heat at least one selected from a list consisting of: the aqueous reaction of a metal halide solution with a metal to form a polynucleate metal compound, the reaction of a metal hydroxide with a halide acid to form a metal hypohalite, heating and/or reducing the water in a calcium sulfoxy salt, heating and/or reducing the water in a group IA or a group IIA sulfoxy salt, and any combination therein.

It is most preferred to manufacture at least one of an: MP, AHS, hypohalite, halite, halate and halogen oxide without vehicular transportation of hazardous materials, which would include at least one selected from a list comprising: metal acid solution, halide acid solution, sulfuric acid and caustic.

Construction Materials

It is preferred that said metal sulfoxy salt and/or said gypsum product be used in wall-board, sheetrock, manufacture. It is most preferred that said metal sulfoxy salt and/or gypsum product comprise or be blended with at least one selected from a list consisting of sodium sulfate, lime, hydrated lime, calcium sulfate, magnesium sulfate, aluminum sulfate, silicone sulfate, sodium carbonate, calcium carbonate, magnesium carbonate, aluminum carbonate, silicone carbonate, silica, silicates, sand, wax, glass, glass fiber, paper, adhesive, cement and any combination thereof to form a wall-board product. It is preferred that said sulfoxy salt, gypsum product or wallboard product be used in the manufacture of construction materials. It is most preferred that said construction materials comprise a wall-board or SHEETROCK (dry-wall) type product.

It is an embodiment that said gypsum product is used in soil stabilization.

Manufacturing Process Flow Paths

A preferred embodiment of the instant invention is to form within a manufacturing plant, manufacturing process systems and/or flow paths.

It is a preferred embodiment to form at least one plant or manufacturing process flow path, wherein water or steam obtain heat energy via heat transfer equipment from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form at least one plant or manufacturing process flow path, wherein steam and/or hot water energy is obtained by heat transfer from at least a portion of the energy of formation of a halide acid and a metal sulfoxy salt from the reaction of a metal halide salt with a sulfoxy acid. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy of formation of a calcium sulfoxy salt from the reaction of a calcium hydroxide with a metal sulfoxy salt. It is most preferred that said metal comprise sodium.

It is a preferred embodiment to form at least one plant or manufacturing process flow path, wherein steam and/or hot water energy is obtained by heat transfer from at least a portion of the energy of formation of a metal halide solution from the reaction of at least one metal with a halide acid. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy of formation of a metal sulfoxy salt from the reaction of a metal hydroxide with a sulfoxy acid. It is most preferred that said metal comprise sodium.

It is a preferred embodiment to form at least one plant or manufacturing process flow path, wherein steam and/or hot water energy is obtained by heat transfer from at least a portion of the energy of formation of a halogen dioxide from the reaction of a metal halate with a sulfoxy acid and sulfur dioxide. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy of formation of a halogen dioxide from the reaction of a metal halate with a sulfoxy acid and hydrogen peroxide. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy of formation of a metal halite from the reaction of a halogen dioxide with a halogen acid. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy of formation of a metal halite from the reaction of a halogen dioxide with hydrogen peroxide and a metal hydroxide. It is most preferred that said metal comprise sodium. It is most preferred that said halide comprise chlorine.

It is a preferred embodiment to form at least one plant or manufacturing process flow path, wherein steam and/or hot water energy is obtained by heat transfer from at least a portion of the energy from an EU.

It is a preferred embodiment to form at least one plant or manufacturing process flow path, wherein any of said steam and/or hot water energy is used via heat transfer to heat at least one selected from the list consisting of: an MPR unit, an MAR unit, a bleach unit, an HAR unit, a halogen dioxide generation unit, and air. It is most preferred that said metal comprise sodium. It is most preferred that said halide comprise chlorine.

It is a preferred embodiment that at least one MPR, at least one MAR, and at least one HAR, form a plant or manufacturing process flow path, wherein said at least one MAR is upstream of said at least one MPR, wherein said at least one HAR is upstream of said at least one MAR, wherein an MP is formed in said at least one MPR by reacting at least one metal with an MAS solution formed in said at least one MAR, and wherein said halide acid is formed in said at least one HAR by reacting a metal halide salt with a sulfoxy acid.

It is a preferred embodiment that at least one MPR, at least one MAR, at least one SAR, and at least one HAR, form a plant or manufacturing process flow path, wherein said at least one MAR is upstream of said at least one MPR, wherein said at least one HAR is upstream of said at least MAR, wherein said SAR is upstream of said HAR, wherein a polynucleate metal compound is formed in said at least one MPR by reacting at least one metal with MAS formed in said at least one MAR, wherein said MAR forms said MAS by reacting a metal with a halide acid, and wherein said halide acid is formed in said at least one HAR by reacting a metal halide salt with a sulfoxy acid formed in said at least one SAR.

It is a preferred embodiment that at least one MPR, at least one MAR, at least one SAR, at least one HAR, and at least one EU form a plant or manufacturing process flow path, wherein said at least one MAR is upstream of said at least one MPR, wherein said at least one HAR is upstream of said at least one MAR, wherein said SAR is upstream of said HAR, wherein said at least one EU is upstream of said at least one MAR, wherein a polynucleate metal compound is formed in said at least one MPR by reacting at least one metal with an MAS formed in said MAR, wherein said MAS is formed in said MAR by reacting a halide acid with a metal, wherein said halide acid is formed in at least one HAR and/or at least one EU, and wherein within said HAR said halide acid is formed by reacting a metal halide salt with a sulfoxy acid formed in said at least one SAR.

It is preferred to form a plant or manufacturing process flow path, wherein a unit or units comprising an MPR is downstream of at least one MAR unit manufacturing ACS and/or MAS. It is preferred that said MAR is downstream of at least one EU and/or HAR forming a halide acid.

It is preferred to form a plant or manufacturing process flow path, wherein at least one MPR is downstream of at least one MAR, wherein said MAR forms ACS and/or MAS and is downstream of at least one EU and/or HAR forming a halide acid, wherein the sulfoxy acid, preferably $H_2SO_4$, for said HAR is manufactured in a unit or units comprising an SACP and the electricity for said EU is created in a generator driven by a steam turbine, wherein steam energy turns said steam turbine, and wherein said steam energy is obtained from the formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is preferred for the MPR and MAR unit(s) to be one and the same, such that: a first reaction forms a halide acid from the reaction of a halide acid gas in water or addition of an aqueous halide acid to the reactor; a second reaction forms an MAS (preferably ACS) by the addition of at least one metal (preferably comprising alumina) to said halide acid; and, a third reaction forms an polynucleate metal compound from the addition of at least one metal (preferably comprising alumina) to said reactor.

It is a preferred embodiment to form a plant or manufacturing process flow path, wherein at least one unit forms a disinfectant and/or an oxidant in an EU, wherein the electricity for electrolysis in said EU is obtained from a generator driven by a steam turbine, wherein the steam energy used to turn said steam turbine is obtained from heating at least one of water and steam by heat transfer from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment that an EU and an HAR form a plant or manufacturing process flow path, wherein at least one disinfectant is formed in said EU and at least one halide acid and a metal sulfoxy salt is formed in an HAR, wherein said halide acid(s) can be used to further form an additional disinfectant in at least one unit downstream of said EU by reacting said halide acid formed in said HAR with a disinfectant formed in said EU; it is most preferred that said disinfectant formed in said EU is a metal halate and that the disinfectant formed with the reaction of said metal halate with said halogen acid be the corresponding halogen dioxide, preferably chlorine dioxide. It is preferred that said metal comprise a group IA or group IIA metal. It is most preferred that said metal comprise sodium. It is most preferred that said halogen comprise chlorine.

It is a preferred embodiment that at least one SAR, at least one EU, at least one HAR, at least one halogen dioxide generator, at least one metal halite unit, at least one slaker, at least one gypsum unit, at least one separator, at least one bleach unit, and at least one dryer, form a plant or manufacturing process flow path, wherein said SAR is upstream of said at least one EU and said at least one HAR, wherein said at least one EU is upstream of said at least one halogen dioxide generator, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR and/or said at least one EU, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one HAR forms a halogen acid and a metal sulfoxy salt by reacting a metal halide salt with a sulfoxy acid from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from said at least one HAR or one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from said at least one HAR or one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR or one of said at least one EU with the metal hydroxide from said at least one separator or one of said at least one EU, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one EU, at least one HAR, at least one halogen dioxide generator, at least one metal halite unit, at least one slaker, at least one gypsum unit, at least one separator, at least one bleach unit, and at least one dryer, form a plant or manufacturing process flow path, wherein said at least one EU is upstream of said at least one halogen dioxide generator, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR and/or said at least one EU, wherein one of said at least one EU forms $H_2O_2$ from water utilizing $H_2SO_4$ as a catalyst, wherein said at least one HAR forms a halogen acid and a metal sulfoxy salt by reacting a metal halide salt with a sulfoxy acid, wherein said halogen dioxide generator produces a halogen dioxide by reacting the metal halate from one of said at least one EU with a sulfoxy acid and $SO_2$ or with $H_2O_2$ from said at least one EU and a sulfoxy acid or with a halogen acid from said at least one HAR or one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from said at least one HAR or one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR or one of said at least one EU with the metal hydroxide from said at least one separator or one of said at least one EU, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one HAR, at least one halogen dioxide generator, at least one metal halite unit, at least one slaker, at least one gypsum unit, at least one separator, at least one bleach unit, and at least one dryer, form a plant or manufacturing process flow path, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR, wherein said at least one HAR forms a halogen acid and a metal sulfoxy salt by reacting a metal halide salt with a sulfoxy acid, wherein said halogen dioxide generator produces a halogen dioxide by reacting a metal halate with a sulfoxy acid and $SO_2$ or with $H_2O_2$ and a sulfoxy acid or with a halogen acid from said at least one HAR, wherein a metal halite is formed by the reaction of said halogen dioxide formed in said halogen dioxide generator with $H_2O_2$ and a metal hydroxide from said at least one separator or with a halogen acid from said at least one HAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR with the metal hydroxide from said at least one separator, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one halogen dioxide generator, at least one metal halite unit, at least one slaker, at least one gypsum unit, at least one separator, at least one bleach unit, and at least one dryer, form a plant or manufacturing process flow path, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said halogen dioxide generator produces a halogen dioxide by reacting a metal halate with a sulfoxy acid and $SO_2$ or with $H_2O_2$ and a sulfoxy acid or with a halogen acid, wherein a metal halite is formed by the reaction of said halogen dioxide formed in said halogen dioxide generator with $H_2O_2$ and a metal hydroxide from said at least one separator or with a halogen acid, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a metal hypohalite is formed in said at least one bleach unit by reacting the halide acid with the metal hydroxide from said at least one separator, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one slaker, at least one gypsum unit, at least one separator, at least one bleach unit, and at least one dryer, form a plant or manufacturing process flow path, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a metal hypohalite is formed in said at least one bleach unit by reacting a halide acid with the metal hydroxide from said at least one separator, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one at least one slaker, at least one gypsum unit, at least one separator, and at least one dryer, form a plant or manufacturing process flow path, wherein said at least one slaker is upstream of said at least one gypsum unit, wherein said at least one gypsum unit is upstream of said at least one separator, wherein said at least one separator is upstream of said at least one dryer, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one halogen dioxide generator, at least one metal halite unit, at least one slaker, at least one gypsum unit, at least one separator, at least one bleach unit, and at least one dryer, form a plant or manufacturing process flow path, wherein said SAR is upstream of said at least one HAR, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR, wherein the electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said halogen dioxide generator produces a halogen dioxide by reacting a metal halate with a sulfoxy acid and $SO_2$ from said at least one SAR or with $H_2O_2$ and a sulfoxy acid from said at least one SAR or with a halogen acid from said at least one HAR, wherein a metal halite is formed by the reaction of said halogen dioxide formed in said halogen dioxide generator with $H_2O_2$ and a metal hydroxide from said at least one separator or with a halogen acid from said at least one HAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR with the metal hydroxide from said at least one separator, wherein a product comprising calcium sulfoxy salt or a hydrated calcium sulfoxy salt is obtained from said at least one dryer by removing water from said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one halogen dioxide generator, at least one metal halite unit, at least one slaker, at least one gypsum unit, at least one separator, at least one bleach unit, and at least one dryer, form a plant or manufacturing process flow path, wherein said SAR is upstream of said at least one EU, wherein said at least one EU is upstream of said at least one halogen dioxide generator, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one EU, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a metal hypohalite is formed in said at least one bleach unit by reacting the halide acid from one of said at least one EU with the metal hydroxide from said at least one separator or one of said at least one EU, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one HAR, at least one slaker, at least one gypsum unit, at least one separator, at least one bleach unit, and at least one dryer, form a plant or manufacturing process flow path, wherein said SAR is upstream of said at least one EU and said at least one HAR, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR and/or said at least one EU, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one HAR forms a halogen acid and a metal sulfoxy salt by reacting a metal halide salt with a sulfoxy acid from said at least one SAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR or one of said at least one EU with the metal hydroxide from said at least one separator or one of said at least one EU, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one slaker, at least one gypsum unit, at least one separator, at least one bleach unit, and at least one dryer, form a plant or manufacturing process flow path, wherein said SAR is upstream of said at least one HAR, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one HAR, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a metal hypohalite is formed in said at least one bleach unit by reacting the halide acid from said at least one HAR with the metal hydroxide from said at least one separator, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one slaker, at least one gypsum unit, at least one separator, at least one bleach unit, and at least one dryer, form a plant or manufacturing process flow path, wherein said SAR is upstream of said at least one EU, wherein said at least one slaker is upstream of said at least one gypsum unit, wherein said at least one gypsum unit is upstream of said at least one separator, wherein said at least one separator is upstream of said at least one dryer, wherein said at least one separator is upstream of said at least one bleach unit, wherein said at least one bleach unit is downstream of said at least one EU, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a metal hypohalite is formed in said at least one bleach unit by reacting the halide acid from one of said at least one EU with the metal hydroxide from said at least one separator or one of said at least one EU, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one slaker, at least one gypsum unit, at least one separator, and at least one dryer, form a plant or manufacturing process flow path, wherein said SAR is upstream of said at least one HAR, wherein said at least one slaker is upstream of said at least one gypsum unit, wherein said at least one gypsum unit is upstream of said at least one separator, wherein said at least one separator is upstream of said at least one dryer, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one slaker, at least one gypsum unit, at least one separator, and at least one dryer, form a plant or manufacturing process flow path, wherein said SAR is upstream of said at least one EU, wherein said at least one slaker is upstream of said at least one gypsum unit, wherein said at least one gypsum unit is upstream of said at least one separator, wherein said at least one separator is upstream of said at least one dryer, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one HAR, at least one halogen dioxide generator, and at least one metal halite unit, form a plant or manufacturing process flow path, wherein said SAR is upstream of said at least one EU and said at least one HAR, wherein said at least one EU is upstream of said at least one halogen dioxide generator, wherein said at least one halogen dioxide generator is upstream of said at least one metal halite unit, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one HAR forms a halogen acid and a metal sulfoxy salt by reacting a metal halide salt with a sulfoxy acid from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from said at least one HAR or one of said at least one EU, and wherein a metal halite is formed by the reaction of said halogen dioxide formed in said halogen dioxide generator with $H_2O_2$ from one of said at least one EU and a metal hydroxide from one of said at least one EU or with a halogen acid from said at least one HAR or one of said at least one EU. It is preferred that said metal comprise a Group IA or IIA metal. It is most preferred that said metal comprise sodium. It is most preferred that said halogen comprise chlorine.

It is a preferred embodiment that at least one SAR, at least one EU, at least one halogen dioxide generator, and at least one metal halite unit, form a plant or manufacturing process flow path, wherein said SAR is upstream of said at least one EU, wherein said at least one EU is upstream of said at least one halogen dioxide generator, wherein said at least one halogen dioxide generator is upstream of said at least one metal halite unit, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from one of said at least one EU, and wherein a metal halite is formed by the reaction of said halogen dioxide formed in said halogen dioxide generator with $H_2O_2$ from one of said at least one EU and a metal hydroxide from one of said at least one EU or with a halogen acid from one of said at least one EU. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one halogen dioxide generator, and at least one metal halite unit, form a plant or manufacturing process flow path, wherein said SAR is upstream of said at least one HAR, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said halogen dioxide generator produces a halogen dioxide by reacting a metal halate with a sulfoxy acid and $SO_2$ from said at least one SAR or with $H_2O_2$ and a sulfoxy acid from said at least one SAR or with a halogen acid from said at least one HAR, and wherein a metal halite is formed by the reaction of said halogen dioxide formed in said halogen dioxide generator with $H_2O_2$ and a metal hydroxide or with a halogen acid from said at least one HAR. It is preferred that said metal comprise a Group IA or IIA metal. It is most preferred that said metal comprise sodium. It is most preferred that said halogen comprise chlorine.

It is a preferred embodiment that at least one SAR, at least one EU, at least one HAR, and at least one halogen dioxide generator, form a plant or manufacturing process flow path, wherein said SAR is upstream of said at least one EU and said at least one HAR, wherein said at least one EU is upstream of said at least one halogen dioxide generator, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one HAR forms a halogen acid and a metal sulfoxy salt by reacting a metal halide salt with a sulfoxy acid from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from said at least one HAR or one of said at least one EU. It is preferred that said metal comprise a Group IA or IIA metal. It is most preferred that said metal comprise sodium. It is most preferred that said halogen comprise chlorine.

It is a preferred embodiment that at least one SAR, at least one EU, and at least one halogen dioxide generator, form a plant or manufacturing process flow path, wherein said SAR is upstream of said at least one EU, wherein said at least one EU is upstream of said at least one halogen dioxide generator, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from one of said at least one EU and a sulfoxy acid from said at least one SAR or with a halogen acid from one of said at least one EU. It is preferred that said metal comprise a Group IA or IIA metal. It is most preferred that said metal comprise sodium. It is most preferred that said halogen comprise chlorine.

It is a preferred embodiment that at least one SAR, at least one HAR, and at least one halogen dioxide generator, form a plant or manufacturing process flow path, wherein said SAR is upstream of said at least one HAR, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, and wherein said halogen dioxide generator produces a halogen dioxide by reacting a metal halate with a sulfoxy acid and $SO_2$ from said at least one SAR or with $H_2O_2$ and a sulfoxy acid from said at least one SAR or with a halogen acid from said at least one HAR. It is preferred that said metal comprise a Group IA or IIA metal. It is most preferred that said metal comprise sodium. It is most preferred that said halogen comprise chlorine.

It is a preferred embodiment that at least one SAR, at least one EU, at least one HAR, at least one halogen dioxide generator, at least one metal halite unit, at least one slaker, at least one gypsum unit, at least one separator, and at least one dryer, form a plant or manufacturing process flow path, wherein said SAR is upstream of said at least one EU and said at least one HAR, wherein said at least one EU is upstream of said at least one halogen dioxide generator, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said at least one HAR forms a halogen acid and a metal sulfoxy salt by reacting a metal halide salt with a sulfoxy acid from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from said at least one HAR or one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from said at least one HAR or one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one halogen dioxide generator, at least one metal halite unit, at least one slaker, at least one gypsum unit, at least one separator, and at least one dryer, form a plant or manufacturing process flow path, wherein said SAR is upstream of said at least one EU, wherein said at least one EU is upstream of said at least one halogen dioxide generator, wherein said at least one halogen dioxide generator is upstream of said at least one metal halite unit, wherein said at least one slaker is upstream of said at least one gypsum unit, wherein said at least one gypsum unit is upstream of said at least one separator, wherein said at least one separator is upstream of said at least one dryer, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one halogen dioxide generator, at least one metal halite unit, at least one slaker, at least one gypsum unit, at least one separator, and at least one dryer, form a plant or manufacturing process flow path, wherein said SAR is upstream of said at least one HAR, wherein said at least one slaker is upstream of said at least one gypsum unit, wherein said at least one gypsum unit is upstream of said at least one separator, wherein said at least one separator is upstream of said at least one dryer, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said halogen dioxide generator produces a halogen dioxide by reacting the metal halate with a sulfoxy acid and $SO_2$ from said at least one SAR or with $H_2O_2$ and a sulfoxy acid from said at least one SAR or with a halogen acid from said at least one HAR, wherein a metal halite is formed by the reaction of said halogen dioxide formed in said halogen dioxide generator with $H_2O_2$ and a metal hydroxide from said at least one separator or with a halogen acid from said at least one HAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one HAR, at least one slaker, at least one gypsum unit, at least one separator, and at least one dryer, form a plant or manufacturing process flow path, wherein said SAR is upstream of said at least one HAR, wherein said at least one slaker is upstream of said at least one gypsum unit, wherein said at least one gypsum unit is upstream of said at least one separator, wherein said at least one separator is upstream of said at least one dryer, wherein electricity is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein said at least one HAR forms a halogen acid and a metal sulfoxy salt by reacting a metal halide salt with a sulfoxy acid from said at least one SAR, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with the metal sulfoxy salt from said HAR, wherein said at least one separator produces an aqueous metal hydroxide and a moist calcium sulfoxy salt, wherein a product comprising calcium sulfoxy salt or a hydrated calcium sulfoxy salt is obtained from said at least one dryer by removing water from said calcium sulfoxy salt. It is preferred that said metal comprise a Group IA or IIA metal. It is most preferred that said metal comprise sodium. It is most preferred that said halogen comprise chlorine.

It is a preferred embodiment that at least one SAR, at least one EU, at least one slaker, at least one gypsum unit, at least one separator, and at least one dryer, form a plant or manufacturing process flow path, wherein said SAR is upstream of said at least one EU, wherein said at least one slaker is upstream of said at least one gypsum unit, wherein said at least one gypsum unit is upstream of said at least one separator, wherein said at least one separator is upstream of said at least one dryer, wherein the electricity for electrolysis in said EU(s) is obtained from a generator driven by a steam turbine, wherein the steam used to turn said steam turbine to create said electricity is obtained from heat transfer from at least a portion of the energy obtained during formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein, wherein said at least one SAR forms a sulfoxy acid by reacting S with air or $O_2$ and then $H_2O$, wherein one of said at least one EU forms $H_2O_2$ from water utilizing $H_2SO_4$ as a catalyst from said at least one SAR, wherein said halogen dioxide generator produces a halogen dioxide by reacting the metal halate from one of said at least one EU with a sulfoxy acid and $SO_2$ from said at least one SAR or with $H_2O_2$ from said at least one EU and a sulfoxy acid from said at least one SAR or with a halogen acid from one of said at least one EU, wherein a metal halite is formed by the reaction of said halogen dioxide formed in said halogen dioxide generator with $H_2O_2$ from one of said at least one EU and a metal hydroxide from said at least one separator or one of said at least one EU or with a halogen acid from one of said at least one EU, wherein said at least one slaker forms an aqueous solution of calcium hydroxide by reacting calcium, calcium oxide or calcium hydroxide with water, wherein said at least one gypsum unit forms an aqueous metal hydroxide and a solid metal sulfoxy salt by reacting the aqueous calcium hydroxide from said slaker with a metal sulfoxy salt, wherein said at least one separator produces an aqueous metal hydroxide and a moist calcium sulfoxy salt, wherein a product comprising calcium sulfoxy salt or a hydrated calcium sulfoxy salt is obtained from said at least one dryer by reducing the water in said calcium sulfoxy salt. It is preferred that said metal comprise a Group IA or IIA metal. It is most preferred that said metal comprise sodium. It is most preferred that said halogen comprise chlorine.

It is a preferred embodiment to form a plant or manufacturing process flow path, wherein at least one unit performs ASP, thereby producing $O_2$ and $N_2$, wherein said ASP is powered by electricity and/or torque, wherein said electricity and/or torque is produced from steam, and wherein said steam is converted heat energy from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form a plant or manufacturing process flow path, wherein at least one ASP separates $O_2$ from air, wherein said at least one ASP is powered by at least one of a steam engine powered by steam and an electric motor powered by electricity, wherein said $O_3$ is obtained from electrolysis of $O_2$, wherein at least a portion of the electricity for said electrolysis is produced from a generator turned by a steam turbine, and wherein steam to power said steam engine and said steam turbine is at least partially obtained from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form a plant or manufacturing process flow path, wherein at least one unit performs electrolysis, thereby producing $O_2$ and $H_2$ from $H_2O$, wherein said electrolysis is powered by electricity, wherein at least a portion of said electricity is produced in a generator turned by a steam turbine, and wherein said steam turbine is at least partially turned by converted energy from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form a plant or manufacturing process flow path, wherein at least one unit electrolyzes $O_2$ to $O_3$, and wherein said $O_2$ is obtained from electrolysis of $H_2O$, thereby producing $O_2$ and $H_2$, wherein at least a portion of the electricity for said electrolysis is created in a generator driven by a steam turbine, wherein said steam turbine is at least partially turned by steam obtained from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form a plant or manufacturing process flow path, wherein at least one unit electrolyzes $H_2O_2$ from $H_2SO_4$ via $H_2S_2O_8$ and $H_2O$, wherein the electricity for said electrolysis is created in a generator driven by a steam turbine, wherein said steam turbine is turned by steam obtained from at least a portion of the energy of formation of at least one selected from a list comprising: $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

It is a preferred embodiment to form a plant or manufacturing process flow path, wherein at least one unit recycles at least a portion of the $H_2$ byproduct from electrolysis as an energy source to make electricity, wherein said electricity is generated in at least one of a combustion engine and a fuel cell. It is a preferred embodiment to utilize at least a portion of said electricity in the EU to manufacture at least one disinfectant and/or oxidant. It is preferred to convert steam energy into electricity with a steam turbine, as is known in the art.

It is a preferred embodiment to form a plant or manufacturing process flow path, wherein at least one unit recycles at least a portion of the $H_2$ byproduct from electrolysis as an energy source to heat the reaction of said metal halide salt with said sulfoxy acid.

It is a preferred embodiment that sulfoxy acid from said SAR is transferred to said HAR, wherein said sulfoxy acid heat energy and/or temperature is as near that of the temperature in said SAR as is practical, so that said heat energy within said sulfoxy acid is available to said HAR.

Materials of Construction

It is an embodiment that all materials of construction in the instant invention be those as are known in the art of each chemistry processed. It is preferred that materials which contact said sulfoxy acid be at least one selected from a list consisting of: carbon steel, Hastelloy, Inconel®, Incoloy®, titanium, zirconium, ceramic, plastic and any combination therein. It is preferred that materials which contact said halide acid be at least one selected from a list consisting of: Hastelloy, Inconel®, Incoloy®, titanium, zirconium, ceramic, plastic, and any combination therein, wherein Hastelloy C, zirconium and PVC are most preferred. It is preferred that materials which contact hot water be at least one selected from a list consisting of: Hastelloy, Inconel, titanium, zirconium, ceramic, stainless steel and plastic.

Testing

Bench scale tests reacting ACS in solution with aluminum hydroxide at a temperature of 110-140° C. (230-284° F.) for 1.5 to 5 hours, whereby the reaction of $Al_xCl_y(OH)_z$ is formed have been performed. The formation of ACS from aluminum metal was performed in one case and aluminum hydroxide was performed in the second case. In both cases, HCl was formed by the reaction of chlorine gas into water, where the water solution was heated continuously to 60° C. (140° F.) for 15 minutes to assure complete chloride formation. In the third test, a portion of the aluminum hydroxide was replaced with MgO forming $Al_xMg_wCl_y(OH)_z$. In a fourth test, a portion of the ACS was replaced with $MgCl_2$ again forming $Al_xCl_y(OH)_z$. In a fifth test, a portion of the aluminum hydroxide was replaced with lime, CaO, forming $Al_wCa_wCl_y(OH)_z$. In a sixth test, sulfuric acid was added to the ACS forming $Al_xMg_wCl_y(OH)_z(SO_4)_v$. In a seventh and poor-performing test, a portion of the ACS was replaced with ferric chloride. In an eighth test, a portion of the aluminum was replaced with copper forming $Al_xCu_wCl_y(OH)_z$; this rather green product revealed a shelf life of over 2.5 years before forming a precipitate. In test nine, the ACS was replaced with a waste catalyst stream form Dow Chemical containing ACS. Test ten was a field coagulation test of the final MP made in Example "8." In an eleventh test, an MAS was prepared by dissolving $CuCl_3$ in water, which was then reacted with MgO. In all cases, the relationship OH:Al or OH:metal in the resulting compound became 0.5 to 1.5; where, this relationship is preferably greater than 1.2. In all cases the pH of the final solution was between 4.0 and 5.0. In all cases, improved results were obtained with high-shear mixing as compared to low. It was found that at high shear mixing energies, a greater proportion of the aluminum went into the MP and the tendency to form a gelatinous precipitate was reduced.

In test twelve, salts were reacted with concentrated sulfuric acid. While ammonium is not a metal, a test was performed with ammonium chloride since the ammonium cation has "metal-like" qualities in salt formation. Even though the ammonium cation is not the most practical "metal-like" cation, given the results, the term "metal" in metal halides is to include "metal-like" moieties, preferably the ammonium cation. The test results are reviewed below:

EXAMPLE 1

Chlorine gas is slowly bubbled into a 1-L beaker until the Sg of the aqueous solution is approximately 1.08 to 1.1. The acidic solution is continuously stirred and heated to 60° C. for 15 minutes; after which, 50 grams of aluminum metal are dissolved into solution while slowly stirring for 15 minutes to prepare the ACS. 300 ml of this ACS having an aluminum content of approximately 5% is then heated to 120 C and stirred vigorously while slowly adding 30 gm of $Al(OH)_3$ powder. The system is kept at 120° C. and stirred vigorously for 3 hours, after which all of the powder is noted to have gone into solution. The liquid was allowed to cool. The final product was a cloudy liquid having an aluminum content of approximately 10%.

EXAMPLE 2

Chlorine gas is slowly bubbled into a 1-L beaker until the Sg of the aqueous solution is approximately 1.08 to 1.1. The acidic solution is continuously stirred and heated to 60 C for 15 minutes; after which 100 grams of $Al(OH)_3$ powder is dissolved into solution while slowly stirring for 165 minutes to prepare the ACS. 300 ml of this ACS having an aluminum content of approximately 5 percent is then heated to 130° C. and stirred vigorously while slowly adding 30 gm of $Al(OH)_3$ powder. The system is kept at 130 C and stirred vigorously for 3 hours, after which all of the powder is noted to have gone into solution. The liquid was allowed to cool. The final product was a cloudy liquid having an aluminum content of approximately 10 percent.

EXAMPLE 3

An ACS from Gulbrandsen Technologies, GC 2200, was utilized for the ACS. This sample of GC 2200 measured 10.1 percent $Al_2O_3$ having a Sg of 1.28 and due to the yellow color contained iron. To an autoclave, provided with a stirrer, 300 ml of the ACS were added along with 5 gm of MgO from Premiere Services and 25 gm of laboratory grade $Al(OH)_3$ powder. The mixture was heated to 120 C and stirred vigorously for five hours. The liquid was allowed to cool. The final product was clear having an aluminum content of approximately 6 percent and a magnesium content of approximately 2 percent.

EXAMPLE 4

An ACS from Gulbrandsen Technologies, GC 2200, was utilized for the ACS. This sample of GC 2200 measured 10.1 percent $Al_2O_3$ having a Sg of 1.28 and due to the yellow color contained iron. To a 2-L beaker, 300 ml of the ACS were added along with 10 gm of $MgCl_2 \times 6H_2O$ crystals and 25 gm of laboratory grade $Al(OH)_3$ powder. The mixture was heated to 110° C. and stirred vigorously for four hours. The liquid was allowed to cool. The final product was clear having an aluminum content of approximately 10 percent and a magnesium content of approximately 2 percent.

EXAMPLE 5

An ACS from Gulbrandsen Technologies, GC 2200, was utilized for the ACS. This sample of GC 2200 measured 10.1 percent $Al_2O_3$ having a Sg of 1.28 and due to the yellow color contained iron. To an autoclave, 300 ml of the ACS were added along with 10 gm of CaO and 20 gm of laboratory grade $Al(OH)_3$ powder. The mixture was heated to 100° C. and stirred vigorously for four hours. The liquid was allowed to cool. The final product was cloudy having an aluminum content of approximately 7 percent and a calcium content of approximately 3 percent.

EXAMPLE 6

An ACS from Gulbrandsen Technologies, GC 2200, was utilized for the ACS. This sample of GC 2200 measured 10.1 percent $Al_2O_3$ having a Sg of 1.28 and due to the yellow color contained iron. To an autoclave, 300 ml of the ACS were added along with 10 ml of concentrated sulfuric acid and 10 gm of laboratory grade $Al(OH)_3$ powder. The mixture was heated to 140° C. and 25 psig stirring vigorously for four hours. The liquid was allowed to cool. The final product was clear having an aluminum content of approximately 6 percent.

EXAMPLE 7

An ACS from Gulbrandsen Technologies, GC 2200, was utilized for the ACS. This sample of GC 2200 measured 10.1 percent $Al_2O_3$ having a Sg of 1.28 and due to the yellow color contained iron. To an autoclave, 300 ml of the ACS were added along with 30 gm of alum and 10 gm of laboratory grade $Al(OH)_3$ powder. The mixture was heated to 140° C. and 25 psig and turned gelatinous.

EXAMPLE 8

An ACS from Gulbrandsen Technologies, GC 2200, was utilized for the ACS. This sample of GC 2200 measured 10.1 percent $Al_2O_3$ having a Sg of 1.28 and due to the yellow color contained iron. To a 2-L beaker, 300 ml of the ACS were added along with 10 gm of $CuCl_2 \times 6\, H_2O$ crystals and 25 gm of laboratory grade $Al(OH)_3$ powder. The mixture was heated to 100° C. and stirred vigorously for four hours. The liquid was allowed to cool. The final product was clear with a greenish tint having an aluminum content of approximately 8 percent and a copper content of approximately 2 percent.

EXAMPLE 9

A waste catalyst from Dow Chemical (Freeport, Tex.) containing ACS was utilized for the ACS. The sample measured 18 percent $Al_2O_3$ having a Sg of 1.3; due to the greenish color the sample had a small amount of organic contamination. To a 2-L beaker, 300 ml of the ACS were added along with 35 gm of laboratory grade $Al(OH)_3$ powder. The mixture was heated to 105° C. and stirred vigorously for four hours. The liquid was allowed to cool. The final product was clear with a greenish tint having an aluminum content of approximately 10 percent.

EXAMPLE 10

At the time of this test, the city of Marshall, Tex. was in drinking water production using CV 1703 as the coagulant. (CV is a registered trademark of ClearValue.) CV 1703 is a blend that is by volume: 38% CV 1120, 42% CV 1130, 8% CV 3210 and 12% CV 3650. CV 1120 is an ACH measuring 23% $Al_2O_3$ at 84% basicity, CV 1130 is an ACS that measures 10% $Al_2O_3$, CV 3210 is a 50% active Epi-DMA solution that measures 100+/−20 cps, and CV 3650 is a 20% active diallyl dimethyl ammonium chloride polymer that measures 2000+/−200 cps. Prior to using CV 1703, Marshall utilized CV 3650 in concert with alum. Alum was, at that previous time, used at 30 to 35 ppm along with CV 3650 at 1.5 ppm.

Marshall's raw water quality makes water purification difficult:

The raw alkalinity is less than 20 ppm and often as low as 6 ppm,
The raw turbidity is normally 2 to 7 NTU and infrequently 10 to 15 NTU,
The raw color varies from 20 to 400 Apparent Color Units (ACU), and
The raw TOC ranges form 5 to 20 ppm; and UV absorbance 0.2 to 0.7 $m^{-1}$.

Prior to the use of CV 3650 with alum, Marshall operated with just alum and often went out of US EPA and Texas State permit having a final water turbidity of greater than 0.5 NTU; on Alum operation, Marshall frequently measured in excess of 0.20 mg/L of aluminum in the final drinking water. While CV 3650 significantly improved alum operations, water color values of over 200 ACU often required the use of CV 1703.

Prior to using CV 1703, Marshall produced filtered water at a turbidity of near 0.15 to 0.30 NTU under normal operating conditions and higher when the raw water color was a challenge. During operation with CV 1703, Marshall has had the ability to keep the filtered water turbidity under 0.08 NTU under all operating conditions with the settled water turbidity varying from 0.4 to 0.7 NTU. Per US EPA guidelines, Marshall must remove, at times, 45% of the raw water TOC and, at times, 50% of the raw water TOC. During the year 2000, when the raw water had a lower organic content and nearly all of the raw TOC measured DOC per the standard industry test, Marshall was frequently unable to obtain 45% TOC removal. Operation during this time did not produce any final filtered water that had an aluminum concentration of over 0.20 mg/L.

On Dec. 15, 1999, the MP made in Example 8 was jar-tested in comparison to CV 1120 and CV 1703. On that day the raw color measured 55, NTU measured 4.1 and UV measured 0.185 $m^{-1}$. At 15 ppm, CV 1703 obtained a settled turbidity of 0.96 NTU, 14 ACU and 0.071 $m^{-1}$. At 15 ppm, the MP from Example 8 obtained a settled turbidity of 0.69 NTU, 11 ACU and 0.074 $m^{-1}$.

EXAMPLE 11

To a 2-L beaker, 250 ml of water was added prior to 50 gm of $CuCl_2 \times 6H_2O$ crystals; the solution was pH adjusted to 1.0 with HCl. The resulting solution was then mixed with 30 gm of MgO powder. The mixture was heated to 100° C. and stirred vigorously for four hours. The liquid was allowed to cool. The final product was clear with a greenish tint having a copper content of approximately 5 percent and a magnesium content of approximately 5 percent.

EXAMPLE 12

Five salt compositions are reacted with concentrated sulfuric acid to test the efficacy of halide acid formation and sulfate/bisulfite formation.

In the first test, 4 gm of normal table salt (sodium chloride) is placed in a beaker containing 2 g of concentrated sulfuric acid. In this test a rather violent reaction takes place, wherein HCl gas is obviously released due to the tell tale chlorine odor; in the bottom of the beaker a solid precipitate forms which is obviously sodium bisulfate.

In the second test, 4 gm of ammonium chloride is placed into a beaker containing 2 gm of concentrated sulfuric acid. In this test a rather violent reaction takes place, wherein HCl gas is obviously released due to the tell tale chlorine odor; in the bottom of the beaker a solid precipitate forms which is obviously the ammonium sulfate salt.

In the third test, 4 gm of $CuCl_3 \times 6H_2O$ crystals are placed into a beaker containing 2 gm of concentrated sulfuric acid. In this test an aggressive reaction takes place, wherein HCl gas is obviously released due to the tell tale chlorine odor; in the bottom of the beaker a solid precipitate forms which is obviously copper sulfate.

In the fourth test, 4 gm of $AlCl_3 \times 6H_2O$ crystals are placed into a beaker containing 2 gm of concentrated sulfuric acid. In this test an aggressive reaction takes place, wherein HCl gas is obviously released due to the tell tale chlorine odor; in the bottom of the beaker a solid precipitate forms which is obviously aluminum sulfate.

In the fifth test, 4 gm of $MgCl_3 \times 6H_2O$ crystals are placed into a beaker containing 2 gm of concentrated sulfuric acid. In this test an aggressive reaction takes place, wherein HCl gas is obviously released due to the tell tale chlorine odor; in the bottom of the beaker a solid precipitate forms which is obviously magnesium sulfate.

Certain objects are set forth above and made apparent from the foregoing description. However, since certain changes may be made in the above description without departing from the scope of the invention, it is intended that all matters contained in the foregoing description shall be interpreted as illustrative only of the principles of the invention and not in a limiting sense. With respect to the above description, it is to be realized that any descriptions, drawings and examples deemed readily apparent and obvious to one of skill in the art and all equivalent relationships to those described in the specification are intended to be encompassed by the instant invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention, which, as a matter of language, might be said to fall in between.

We claim:

1. A method for the preparation of a polynucleate metal compound, comprising at least one metal in the +2 or +3 valence state, wherein
    the polynucleate metal compound is formed by aqueous reaction of a metal halide solution with at least one metal, wherein
    the metal halide solution comprises in solution at least one metal in the +2 or +3 valence state, wherein
    the at least one metal is in the 0, +2 or +3 valence state, and if in the 0 valence state is capable of entering the +2 or +3 valence state, wherein
    the metal halide solution is made by reacting the at least one metal in the 0, +2 or +3 valence state with a halide acid, and wherein
    the halide acid is formed by the reaction of a metal halide salt, comprising the halide of said halide acid, with a sulfoxy acid.

2. The method of claim 1, wherein at least one of:
    said at least one metal in said metal halide solution is aluminum and said at least one metal is aluminum,
    said at least one metal in said metal halide solution is aluminum and said at least one metal is at least one metal other than aluminum,
    said at least one metal in said metal halide solution is a metal other than aluminum and said at least one metal is aluminum, and
    said at least one metal in said metal halide solution and said at least one metal is a metal other than aluminum.

3. The method of claim 1, wherein
within a single vessel at least one of
    a) an aqueous solution of said halide acid is formed from the reaction of said halide in water,
    b) said metal halide solution is formed by the reaction of said at least one metal in the 0, +2 or +3 valence state in said halide acid, and
    c) said polynucleate metal compound is formed by the reaction of said at least one metal in the 0, +2 or +3 valence state in said metal halide solution.

4. The method of claim 1, wherein said at least one metal comprises Ca.

5. The method of claim 1, wherein said at least one metal is in a form selected from the group consisting of metal, oxide, hydroxide, carbonate and any combination therein.

6. The method of claim 1, wherein said halide in said polynucleate metal compound comprises at least one of chlorine and bromine.

7. The method of claim 1, wherein said polynucleate metal compound further comprises at least one selected from the group consisting of sulfate, phosphate, carbonate, silicate, nitrate and any combination therein.

8. The method of claim 1, wherein said metal halide solution comprises a waste catalyst or waste brine.

9. The method of claim 1, wherein said sulfoxy acid comprises $H_2SO_4$.

10. The method of claim 1, wherein said aqueous reaction is performed with high shear.

11. The method of claim 1, wherein the metal in said metal halide salt comprises a group IA or IIA metal.

12. The method in claim 1, wherein the metal in said metal halide salt comprises sodium.

13. The method of claim 1, wherein there is no vehicular transportation of at least one selected from the group consisting of said halide acid, said metal halide solution, said sulfoxy acid, and any combination therein.

14. The method of claim 1, wherein said aqueous reaction is performed in at least one selected from the group consisting of batch stirred tank reactor, continuous stirred tank reactor, plug flow reactor, and any combination therein.

15. The method of claim 1, wherein said sulfoxy acid is formed by the sulfuric acid contact process.

16. The method of claim 1, wherein the energy from at least one selected from the group consisting of sulfuric acid condensation or sulfuric acid contact process; sulfoxy salt formation; Group IIA metal hydroxide formation; an electrolysis unit; formation of a calcium sulfoxy salt; pH adjustment; halogen dioxide formation; metal halate formation; metal halide acid formation, halide acid formation, and any combination therein
    is used to heat water and/or steam.

17. The method of claim 16, wherein
said heated water and/or steam is at least partially used to heat at least one selected from the group consisting of
said aqueous reaction,
the reaction of a metal hydroxide with a halide acid to form a metal hypohalite,
heating and/or reducing the water content in a Group IIA metal sulfoxy salt,
heating and/or reducing the water content in a metal sulfoxy salt, and
any combination therein.

18. The method of claim 1, wherein said reaction of a metal halide salt with a sulfoxy acid produces a metal sulfoxy salt comprising a moiety of at least one selected from the group consisting of sulfate, bisulfate, sulfite, bisulfite and any combination therein.

19. The method of claim 18, further comprising reacting said metal sulfoxy salt with a Group IIA metal hydroxide in aqueous solution, wherein
a mixture is produced comprising said metal, hydroxide, water and a solid, and wherein
said solid comprises at least one selected from the group consisting of Group IIA metal sulfate, sulfate ½ hydrate, sulfate di-hydrate, sulfite, hydrogen sulfite, sulfite di-hydrate and any combination therein.

20. The method of claim 19, wherein said Group IIA metal hydroxide in aqueous solution is formed by reacting with water at least one of the Group IIA metal, Group IIA metal oxide and Group IIA metal hydroxide.

21. The method of claim 19, further comprising a separation of said aqueous solution from said solid, such that said aqueous solution comprises said metal hydroxide, and
said solid is a moist mixture comprising said solid, said metal hydroxide and water.

22. The method of claim 21, further comprising water dilution of said solid solution thereby creating a mixture comprising a metal hydroxide and water, and a solid, wherein
said solid comprises a Group IIA metal comprising at least one selected from the group consisting of a sulfate, sulfate ½ hydrate, sulfate di-hydrate, sulfite, hydrogen sulfite, sulfite di-hydrate and any combination therein, wherein
the concentration of said metal hydroxide in said mixture is less than previous, and wherein
said aqueous solution is separated from said solid, such that
an aqueous solution is obtained comprising said metal hydroxide, and
a moist solid phase is obtained comprising said solid, said group IIA metal hydroxide and water.

23. The method of claim 22, performed a number of times, such that
the concentration is lowered of said metal hydroxide in aqueous solution, and
a final moist solid phase is created.

24. The method of claim 21, 22 or 23, wherein said separation is enhanced by vibration of said mixture.

25. The method of claim 21, 22 or 23, wherein at least a portion of said aqueous metal hydroxide solution is reacted with a halide acid to form a metal hypohalite solution.

26. The method of claim 23, further comprising pH adjustment of said final moist solid phase with a sulfoxy acid.

27. The method of claim 23, further comprising a drying of said final moist solid phase to reduce the water in said final moist solid phase.

28. The method of claim 1, wherein said polynucleate metal compound comprises the $SO_x$ moiety from the addition of a sulfoxy acid to said aqueous reaction of a metal halide solution with at least one metal.

29. The method of claim 28, wherein said aqueous reaction is performed with high shear.

30. The method of claim 1, further comprising the creation of steam from the formation of at least one selected from the group consisting of $SO_2$ from S and air or $O_2$, $SO_3$ from $SO_2$ and air or $O_2$, $H_2SO_3$ from $SO_2$ and $H_2O$, $H_2SO_4$ from $SO_3$ and $H_2O$, oleum from $H_2SO_4$ and $SO_3$, $H_2SO_4$ from oleum and $H_2O$, and any combination therein.

31. The method of claim 30, wherein said steam is at least partially used to power an air separation process, and wherein
the air separation process separates air to provide at least one of $O_2$ and $N_2$.

32. The method of claim 30, wherein said $SO_2$ is reacted with at least one selected from the group consisting of
a metal hydroxide to form a metal sulfite,
a metal carbonate to form a metal bi-sulfite,
a metal halate and $H_2SO_4$ to form the corresponding halogen dioxide, and
any combination therein.

33. The method of claim 30, wherein at least a portion of said steam is at least partially used to perform at least one selected from the group consisting of refine bauxite to alumina, heat said aqueous reaction of a metal halide solution with at least one metal, evaporate $H_2O$ from a metal sulfoxy salt, degrade a halite to a halide, heat S, turn a steam turbine which turns a generator to create electricity, heat the reaction of a metal hydroxide and a halide acid to form a metal hypohalite, and any combination therein.

34. The method of claim 33, wherein said electricity is at least partially used to power an air separation process, and wherein
the air separation process separates air to produce at least one of $O_2$ and $N_2$.

35. The method of claim 30, wherein said electricity is at least partially used in an electrolysis unit to form at least one selected from the group consisting of $H_2$ and $O_2$ from $H_2O$, $O_3$ from $O_2$, $H_2S_2O_8$ from $H_2SO_4$ in the production of $H_2O_2$, a metal hypohalite from a metal halide solution, a metal halate from a metal halide salt, a metal hydroxide and a halide acid from a metal halide salt, and any combination therein.

36. The method of claim 35, wherein the metal(s) in said metal halide salt comprises calcium.

37. The method of claim 35, wherein the halogen of said halide, hypohalite, halite or halate comprises chlorine or bromine.

38. The method of claim 35, wherein said metal halide solution comprises a waste catalyst or waste brine.

39. The method of claim 35, wherein at least a portion of said halide acid is used to form at least one selected from the group consisting of the corresponding hypohalite, halite, halate, available oxide form of said halide, said halide in the form of a dioxide, and any combination therein.

40. The method of claim 33, further comprising the formation of an available oxide form of a halogen, including a halogen dioxide, wherein
said formation is performed with at least one selected from the group consisting of said corresponding halide, hypohalite, halide acid, halite, halate and any combination therein, wherein
said halide acid, hypohalite, halide acid, halite and halate is formed in an electrolysis unit with said electricity.

41. The method of claim 35, wherein said $H_2$ is at least partially used in at one least selected from the group consisting of
- combustion to turn a generator to generate electricity,
- fuel cell to generate electricity, and
- heating the reaction between a metal halide salt with a sulfoxy acid.

42. The method of claim 41, wherein said electricity is at least partially used in said electrolysis unit.

43. A method for the preparation of a polynucleate metal compound comprising at least one metal in the +2 or +3 valence state, wherein
- the polynucleate metal compound is formed by aqueous reaction of a metal halide solution with at least one metal, wherein
- the metal halide solution comprises at least one metal in the +2 or +3 valence state, wherein
- the metal halide solution is prepared by reacting a halide acid comprising the halide of the metal halide solution with the at least one metal, wherein
- the at least metal comprises metal(s) in the 0, +2 or +3 valence state, and if in the 0 valence state capable of entering the +2 or +3 valence state, and wherein
- the aqueous reaction is performed with high shear.

44. The method of claim 43, wherein
within a single vessel at least one of
a) an aqueous solution of said halide acid is formed from the reaction of said halide in water,
b) said metal halide solution is formed by the reaction of said at least one metal in the 0, +2 or +3 valence state in said halide acid, and
c) said polynucleate metal compound is formed by the reaction of said at least one metal in the 0, +2 or +3 valence state in said metal halide solution.

45. The method of claim 43, wherein at least one of
- said at least one metal in said metal halide solution is aluminum and said at least one metal is aluminum,
- said at least one metal in said metal halide solution is aluminum and said at least one metal is at least one metal other than aluminum,
- said at least one metal in said metal halide solution is a metal other than aluminum and said at least one metal is aluminum, and
- said at least one metal in said metal halide solution and said at least one metal is a metal other than aluminum.

46. The method of claim 43, wherein said at least one metal in said metal halide solution or said at least one metal comprises Ca.

47. The method of claim 43, wherein said at least one metal is in a form selected from the group consisting of metal, metal oxide, metal hydroxide, metal carbonate and any combination therein.

48. The method of claim 43, wherein said halide in said polynucleate metal compound comprises at least one of chlorine and bromine.

49. The method of claim 43, wherein said polynucleate metal compound further comprises at least one selected from the group consisting of sulfate, phosphate, carbonate, silicate, nitrate and any combination therein.

50. The method of claim 43, wherein the at least one metal in said metal halide solution or said at least one metal comprises calcium.

51. The method of claim 43, wherein said metal halide solution comprises a waste catalyst or waste brine.

* * * * *